(12) United States Patent
Jung

(10) Patent No.: US 12,710,624 B2
(45) Date of Patent: Aug. 18, 2026

(54) OPTICAL MODULE

(71) Applicant: LG INNOTEK CO., LTD., Seoul (KR)

(72) Inventor: Jae Wook Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 346 days.

(21) Appl. No.: 18/687,224

(22) PCT Filed: Aug. 26, 2022

(86) PCT No.: PCT/KR2022/012822
§ 371 (c)(1),
(2) Date: Feb. 27, 2024

(87) PCT Pub. No.: WO2023/027551
PCT Pub. Date: Mar. 2, 2023

(65) Prior Publication Data
US 2024/0385417 A1 Nov. 21, 2024

(30) Foreign Application Priority Data
Aug. 27, 2021 (KR) ........................ 10-2021-0114290

(51) Int. Cl.
*G02B 13/00* (2006.01)
*G02B 3/00* (2006.01)
(Continued)

(52) U.S. Cl.
CPC ........... *G02B 13/0045* (2013.01); *G02B 3/00* (2013.01); *G02B 9/62* (2013.01); *G02B 13/06* (2013.01); *G02B 13/18* (2013.01)

(58) Field of Classification Search
None
See application file for complete search history.

(56) References Cited

U.S. PATENT DOCUMENTS

2017/0219802 A1 8/2017 Chen et al.
2021/0063701 A1 3/2021 Son et al.
(Continued)

FOREIGN PATENT DOCUMENTS

JP 2010-204241 A 9/2010
KR 10-0730852 B1 6/2007
KR 10-2021-0027183 A 3/2021

OTHER PUBLICATIONS

International Search Report dated Dec. 28, 2022 in International Application No. PCT/KR2022/012822.

*Primary Examiner* — Richard H Kim
(74) *Attorney, Agent, or Firm* — SALIWANCHIK, LLOYD & EISENSCHENK

(57) ABSTRACT

A optical module according to an embodiment includes a sensor; and an optical system comprising a first lens, a second lens, a third lens, a fourth lens, a fifth lens, and a sixth lens arranged sequentially along an optical axis from an object side to an sensor side, wherein at least one of an object side surface or an sensor side surface of the fifth lens comprises a freeform surface, wherein the fifth lens satisfies Equation A below:

$$|\max Sag\_O\_x\_5| \neq |\max Sag\_O\_y\_5| \quad \text{[Equation A]}$$

(In equation A, max |Sag_O_x_5| means an absolute value of a maximum Sag value in a X-axis direction on the object side surface of the fifth lens, and max |Sag_O_y_5| means an absolute value of a maximum Sag value in a Y-axis direction on the object side surface of the surface lens), wherein the optical system satisfies the following Equations 1 to 3:

(Continued)

$$60° \leq FOV \leq 90° \quad \text{[Equation 1]}$$

(FOV in Equation 1 means an angle of view.)

$$0.50 \leq TTL/ImgH \leq 1.0 \quad \text{[Equation 2]}$$

(In Equation 2, TTL means a distance in an optical axis direction from a vertex of an object side surface of the first lens to an image surface of an image sensor unit, and ImgH means twice a diagonal distance from the image surface of the image sensor unit overlapping the optical axis to a 1.0 field region of an image sensor), and $$CA\_O\_x < CA\_O\_5 \quad \text{[Equation 3]}$$

(In Equation 3, CA_O_x means an effective diameter of an object side surface of a lens closest to an aperture among lenses between the aperture and a sensor, and CA_O_6 means an effective diameter of an object side surface of the sixth lens).

19 Claims, 37 Drawing Sheets

(51) Int. Cl.

| | |
|---|---|
| ***G02B 9/62*** | (2006.01) |
| ***G02B 13/06*** | (2006.01) |
| ***G02B 13/18*** | (2006.01) |

(56) References Cited

U.S. PATENT DOCUMENTS

2021/0132338 A1 5/2021 Lin et al.
2021/0263265 A1 8/2021 Sun et al.
2021/0263281 A1 8/2021 Chen et al.
2022/0113499 A1 * 4/2022 Jang ...................... G02B 13/08

* cited by examiner

FIG. 6

| distance from optical axis (mm) | ninth surface | | | | | | tenth surface | | | | | |
|---|---|---|---|---|---|---|---|---|---|---|---|---|
| | 0° | 30° | 45° | 53° | 60° | 90° | 0° | 30° | 45° | 53° | 60° | 90° |
| -1.8 | | | | | | | -0.596373 | -0.595181 | -0.592222 | -0.591296 | -0.591514 | -0.597078 |
| -1.6 | | | | | | | -0.358277 | -0.357123 | -0.355626 | -0.355409 | -0.355864 | -0.359916 |
| -1.4 | | | | | | | -0.214116 | -0.213574 | -0.212763 | -0.212554 | -0.212654 | -0.214216 |
| -1.2 | -0.124318 | -0.123945 | -0.123512 | -0.123452 | -0.123582 | -0.124724 | -0.13251 | -0.13228 | -0.13185 | -0.131671 | -0.131616 | -0.131978 |
| -1.0 | 0.01991 | 0.019935 | 0.020081 | 0.020162 | 0.020206 | 0.020165 | -0.089619 | -0.089486 | -0.089275 | -0.089176 | -0.089124 | -0.08917 |
| -0.8 | 0.058018 | 0.058051 | 0.058102 | 0.058128 | 0.058144 | 0.058147 | -0.064396 | -0.064305 | -0.064213 | -0.064175 | -0.064156 | -0.064171 |
| -0.6 | 0.049578 | 0.049624 | 0.049644 | 0.049646 | 0.049643 | 0.049614 | -0.043299 | -0.04325 | -0.043214 | -0.043202 | -0.043198 | -0.043209 |
| -0.4 | 0.026858 | 0.026877 | 0.026887 | 0.026888 | 0.026887 | 0.026876 | -0.022662 | -0.022662 | -0.02265 | -0.022645 | -0.022643 | -0.022644 |
| -0.2 | 0.007446 | 0.007450 | 0.007452 | 0.007453 | 0.007454 | 0.007454 | -0.006323 | -0.00632 | -0.006317 | -0.006316 | -0.006315 | -0.006313 |
| 0(optical axis) | 0 | 0 | 0 | 0 | 0 | 0 | 0 | 0 | 0 | 0 | 0 | 0 |
| 0.2 | 0.007446 | 0.007450 | 0.007452 | 0.007453 | 0.007454 | 0.007454 | -0.006323 | -0.00632 | -0.006317 | -0.006316 | -0.006315 | -0.006313 |
| 0.4 | 0.026858 | 0.026877 | 0.026887 | 0.026888 | 0.026887 | 0.026876 | -0.022662 | -0.022662 | -0.02265 | -0.022645 | -0.022643 | -0.022644 |
| 0.6 | 0.049578 | 0.049624 | 0.049644 | 0.049646 | 0.049643 | 0.0049614 | -0.043299 | -0.04325 | -0.043214 | -0.043202 | -0.043198 | -0.043209 |
| 0.8 | 0.058018 | 0.058051 | 0.058102 | 0.058128 | 0.058144 | 0.058147 | -0.064396 | -0.064305 | -0.064213 | -0.064175 | 0.064156 | -0.064171 |
| 1.0 | 0.01991 | 0.019935 | 0.020081 | 0.020162 | 0.020206 | 0.020165 | -0.089619 | -0.089486 | -0.089275 | -0.089176 | -0.089124 | -0.08917 |
| 1.2 | -0.124318 | -0.123945 | -0.123512 | -0.123452 | -0.123582 | -0.124724 | -0.13251 | -0.13228 | -0.13185 | -0.131671 | -0.131616 | -0.131978 |
| 1.4 | | | | | | | -0.214116 | -0.213574 | -0.212763 | -0.21554 | -0.212654 | -0.214216 |
| 1.6 | | | | | | | -0.358277 | -0.357123 | -0.355626 | -0.355409 | -0.355864 | -0.359916 |
| 1.8 | | | | | | | -0.596373 | -0.595181 | -0.592222 | -0.591296 | -0.591514 | -0.597078 |

FIG. 9

| lens | surface | radius of curvature (mm) | thickness and Distance (mm) | refractive index | Abbe's Number |
|---|---|---|---|---|---|
| first lens | first surface | 1.538 | 0.659 | 1.512 | 56.664 |
| | second surface | 4.339 | 0.122 | | |
| second lens | third surface | 4.149 | 0.230 | 1.688 | 18.413 |
| | fourth surface | 2.469 | 0.087 | | |
| third lens | fifth surface | 3.655 | 0.395 | 1.511 | 56.998 |
| | sixth surface | -526.419 | 0.480 | | |
| fourth lens | seventh surface | 19.156 | 0.292 | 1.689 | 18.400 |
| | eighth surface | 2.853 | 0.007 | | |
| fifth lens | ninth surface | 1.907 | 0.728 | 1.634 | 23.483 |
| | tenth surface | -5.966 | 0.274 | | |
| sixth lens | eleventh surface | -2.388 | 0.350 | 1.560 | 33.729 |
| | twelfth surface | 2.798 | 0.109 | | |
| filter | thirteenth surface | Infinity | 0.110 | | |
| | fourteenth surface | Infinity | 0.730 | | |
| image sensor | fifteenth surface | Infinity | | | |

FIG. 10

| order | fifth lens | |
| --- | --- | --- |
| | ninth surface (S9) | tenth surface (S10) |
| C1 | -0.08085 | -0.129135 |
| C2 | 0 | 0 |
| C3 | 0 | 0 |
| C4 | 0.0003415 | -0.000599 |
| C5 | -0.334844 | -0.119474 |
| C6 | 0 | 0 |
| C7 | 0 | 0 |
| C8 | 0 | 0 |
| C9 | 0 | 0 |
| C10 | 0 | 0 |
| C11 | -0.001426 | -0.002674 |
| C12 | 0.0006561 | -0.000283 |
| C13 | -0.155659 | -0.096153 |
| C14 | 0 | 0 |
| C15 | 0 | 0 |
| C16 | 0 | 0 |
| C17 | 0 | 0 |
| C18 | 0 | 0 |
| C19 | 0 | 0 |
| C20 | 0 | 0 |
| C21 | 0 | 0 |
| C22 | 0.0005066 | 0.0016904 |
| C23 | -0.000765 | 4.523E-05 |
| C24 | 0.0004697 | -0.000815 |
| C25 | -0.035356 | -0.023476 |
| C26 | 0 | 0 |
| C27 | 0 | 0 |
| C28 | 0 | 0 |
| C29 | 0 | 0 |
| C30 | 0 | 0 |
| C31 | 0 | 0 |
| C32 | 0 | 0 |
| C33 | 0 | 0 |
| C34 | 0 | 0 |
| C35 | 0 | 0 |
| C36 | 0 | 0 |
| C37 | 0 | 0 |
| C38 | 5.909E-05 | -5.14E-05 |
| C39 | -0.000202 | 0.0006916 |
| C40 | 0.0001302 | -0.000796 |
| C41 | -0.005252 | 0.0105045 |
| C42 | 0 | 0 |
| C43 | 0 | 0 |
| C44 | 0 | 0 |
| C45 | 0 | 0 |
| C46 | 0 | 0 |
| C47 | 0 | 0 |
| C48 | 0 | 0 |
| C49 | 0 | 0 |
| C50 | 0 | 0 |
| C51 | 0 | 0 |
| C52 | 0 | 0 |
| C53 | 0 | 0 |
| C54 | 0 | 0 |
| C55 | 0 | 0 |
| C56 | 0 | 0 |
| C57 | 0 | 0 |
| C58 | 0 | 0 |
| C59 | 5.015E-05 | 0.0003264 |
| C60 | -7.56E-06 | -0.000251 |
| C61 | -0.002599 | -0.004189 |
| C62 | 0 | 0 |
| C63 | 0 | 0 |
| C64 | 0 | 0 |
| C65 | 0 | 0 |
| C66 | 0 | 0 |

FIG. 11a

Table 1. Standard Zernike Polynomials Terms

| Term | Standard Zernike Polynomial | Description |
|---|---|---|
| 1 | 1 | Piston (constant) |
| 2 | $R\cos\theta$ | Distortion - Tilt (x-axis) |
| 3 | $R\sin\theta$ | Distortion - Tilt (y-axis) |
| 4 | $R^2\cos(2\theta)$ | Astigmatism, Primary (axis at 0° or 90°) |
| 5 | $2R^2 - 1$ | Defocus - Field curvature |
| 6 | $R^2\sin(2\theta)$ | Astigmatism, Primary (axis at ±45°) |
| 7 | $R^3\cos(3\theta)$ | Trefoil, Primary (x-axis) |
| 8 | $(3R^3 - 2R)\cos\theta$ | Coma, Primary (x-axis) |
| 9 | $(3R^3 - 2R)\sin\theta$ | Coma, Primary (y-axis) |
| 10 | $R^3\sin(3\theta)$ | Trefoil, Primary (y-axis) |
| 11 | $R^4\cos(4\theta)$ | Tetrafoil, Primary (x-axis) |
| 12 | $(4R^4 - 3R^2)\cos(2\theta)$ | Astigmatism, Secondary (axis at 0° or 90°) |
| 13 | $6R^4 - 6R^2 + 1$ | Spherical Aberration, Primary |
| 14 | $(4R^4 - 3R^2)\sin(2\theta$ | Astigmatism, Secondary (axis at ±45°) |
| 15 | $R^4\sin(4\theta)$ | Tetrafoil, Primary (y-axis) |
| 16 | $R^5\cos(5\theta)$ | Pentafoil, Primary (x-axis) |
| 17 | $(5R^5 - 4R^3)\cos(3\theta)$ | Trefoil, Secondary (x-axis) |
| 18 | $(10R^5 - 12R^3 + 3R)\cos\theta$ | Coma, Secondary (x-axis) |
| 19 | $(10R^5 - 12R^3 + 3R)\sin\theta$ | Coma, Secondary (y-axis) |
| 20 | $(5R^5 - 4R^3)\sin(3\theta)$ | Trefoil, Secondary (y-axis) |
| 21 | $R^5\sin(5\theta)$ | Pentafoil, Primary (y-axis) |
| 22 | $R^6\cos(6\theta)$ | Hexafoil, Primary (x-axis) |

| | | |
|---|---|---|
| 23 | $(6R^6 - 5R^4)\cos(4\theta)$ | Tetrafoil, Secondary (x-axis) |
| 24 | $(15R^6 - 20R^4 + 6R^2)\cos(2\theta)$ | Astigmatism, Tertiary (axis at 0° or 90°) |
| 25 | $20R^6 - 30R^4 + 12R^2 - 1$ | Spherical Aberration, Secondary |
| 26 | $(15R^6 - 20R^4 + 6R^2)\sin(2\theta)$ | Astigmatism, Tertiary (axis at ±45°) |
| 27 | $(6R^6 - 5R^4)\sin(4\theta)$ | Tetrafoil, Secondary (y-axis) |
| 28 | $R^6\sin(6\theta)$ | Hexafoil, Primary (y-axis) |
| 29 | $R^7\cos(7\theta)$ | Heptafoil, Primary (x-axis) |
| 30 | $(7R^7 - 6R^5)\cos(5\theta)$ | Pentafoil, Secondary (x-axis) |
| 31 | $(21R^7 - 30R^5 + 10R^3)\cos(3\theta)$ | Trefoil, Tertiary (x-axis) |
| 32 | $(35R^7 - 60R^5 + 30R^3 - 4R)\cos\theta$ | Coma, Tertiary (x-axis) |
| 33 | $(35R^7 - 60R^5 + 30R^3 - 4R)\sin\theta$ | Coma, Tertiary (y-axis) |
| 34 | $(21R^7 - 30R^5 + 10R^3)\sin(3\theta)$ | Trefoil, Tertiary (y-axis) |
| 35 | $(7R^7 - 6R^5)\sin(5\theta)$ | Pentafoil, Secondary (y-axis) |
| 36 | $R^7\sin(7\theta)$ | Heptafoil, Primary (y-axis) |
| 37 | $R^8\cos(8\theta)$ | Octafoil, Primary (x-axis) |
| 38 | $(8R^8 - 7R^6)\cos(6\theta)$ | Hexafoil, Secondary (x-axis) |
| 39 | $(28R^8 - 42R^6 + 15R^4)\cos(4\theta)$ | Tetrafoil, Tertiary (x-axis) |
| 40 | $(56R^8 - 105R^6 + 60R^4 - 10R^2)\cos(2\theta)$ | Astigmatism, Quaternary (axis at 0° or 90°) |
| 41 | $70R^8 - 140R^6 + 90R^4 - 20R^2 + 1$ | Spherical Aberration, Tertiary |
| 42 | $(56R^8 - 105R^6 + 60R^4 - 10R^2)\sin(2\theta)$ | Astigmatism, Quaternary (axis at ±45°) |
| 43 | $(28R^8 - 42R^6 + 15R^4)\sin(4\theta)$ | Tetrafoil, Tertiary (y-axis) |
| 44 | $(8R^8 - 7R^6)\sin(6\theta)$ | Hexafoil, Secondary (y-axis) |
| 45 | $R^8\sin(8\theta)$ | Octafoil, Primary (y-axis) |

| | | |
|---|---|---|
| 46 | $R^9\cos(9\theta)$ | Nonafoil, Primary (x-axis) |
| 47 | $(9R^9 - 8R^7)\cos(7\theta)$ | Heptafoil, Secondary (x-axis) |
| 48 | $(36R^9 - 56R^7 + 21R^5)\cos(5\theta$ | Pentafoil, Tertiary (x-axis) |
| 49 | $(84R^9 - 168R^7 + 105R^5 - 20R^3)\cos(3\theta$ | Trefoil, Quaternary (x-axis) |
| 50 | $(126R^9 - 280R^7 + 210R^5 - 60R^3 + 5R)\cos\theta$ | Coma, Quaternary (x-axis) |
| 51 | $(126R^9 - 280R^7 + 210R^5 - 60R^3 + 5R)\sin\theta$ | Coma, Quaternary (y-axis) |
| 52 | $(84R^9 - 168R^7 + 105R^5 - 20R^3)\sin(3\theta)$ | Trefoil, Quaternary (y-axis) |
| 53 | $(36R^9 - 56R^7 + 21R^5)\sin(5\theta)$ | Pentafoil, Tertiary (y-axis) |
| 54 | $(9R^9 - 8R^7)\sin(7\theta)$ | Heptafoil, Secondary (y-axis) |
| 55 | $R^9\sin(9\theta)$ | Nonafoil, Primary (y-axis) |
| 56 | $R^{10}\cos(10\theta)$ | Decafoil, Primary (x-axis) |
| 57 | $(10R^{10} - 9R^8)\cos(8\theta)$ | Octafoil, Secondary (x-axis) |
| 58 | $(45R^{10} - 72R^8 + 28R^6)\cos(6\theta)$ | Hexafoil, Tertiary (x-axis) |
| 59 | $(120R^{10} - 252R^8 + 168R^6 - 35R^4)\cos(4\theta)$ | Tetrafoil, Quaternary (x-axis) |
| 60 | $(210R^{10} - 504R^8 + 420R^6 - 140R^4 + 15R^2)\cos(2\theta)$ | Astigmatism, Quinternary (axis at 0° or 90°) |
| 61 | $252R^{10} - 630R^8 + 560R^6 - 210R^4 + 30R^2 - 1$ | Spherical Aberration, Quaternary |
| 62 | $(210R^{10} - 504R^8 + 420R^6 - 140R^4 + 15R^2)\sin(2\theta)$ | Astigmatism, Quinternary (axis at ±45°) |
| 63 | $(120R^{10} - 252R^8 + 168R^6 - 35R^4)\sin(4\theta)$ | Tetrafoil, Quaternary (y-axis) |
| 64 | $(45R^{10} - 72R^8 + 28R^6)\sin(6\theta)$ | Hexafoil, Tertiary (y-axis) |
| 65 | $(10R^{10} - 9R^8)\sin(8\theta)$ | Octafoil, Secondary (y-axis) |
| 66 | $R^{10}\sin(10\theta)$ | Decafoil, Primary (y-axis) |

| | first embodiment |
|---|---|
| aperture position | between first and second lenses |
| FOV(θ) | 79° |
| F number | 2.000 |
| TTL | 4.600 mm |
| ImgH | 6.584 mm |
| EFL | 3.950 |
| EPD | 1.975 |
| f1 | 4.312 |
| f2 | -9.385 |
| f3 | 7.103 |
| f4 | -4.905 |
| f5 | 2.294 |
| f6 | -2.247 |

FIG. 13

| distance from optical axis(mm) | slope angle(°) | | | | | | | | | | | | | |
|---|---|---|---|---|---|---|---|---|---|---|---|---|---|---|
| | first surface | second surface | third surface | fourth surface | fifth surface | sixth surface | seventh surface | eighth surface | ninth-X surface | ninth-Y surface | tenth-X surface | tenth-Y surface | eleventh surface | twelfth surface |
| 0(optical axis) | 0.000 | 0.000 | 0.000 | 0.000 | 0.000 | 0.000 | 0.000 | 0.000 | 0.000 | 0.000 | 0.000 | 0.000 | 0.000 | 0.000 |
| 0.2 | 7.454 | 2.546 | 2.409 | 4.324 | 3.104 | -0.039 | 0.040 | 3.064 | 4.112 | 4.115 | -3.483 | -3.478 | -5.122 | 3.590 |
| 0.4 | 14.984 | 4.558 | 2.928 | 6.915 | 5.854 | -0.258 | -2.430 | 1.838 | 6.579 | 6.581 | -5.565 | -5.555 | -11.718 | 4.785 |
| 0.6 | 22.702 | 5.721 | 0.923 | 7.133 | 7.071 | -1.343 | -8.539 | -5.349 | 5.580 | 5.592 | -6.001 | -5.977 | -19.341 | 3.168 |
| 0.8 | 30.766 | 5.794 | -2.274 | 6.705 | 4.376 | -6.605 | -21.345 | -18.500 | -2.266 | -2.224 | -6.201 | -6.148 | -25.652 | -0.296 |
| 1.0 | 39.214 | | | | | -25.088 | -49.854 | -34.273 | -21.175 | -21.177 | -8.815 | -8.753 | -28.366 | -4.743 |
| 1.2 | | | | | | | | -44.065 | -49.281 | -49.497 | -16.272 | -16.314 | -26.513 | -10.253 |
| 1.4 | | | | | | | | | | | -28.545 | -28.806 | -20.657 | -16.884 |
| 1.6 | | | | | | | | | | | -42.637 | -42.863 | -13.366 | -22.957 |
| 1.8 | | | | | | | | | | | -56.664 | -56.173 | -8.062 | -26.009 |
| 2.0 | | | | | | | | | | | | | -5.794 | -26.683 |
| 2.2 | | | | | | | | | | | | | -6.141 | -30.175 |
| 2.4 | | | | | | | | | | | | | -12.682 | -38.368 |
| 2.6 | | | | | | | | | | | | | | -63.829 |

FIG. 14

| distance(mm) | lens interval (mm) | | | | |
|---|---|---|---|---|---|
| | first lens/second lens | second lens/third lens | third lens/fourth lens | fourth lens/fifth lens | fifth lens/sixth lens |
| 0(optical axis) | 0.122 | 0.087 | 0.480 | 0.138 | 0.342 |
| 0.2 | 0.122 | 0.084 | 0.481 | 0.139 | 0.340 |
| 0.4 | 0.119 | 0.080 | 0.478 | 0.149 | 0.327 |
| 0.6 | 0.180 | 0.078 | 0.462 | 0.176 | 0.292 |
| 0.8 | 0.085 | 0.076 | 0.423 | 0.225 | 0.229 |
| 1.0 | 0.054 | | 0.337 | 0.287 | 0.151 |
| 1.2 | | | | 0.312 | 0.088 |
| 1.4 | | | | | 0.081 |
| 1.6 | | | | | 0.164 |
| 1.8 | | | | | 0.365 |

FIG. 15

| distance(mm) | thickness of lens (mm) | | | | | |
|---|---|---|---|---|---|---|
| | first lens | second lens | third lens | fourth lens | fifth lens | sixth lens |
| 0(optical axis) | 0.659 | 0.230 | 0.395 | 0.292 | 0.529 | 0.350 |
| 0.2 | 0.651 | 0.233 | 0.389 | 0.298 | 0.515 | 0.366 |
| 0.4 | 0.624 | 0.244 | 0.373 | 0.311 | 0.480 | 0.410 |
| 0.6 | 0.574 | 0.262 | 0.347 | 0.325 | 0.436 | 0.481 |
| 0.8 | 0.493 | 0.288 | 0.314 | 0.335 | 0.407 | 0.570 |
| 1.0 | 0.370 | | | 0.372 | 0.420 | 0.665 |
| 1.2 | | | | | 0.521 | 0.745 |
| 1.4 | | | | | | 0.485 |
| 1.6 | | | | | | 0.773 |
| 1.8 | | | | | | 0.717 |
| 2.0 | | | | | | 0.642 |

FIG. 16

| distance from optical axis(mm) | Sag(mm) | | | | | | | | | | | | | |
|---|---|---|---|---|---|---|---|---|---|---|---|---|---|---|
| | first surface | second surface | third surface | fourth surface | fifth surface | sixth surface | seventh surface | eighth surface | ninth surface-X | ninth surface-Y | tenth surface-X | tenth surface-Y | eleventh surface | twelfth surface |
| 0(optical axis) | 0.000 | 0.000 | 0.000 | 0.000 | 0.000 | 0.000 | 0.000 | 0.000 | 0.000 | 0.000 | 0.000 | 0.000 | 0.000 | 0.000 |
| 0.2 | 0.013 | 0.005 | 0.005 | 0.008 | 0.005 | 0.000 | 0.001 | 0.006 | 0.00744 | 0.00745 | -0.00632 | -0.00631 | -0.009 | 0.007 |
| 0.4 | 0.053 | 0.017 | 0.015 | 0.028 | 0.021 | 0.000 | -0.003 | 0.016 | 0.02685 | 0.02687 | -0.02267 | -0.02264 | -0.038 | 0.022 |
| 0.6 | 0.121 | 0.035 | 0.022 | 0.053 | 0.045 | -0.003 | -0.021 | 0.012 | 0.04957 | 0.04961 | -0.04329 | -0.04320 | -0.093 | 0.037 |
| 0.8 | 0.222 | 0.056 | 0.020 | 0.077 | 0.067 | -0.015 | -0.071 | -0.029 | 0.05801 | 0.05814 | -0.06439 | -0.06417 | -0.177 | 0.042 |
| 1.0 | 0.362 | | | | | -0.066 | -0.209 | -0.129 | 0.01991 | 0.02016 | -0.08961 | -0.08917 | -0.281 | 0.034 |
| 1.2 | | | | | | | | -0.299 | -0.1243 | -0.1247 | -0.13251 | -0.13197 | -0.386 | 0.008 |
| 1.4 | | | | | | | | | | | -0.21411 | -0.21421 | -0.475 | -0.040 |
| 1.6 | | | | | | | | | | | -0.35827 | -0.35991 | -0.536 | -0.114 |
| 1.8 | | | | | | | | | | | -0.59637 | -0.59707 | -0.573 | -0.206 |
| 2.0 | | | | | | | | | | | | | -0.597 | -0.305 |
| 2.2 | | | | | | | | | | | | | -0.616 | -0.411 |
| 2.4 | | | | | | | | | | | | | -0.647 | -0.546 |
| 2.6 | | | | | | | | | | | | | | -0.781 |

FIG. 17

| | first surface | second surface | third surface | fourth surface | fifth surface | sixth surface | seventh surface | eighth surface | ninth surface | tenth surface | eleventh surface | twelfth surface |
|---|---|---|---|---|---|---|---|---|---|---|---|---|
| K= | 0.1800 | 8.2346 | -8.7910 | 2.1344 | -9.7220 | 16.1708 | -78.9499 | -50.6492 | - | - | -0.7000 | -24.3913 |
| A4= | -0.0189 | -0.0649 | -0.1824 | -0.1962 | 0.0101 | -0.0062 | -0.3342 | -0.3069 | - | - | -0.1917 | -0.1569 |
| A6= | 0.0484 | -0.0154 | 0.0601 | 0.0245 | -0.0502 | -0.0689 | 0.5838 | 0.2979 | - | - | 0.1730 | 0.1139 |
| A8= | -0.1815 | 0.1672 | 0.1202 | 0.0680 | -0.1416 | 0.3050 | -1.3942 | -0.8059 | - | - | -0.0606 | -0.0557 |
| A10= | 0.3434 | -0.4832 | -0.2527 | 0.0261 | 0.3389 | -0.9588 | 2.3616 | 1.4984 | - | - | 0.0121 | 0.0150 |
| A12= | -0.3699 | 0.7049 | 0.3304 | -0.1077 | -0.2760 | 1.3628 | -2.7124 | -1.6722 | - | - | -0.0016 | -0.0019 |
| A14= | 0.2086 | -0.5236 | -0.2696 | 0.0480 | 0.0114 | -0.9768 | 1.7494 | 1.0880 | - | - | 0.0002 | 0.0000 |
| A16= | -0.0489 | 0.1532 | 0.0894 | 0.0012 | 0.0516 | 0.2777 | -0.4878 | -0.3787 | - | - | 0.0000 | 0.0000 |
| A18= | 0.000 | 0.0000 | 0.0000 | 0.0000 | 0.0000 | 0.0000 | 0.0000 | 0.0547 | - | - | 0.0000 | 0.0000 |
| A20= | 0.000 | 0.0000 | 0.0000 | 0.0000 | 0.0000 | 0.0000 | 0.0000 | 0.0000 | - | - | 0.0000 | 0.0000 |

FIG. 19

| Frequency | 0F | | 0.2F | | 0.4F | | 0.6F | | 0.8F | | 1.0F | |
|---|---|---|---|---|---|---|---|---|---|---|---|---|
| | RAD | TAN | RAD | TAN | RAD | TAN | RAD | TAN | RAD | TAN | RAD | TAN |
| 0 | 0.999 | 0.999 | 0.999 | 0.999 | 0.999 | 0.999 | 0.999 | 0.999 | 0.999 | 0.999 | 0.999 | 0.999 |
| 11 | 0.984 | 0.984 | 0.982 | 0.983 | 0.981 | 0.982 | 0.979 | 0.980 | 0.975 | 0.973 | 0.944 | 0.965 |
| 22 | 0.967 | 0.967 | 0.962 | 0.963 | 0.961 | 0.962 | 0.956 | 0.956 | 0.946 | 0.974 | 0.852 | 0.914 |
| 33 | 0.949 | 0.949 | 0.940 | 0.942 | 0.938 | 0.941 | 0.931 | 0.931 | 0.914 | 0.917 | 0.742 | 0.846 |
| 44 | 0.931 | 0.931 | 0.916 | 0.919 | 0.915 | 0.919 | 0.906 | 0.904 | 0.881 | 0.885 | 0.646 | 0.778 |
| 55 | 0.912 | 0.912 | 0.890 | 0.895 | 0.890 | 0.895 | 0.880 | 0.878 | 0.847 | 0.853 | 0.552 | 0.705 |
| 66 | 0.892 | 0.892 | 0.865 | 0.870 | 0.865 | 0.871 | 0.854 | 0.852 | 0.814 | 0.823 | 0.480 | 0.645 |
| 77 | 0.872 | 0.872 | 0.839 | 0.845 | 0.838 | 0.847 | 0.829 | 0.828 | 0.781 | 0.794 | 0.416 | 0.586 |
| 88 | 0.852 | 0.851 | 0.811 | 0.818 | 0.812 | 0.822 | 0.803 | 0.802 | 0.747 | 0.766 | 0.364 | 0.532 |
| 99 | 0.831 | 0.830 | 0.784 | 0.792 | 0.786 | 0.798 | 0.778 | 0.778 | 0.715 | 0.739 | 0.323 | 0.485 |
| 110 | 0.810 | 0.809 | 0.756 | 0.765 | 0.759 | 0.773 | 0.753 | 0.754 | 0.682 | 0.712 | 0.283 | 0.440 |

FIG. 21

| lens | surface | radius of curvature (mm) | thickness and Distance (mm) | refractive index | Abbe's Number |
|---|---|---|---|---|---|
| first lens | first surface | 1.561 | 0.688 | 1.515 | 55.196 |
| | second surface | 4.321 | 0.129 | | |
| second lens | third surface | 4.364 | 0.230 | 1.689 | 18.369 |
| | fourth surface | 2.668 | 0.070 | | |
| third lens | fifth surface | 4.039 | 0.424 | 1.511 | 56.783 |
| | sixth surface | -14.876 | 0.425 | | |
| fourth lens | seventh surface | -31.378 | 0.330 | 1.688 | 18.436 |
| | eighth surface | 4.461 | 0.009 | | |
| fifth lens | ninth surface | 2.312 | 0.791 | 1.624 | 23.648 |
| | tenth surface | -5.845 | 0.339 | | |
| sixth lens | eleventh surface | -2.101 | 0.350 | 1.564 | 34.719 |
| | twelfth surface | 2.748 | 0.099 | | |
| filter | thirteenth surface | Infinity | 0.110 | | |
| | fourteenth surface | Infinity | 0.559 | | |
| image sensor | fifteenth surface | Infinity | | | |

FIG. 22

| order | fifth lens | |
|---|---|---|
| | ninth surface (S9) | tenth surface (S10) |
| C1 | -0.071536 | -0.124838 |
| C2 | 0 | 0 |
| C3 | 0 | 0 |
| C4 | -0.002778 | -0.008515 |
| C5 | -0.319764 | -0.1123 |
| C6 | 0 | 0 |
| C7 | 0 | 0 |
| C8 | 0 | 0 |
| C9 | 0 | 0 |
| C10 | 0 | 0 |
| C11 | -0.001949 | -0.00273 |
| C12 | -0.000794 | -0.002579 |
| C13 | -0.149632 | -0.098462 |
| C14 | 0 | 0 |
| C15 | 0 | 0 |
| C16 | 0 | 0 |
| C17 | 0 | 0 |
| C18 | 0 | 0 |
| C19 | 0 | 0 |
| C20 | 0 | 0 |
| C21 | 0 | 0 |
| C22 | 0.0002212 | 0.0011697 |
| C23 | -0.000892 | 0.0006163 |
| C24 | -0.000269 | -0.001734 |
| C25 | -0.037389 | -0.025933 |
| C26 | 0 | 0 |
| C27 | 0 | 0 |
| C28 | 0 | 0 |
| C29 | 0 | 0 |
| C30 | 0 | 0 |
| C31 | 0 | 0 |
| C32 | 0 | 0 |
| C33 | 0 | 0 |
| C34 | 0 | 0 |
| C35 | 0 | 0 |
| C36 | 0 | 0 |
| C37 | 0 | 0 |
| C38 | -4.36E-05 | -3.95E-05 |
| C39 | -0.000193 | 0.0014105 |
| C40 | -0.000233 | -0.001587 |
| C41 | -0.004588 | 0.012448 |
| C42 | 0 | 0 |
| C43 | 0 | 0 |
| C44 | 0 | 0 |
| C45 | 0 | 0 |
| C46 | 0 | 0 |
| C47 | 0 | 0 |
| C48 | 0 | 0 |
| C49 | 0 | 0 |
| C50 | 0 | 0 |
| C51 | 0 | 0 |
| C52 | 0 | 0 |
| C53 | 0 | 0 |
| C54 | 0 | 0 |
| C55 | 0 | 0 |
| C56 | 0 | 0 |
| C57 | 0 | 0 |
| C58 | 0 | 0 |
| C59 | 9.577E-05 | 0.0008214 |
| C60 | -0.00013 | -0.000436 |
| C61 | -0.001388 | -0.004082 |
| C62 | 0 | 0 |
| C63 | 0 | 0 |
| C64 | 0 | 0 |
| C65 | 0 | 0 |
| C66 | 0 | 0 |

FIG. 23

| | second embodiment |
|---|---|
| aperture position | between first and second lenses |
| FOV(θ) | 80.519 ° |
| F number | 1.900 |
| TTL | 4.584 ㎜ |
| ImgH | 6.584 ㎜ |
| EFL | 3.887 |
| EPD | 2.045 |
| f1 | 4.376 |
| f2 | -10.547 |
| f3 | 6.258 |
| f4 | -5.655 |
| f5 | 2.609 |
| f6 | -2.058 |

FIG. 24

| distance from optical axis(mm) | slope angle(°) | | | | | | | | | | | | | |
|---|---|---|---|---|---|---|---|---|---|---|---|---|---|---|
| | first surface | second surface | third surface | fourth surface | fifth surface | sixth surface | seventh surface | eighth surface | ninth surface-X | ninth surface-Y | tenth surface-X | tenth surface-Y | eleventh surface | twelfth surface |
| 0(optical axis) | 0.000 | 0.000 | 0.000 | 0.000 | 0.000 | 0.000 | 0.000 | 0.000 | 0.000 | 0.000 | 0.000 | 0.000 | 0.000 | 0.000 |
| 0.2 | 7.346 | 2.570 | 2.290 | 4.014 | 2.833 | -0.791 | -0.837 | 1.966 | 3.152 | 3.186 | -3.794 | -3.707 | -5.664 | 3.706 |
| 0.4 | 14.762 | 4.655 | 2.720 | 6.268 | 5.353 | -1.815 | -4.032 | 0.722 | 5.533 | 5.588 | -5.882 | -5.840 | -12.372 | 5.217 |
| 0.6 | 22.361 | 5.941 | 0.496 | 5.622 | 6.066 | -3.844 | -11.334 | -5.918 | 5.441 | 5.554 | -6.133 | -6.020 | -20.145 | 3.947 |
| 0.8 | 30.271 | 6.242 | -3.053 | 6.838 | 3.214 | -9.996 | -26.067 | -18.886 | -0.558 | -0.313 | -5.883 | -5.618 | -27.438 | 0.433 |
| 1.0 | 38.594 | 4.149 | | | -1.774 | -27.457 | -50.553 | -34.560 | -18.202 | -17.886 | -7.888 | -7.459 | -31.878 | -4.330 |
| 1.2 | | | | | | | | -37.759 | -48.181 | -47.916 | -14.781 | -14.423 | -31.601 | -9.883 |
| 1.4 | | | | | | | | | | | -26.767 | -26.803 | -26.172 | -16.434 |
| 1.6 | | | | | | | | | | | -40.762 | -40.671 | -18.094 | -22.900 |
| 1.8 | | | | | | | | | | | -54.327 | -52.237 | -12.224 | -26.434 |
| 2.0 | | | | | | | | | | | | | -11.036 | -26.499 |
| 2.2 | | | | | | | | | | | | | -16.547 | -28.429 |
| 2.4 | | | | | | | | | | | | | | -38.578 |

FIG. 25

| distance(mm) | lens interval (mm) | | | | |
|---|---|---|---|---|---|
| | first lens/second lens | second lens/third lens | third lens/fourth lens | fourth lens/fifth lens | fifth lens/sixth lens |
| 0(optical axis) | 0.204 | 0.070 | 0.425 | 0.142 | 0.407 |
| 0.2 | 0.204 | 0.068 | 0.426 | 0.144 | 0.404 |
| 0.4 | 0.201 | 0.064 | 0.422 | 0.153 | 0.391 |
| 0.6 | 0.188 | 0.063 | 0.406 | 0.181 | 0.354 |
| 0.8 | 0.162 | 0.064 | 0.364 | 0.234 | 0.266 |
| 1.0 | 0.123 | | 0.269 | 0.308 | 0.194 |
| 1.2 | | | | 0.331 | 0.107 |
| 1.4 | | | | | 0.071 |
| 1.6 | | | | | 0.126 |
| 1.8 | | | | | 0.296 |
| 2.0 | | | | | |
| 2.2 | | | | | |
| 2.4 | | | | | |

FIG. 26

| distance(mm) | thickness of lens(mm) | | | | | |
|---|---|---|---|---|---|---|
| | first lens | second lens | third lens | fourth lens | fifth lens | sixth lens |
| 0(optical axis) | 0.688 | 0.230 | 0.424 | 0.330 | 0.590 | 0.350 |
| 0.2 | 0.680 | 0.233 | 0.417 | 0.335 | 0.578 | 0.366 |
| 0.4 | 0.654 | 0.242 | 0.399 | 0.349 | 0.544 | 0.414 |
| 0.6 | 0.605 | 0.258 | 0.368 | 0.367 | 0.502 | 0.489 |
| 0.8 | 0.528 | 0.278 | 0.329 | 0.389 | 0.470 | 0.586 |
| 1.0 | 0.410 | | | 0.444 | 0.476 | 0.695 |
| 1.2 | 0.237 | | | | 0.570 | 0.796 |
| 1.4 | | | | | | 0.862 |
| 1.6 | | | | | | 0.872 |
| 1.8 | | | | | | 0.831 |
| 2.0 | | | | | | 0.771 |
| 2.2 | | | | | | 0.716 |

FIG. 27

| distance from optical axis(mm) | Sag(㎜) | | | | | | | | | | | | | |
|---|---|---|---|---|---|---|---|---|---|---|---|---|---|---|
| | first surface | second surface | third surface | fourth surface | fifth surface | sixth surface | seventh surface | eighth surface | ninth surface-X | ninth surface-Y | tenth surface-X | tenth surface-Y | eleventh surface | twelfth surface |
| 0(optical axis) | 0.000 | 0.000 | 0.000 | 0.000 | 0.000 | 0.000 | 0.000 | 0.000 | 0.000 | 0.000 | 0.000 | 0.000 | 0.000 | 0.000 |
| 0.2 | 0.013 | 0.005 | 0.004 | 0.007 | 0.005 | -0.001 | -0.001 | 0.004 | 0.005591 | 0.005655 | -0.00678 | -0.00674 | -0.010 | 0.007 |
| 0.4 | 0.052 | 0.017 | 0.014 | 0.026 | 0.020 | -0.006 | -0.009 | 0.010 | 0.021184 | 0.021402 | -0.02426 | -0.02404 | -0.041 | 0.023 |
| 0.6 | 0.119 | 0.036 | 0.020 | 0.048 | 0.040 | -0.015 | -0.034 | 0.003 | 0.041512 | 0.042004 | -0.04594 | -0.04529 | -0.099 | 0.040 |
| 0.8 | 0.218 | 0.058 | 0.016 | 0.064 | 0.058 | -0.037 | -0.099 | -0.040 | 0.052491 | 0.053594 | -0.06706 | -0.06548 | -0.188 | 0.048 |
| 1.0 | 0.355 | 0.077 | | | 0.058 | -0.101 | -0.257 | -0.142 | 0.023613 | 0.02578 | -0.09044 | -0.08727 | -0.304 | 0.042 |
| 1.2 | | | | | | | | -0.298 | -0.10944 | -0.10581 | -0.12939 | -0.12416 | -0.430 | 0.017 |
| 1.4 | | | | | | | | | | | -0.20541 | -0.19836 | -0.542 | -0.030 |
| 1.6 | | | | | | | | | | | -0.34227 | -0.33336 | -0.623 | -0.102 |
| 1.8 | | | | | | | | | | | -0.56491 | -0.54701 | -0.676 | -0.195 |
| 2.0 | | | | | | | | | | | | | -0.716 | -0.295 |
| 2.2 | | | | | | | | | | | | | -0.763 | -0.397 |
| 2.4 | | | | | | | | | | | | | | -0.526 |

FIG. 28

| | first surface | second surface | third surface | fourth surface | fifth surface | sixth surface | seventh surface | eighth surface | ninth surface | tenth surface | eleventh surface | twelfth surface |
|---|---|---|---|---|---|---|---|---|---|---|---|---|
| K= | 0.2173 | 8.3351 | -9.8807 | 2.0958 | -10.5829 | -90.0252 | -90.9434 | -49.3173 | - | - | -1.0189 | -29.6659 |
| A4= | -0.0188 | -0.0567 | -0.1730 | -0.1636 | 0.0197 | -0.0083 | -0.2792 | -0.2726 | - | - | -0.1284 | -0.0958 |
| A6= | 0.0397 | -0.0398 | 0.0642 | -0.1381 | -0.0158 | -0.1351 | 0.4371 | 0.1395 | - | - | 0.0612 | 0.0115 |
| A8= | -0.1470 | 0.2394 | -0.2128 | 0.5004 | -0.8435 | -0.7346 | -1.7094 | -0.1847 | - | - | 0.0060 | 0.0305 |
| A10= | 0.2823 | -0.6512 | 1.4259 | -0.8700 | 3.4168 | -2.6901 | 5.1022 | -0.0315 | - | - | -0.0039 | -0.0275 |
| A12= | -0.3397 | 0.9969 | -4.0776 | 1.1037 | -7.5320 | 5.6324 | -10.5785 | 0.6244 | - | - | -0.0020 | 0.0111 |
| A14= | 0.2541 | -0.8690 | 6.5803 | -0.8160 | 10.1251 | -7.4188 | 14.0548 | -1.0723 | - | - | 0.0012 | -0.0025 |
| A16= | -0.1207 | 0.3953 | -6.2267 | 0.2240 | -8.0781 | 6.0735 | -11.6511 | 0.8623 | - | - | -0.0003 | 0.0003 |
| A18= | 0.0363 | -0.0741 | 3.2170 | 0.0519 | 3.4382 | -2.8325 | 5.5533 | -0.3374 | - | - | 0.0000 | 0.0000 |
| A20= | -0.0060 | 0.0011 | -0.7044 | -0.0276 | -0.5818 | 0.5744 | -1.1703 | 0.0515 | - | - | 0.0000 | 0.0000 |

FIG. 30

| | 0F | | 0.2F | | 0.4F | | 0.6F | | 0.8F | | 1.0F | |
|---|---|---|---|---|---|---|---|---|---|---|---|---|
| | RAD | TAN | RAD | TAN | RAD | TAN | RAD | TAN | RAD | TAN | RAD | TAN |
| 0 | 0.999 | 0.999 | 0.999 | 0.999 | 0.999 | 0.999 | 0.999 | 0.999 | 0.999 | 0.999 | 0.999 | 0.999 |
| 11 | 0.984 | 0.984 | 0.982 | 0.983 | 0.980 | 0.981 | 0.979 | 0.979 | 0.973 | 0.976 | 0.963 | 0.967 |
| 22 | 0.966 | 0.966 | 0.961 | 0.962 | 0.956 | 0.959 | 0.952 | 0.953 | 0.942 | 0.947 | 0.905 | 0.914 |
| 33 | 0.947 | 0.947 | 0.937 | 0.938 | 0.927 | 0.934 | 0.923 | 0.923 | 0.905 | 0.914 | 0.833 | 0.850 |
| 44 | 0.926 | 0.926 | 0.912 | 0.913 | 0.897 | 0.908 | 0.891 | 0.890 | 0.870 | 0.881 | 0.755 | 0.778 |
| 55 | 0.904 | 0.905 | 0.884 | 0.885 | 0.864 | 0.879 | 0.857 | 0.855 | 0.830 | 0.847 | 0.678 | 0.705 |
| 66 | 0.881 | 0.882 | 0.858 | 0.858 | 0.832 | 0.850 | 0.823 | 0.820 | 0.794 | 0.814 | 0.604 | 0.634 |
| 77 | 0.858 | 0.858 | 0.828 | 0.829 | 0.797 | 0.820 | 0.789 | 0.784 | 0.754 | 0.781 | 0.537 | 0.566 |
| 88 | 0.833 | 0.834 | 0.801 | 0.801 | 0.764 | 0.790 | 0.755 | 0.749 | 0.718 | 0.751 | 0.478 | 0.504 |
| 99 | 0.808 | 0.810 | 0.776 | 0.775 | 0.732 | 0.761 | 0.721 | 0.715 | 0.683 | 0.722 | 0.422 | 0.447 |
| 110 | 0.784 | 0.785 | 0.746 | 0.745 | 0.698 | 0.732 | 0.689 | 0.682 | 0.646 | 0.693 | 0.379 | 0.397 |

FIG. 32

| lens | surface | radius of curvature (mm) | thickness and Distance (mm) | refractive index | Abbe's Number |
|---|---|---|---|---|---|
| first lens | first surface | 1.527 | 0.658 | 1.511 | 56.999 |
| | second surface | 3.962 | 0.210 | | |
| second lens | third surface | 4.662 | 0.232 | 1.689 | 18.400 |
| | fourth surface | 2.726 | 0.063 | | |
| third lens | fifth surface | 4.148 | 0.442 | 1.511 | 56.914 |
| | sixth surface | -9.736 | 0.397 | | |
| fourth lens | seventh surface | -24.969 | 0.336 | 1.689 | 18.400 |
| | eighth surface | 5.857 | 0.034 | | |
| fifth lens | ninth surface | 2.816 | 0.800 | 1.622 | 24.0909 |
| | tenth surface | -5.108 | 0.304 | | |
| sixth lens | eleventh surface | -2.153 | 0.383 | 1.558 | 33.807 |
| | twelfth surface | 2.721 | 0.488 | | |
| filter | thirteenth surface | Infinity | 0.110 | | |
| | fourteenth surface | Infinity | 0.135 | | |
| image sensor | fifteenth surface | Infinity | | | |

FIG. 33

| order | fifth lens | |
|---|---|---|
| | ninth surface (S9) | tenth surface (S10) |
| C1 | -0.071591 | -0.137117 |
| C2 | 0 | 0 |
| C3 | 0 | 0 |
| C4 | -0.001224 | -0.002025 |
| C5 | -0.293316 | -0.086279 |
| C6 | 0 | 0 |
| C7 | 0 | 0 |
| C8 | 0 | 0 |
| C9 | 0 | 0 |
| C10 | 0 | 0 |
| C11 | -0.002879 | -0.007011 |
| C12 | 0.0006411 | 0.0029793 |
| C13 | -0.134856 | -0.082034 |
| C14 | 0 | 0 |
| C15 | 0 | 0 |
| C16 | 0 | 0 |
| C17 | 0 | 0 |
| C18 | 0 | 0 |
| C19 | 0 | 0 |
| C20 | 0 | 0 |
| C21 | 0 | 0 |
| C22 | 0.0001599 | 0.0009468 |
| C23 | -0.001571 | -0.002747 |
| C24 | 0.000684 | 0.00195 |
| C25 | -0.032495 | -0.023461 |
| C26 | 0 | 0 |
| C27 | 0 | 0 |
| C28 | 0 | 0 |
| C29 | 0 | 0 |
| C30 | 0 | 0 |
| C31 | 0 | 0 |
| C32 | 0 | 0 |
| C33 | 0 | 0 |
| C34 | 0 | 0 |
| C35 | 0 | 0 |
| C36 | 0 | 0 |
| C37 | 0 | 0 |
| C38 | -9.84E-06 | 6.247E-05 |
| C39 | -0.000632 | -0.000739 |
| C40 | 0.0002752 | 0.0004785 |
| C41 | -0.004532 | 0.0123054 |
| C42 | 0 | 0 |
| C43 | 0 | 0 |
| C44 | 0 | 0 |
| C45 | 0 | 0 |
| C46 | 0 | 0 |
| C47 | 0 | 0 |
| C48 | 0 | 0 |
| C49 | 0 | 0 |
| C50 | 0 | 0 |
| C51 | 0 | 0 |
| C52 | 0 | 0 |
| C53 | 0 | 0 |
| C54 | 0 | 0 |
| C55 | 0 | 0 |
| C56 | 0 | 0 |
| C57 | 0 | 0 |
| C58 | 0 | 0 |
| C59 | -0.000111 | 1.961E-05 |
| C60 | 5.102E-05 | 7.473E-05 |
| C61 | -0.00122 | -0.001006 |
| C62 | 0 | 0 |
| C63 | 0 | 0 |
| C64 | 0 | 0 |
| C65 | 0 | 0 |
| C66 | 0 | 0 |

FIG. 34

| | third embodiment |
|---|---|
| aperture position | between first and second lenses |
| FOV(θ) | 80.555 ° |
| F number | 2.000 |
| TTL | 4.600 ㎜ |
| ImgH | 6.584 ㎜ |
| EFL | 3.885 |
| EPD | 1.9425 |
| f1 | 4.454 |
| f2 | -10.025 |
| f3 | 5.751 |
| f4 | -6.859 |
| f5 | 2.892 |
| f6 | -2.093 |

FIG. 35

| distance from optical axis(mm) | slope angle(°) | | | | | | | | | | | | | |
|---|---|---|---|---|---|---|---|---|---|---|---|---|---|---|
| | first surface | second surface | third surface | fourth surface | fifth surface | sixth surface | seventh surface | eighth surface | ninth surface-X | ninth surface-Y | tenth surface-X | tenth surface-Y | eleventh surface | twelfth surface |
| 0(optical axis) | 0.000 | 0.000 | 0.000 | 0.000 | 0.000 | 0.000 | 0.000 | 0.000 | 0.000 | 0.000 | 0.000 | 0.000 | 0.000 | 0.000 |
| 0.2 | 7.512 | 2.823 | 2.135 | 3.920 | 2.761 | -1.220 | -0.880 | 1.418 | 2.552 | 2.579 | -3.695 | -3.651 | -5.529 | 3.817 |
| 0.4 | 15.120 | 5.251 | 2.436 | 6.098 | 5.192 | -2.765 | -4.042 | -0.093 | 4.325 | 4.389 | -6.110 | -6.006 | -12.127 | 5.647 |
| 0.6 | 22.975 | 7.017 | -0.042 | 5.281 | 5.885 | -5.380 | -11.391 | -6.727 | 3.643 | 3.761 | -6.931 | -6.742 | -19.915 | 4.811 |
| 0.8 | 31.318 | 8.033 | -4.242 | 3.535 | 3.827 | -11.922 | -26.240 | -19.341 | -2.746 | -2.537 | -7.336 | -.7039 | -27.299 | 1.861 |
| 1.0 | 40.708 | | | | | -31.244 | -53.325 | -34.697 | -20.086 | -19.839 | -9.897 | -9.501 | -31.836 | -2.241 |
| 1.2 | | | | | | | | -41.361 | -48.960 | -49.080 | -17.501 | -17.122 | -31.951 | -5.954 |
| 1.4 | | | | | | | | | | | -30.616 | -30.588 | -27.606 | -12.164 |
| 1.6 | | | | | | | | | | | -44.939 | -45.692 | -20.852 | -17.111 |
| 1.8 | | | | | | | | | | | -55.791 | -57.650 | -15.230 | -20.067 |
| 2.0 | | | | | | | | | | | | | -14.261 | -20.712 |
| 2.2 | | | | | | | | | | | | | | -22.381 |
| 2.4 | | | | | | | | | | | | | | -27.805 |

FIG. 36

| distance(mm) | lens interval (mm) | | | | |
|---|---|---|---|---|---|
| | first lens/second lens | second lens/third lens | third lens/fourth lens | fourth lens/fifth lens | fifth lens/sixth lens |
| 0(optical axis) | 0.210 | 0.063 | 0.397 | 0.150 | 0.400 |
| 0.2 | 0.209 | 0.060 | 0.398 | 0.152 | 0.397 |
| 0.4 | 0.204 | 0.056 | 0.397 | 0.161 | 0.384 |
| 0.6 | 0.187 | 0.056 | 0.385 | 0.186 | 0.350 |
| 0.8 | 0.153 | 0.056 | 0.349 | 0.235 | 0.287 |
| 1.0 | 0.098 | | 0.258 | 0.302 | 0.201 |
| 1.2 | | | | 0.326 | 0.121 |
| 1.4 | | | | | 0.094 |
| 1.6 | | | | | 0.160 |

FIG. 37

| distance(mm) | lens interval (mm) | | | | | |
|---|---|---|---|---|---|---|
| | first lens | second lens | third lens | fourth lens | fifth lens | sixth lens |
| 0(optical axis) | 0.658 | 0.232 | 0.442 | 0.336 | 0.588 | 0.383 |
| 0.2 | 0.650 | 0.235 | 0.435 | 0.341 | 0.576 | 0.399 |
| 0.4 | 0.624 | 0.245 | 0.414 | 0.352 | 0.546 | 0.447 |
| 0.6 | 0.577 | 0.260 | 0.381 | 0.367 | 0.508 | 0.523 |
| 0.8 | 0.501 | 0.283 | 0.334 | 0.388 | 0.479 | 0.624 |
| 1.0 | 0.384 | | | 0.448 | 0.487 | 0.738 |
| 1.2 | 0.281 | | | | 0.580 | 0.849 |
| 1.4 | | | | | | 0.931 |
| 1.6 | | | | | | 0.969 |
| 1.8 | | | | | | 0.965 |
| 2.0 | | | | | | 0.940 |

FIG. 38

| distance from optical axis(mm) | Sag(mm) | | | | | | | | | | | | | |
|---|---|---|---|---|---|---|---|---|---|---|---|---|---|---|
| | first surface | second surface | third surface | fourth surface | fifth surface | sixth surface | seventh surface | eighth surface | ninth surface-X | ninth surface-Y | tenth surface-X | tenth surface-Y | eleventh surface | twelfth surface |
| 0(optical axis) | 0.000 | 0.000 | 0.000 | 0.000 | 0.000 | 0.000 | 0.000 | 0.000 | 0.000 | 0.000 | 0.000 | 0.000 | 0.000 | 0.000 |
| 0.2 | 0.013 | 0.005 | 0.004 | 0.007 | 0.005 | -0.002 | -0.001 | 0.003 | 0.004543 | 0.004589 | -0.00667 | -0.00659 | -0.009 | 0.007 |
| 0.4 | 0.053 | 0.019 | 0.013 | 0.025 | 0.019 | -0.009 | -0.009 | 0.006 | 0.016966 | 0.017168 | -0.02432 | -0.02399 | -0.040 | 0.024 |
| 0.6 | 0.122 | 0.041 | 0.018 | 0.046 | 0.039 | -0.023 | -0.0134 | -0.004 | 0.031988 | 0.032501 | -0.04756 | -0.04672 | -0.097 | 0.043 |
| 0.8 | 0.225 | 0.068 | 0.010 | 0.061 | 0.057 | -0.051 | -0.100 | -0.049 | 0.035882 | 0.036957 | -0.07239 | -0.07070 | -0.186 | 0.056 |
| 1.0 | 0.370 | | | | | -0.125 | -0.264 | -0.152 | -0.00065 | 0.001316 | -0.10160 | -0.09866 | -0.301 | 0.055 |
| 1.2 | | | | | | | | -0.316 | -0.14044 | -0.13808 | -0.14856 | -0.14412 | -0.427 | 0.039 |
| 1.4 | | | | | | | | | | | -0.23687 | -0.23146 | -0.543 | 0.006 |
| 1.6 | | | | | | | | | | | -0.39405 | -0.39069 | -0.633 | -0.047 |
| 1.8 | | | | | | | | | | | -0.64048 | -0.64921 | -0.698 | -0.115 |
| 2.0 | | | | | | | | | | | | | -0.747 | -0.190 |
| 2.2 | | | | | | | | | | | | | | -0.268 |
| 2.4 | | | | | | | | | | | | | | -0.360 |

FIG. 39

| | first surface | second surface | third surface | fourth surface | fifth surface | sixth surface | seventh surface | eighth surface | ninth surface | tenth surface | eleventh surface | twelfth surface |
|---|---|---|---|---|---|---|---|---|---|---|---|---|
| K= | 0.2219 | 8.1901 | -11.0310 | 2.1899 | -7.9670 | -50.0000 | -36.2016 | -50.0000 | - | - | -0.8562 | -16.0989 |
| A4= | -0.0172 | -0.0545 | -0.1641 | -0.1682 | 0.0195 | -0.2740 | -0.2390 | -0.2740 | - | - | -0.1218 | -0.1274 |
| A6= | 0.0350 | -0.0171 | 0.0017 | -0.0401 | -0.1187 | -0.0619 | 0.1712 | 0.1833 | - | - | 0.0328 | 0.0670 |
| A8= | -0.1296 | 0.1198 | 0.1689 | -0.0618 | -0.0730 | 0.2960 | -0.4465 | -0.4781 | - | - | 0.0510 | -0.0209 |
| A10= | 0.2383 | -0.3639 | -0.2639 | 0.5686 | 0.2634 | -0.9470 | 0.9204 | 0.9217 | - | - | -0.0403 | 0.0017 |
| A12= | -0.2523 | 0.5643 | 0.3162 | -0.7531 | 0.0496 | 1.3922 | -1.4277 | -1.0942 | - | - | 0.0145 | 0.0009 |
| A14= | 0.1405 | -0.4383 | -0.2426 | 0.3783 | -0.4090 | -1.0228 | 1.1569 | 0.7549 | - | - | -0.0030 | -0.0003 |
| A16= | -0.0322 | 0.1318 | 0.0699 | -0.0600 | 0.2151 | 0.2920 | -0.3794 | -0.2715 | - | - | 0.0004 | 0.0000 |
| A18= | 0.0000 | 0.0000 | 0.0000 | 0.0000 | 0.0000 | 0.00000 | 0.0000 | 0.0394 | - | - | 0.0000 | 0.0000 |
| A20= | 0.0000 | 0.0000 | 0.0000 | 0.0000 | 0.0000 | 0.0000 | 0.0000 | 0.0000 | - | - | 0.0000 | 0.0000 |

FIG. 41

| | 0F | | 0.2F | | 0.4F | | 0.6F | | 0.8F | | 1.0F | |
|---|---|---|---|---|---|---|---|---|---|---|---|---|
| | RAD | TAN | RAD | TAN | RAD | TAN | RAD | TAN | RAD | TAN | RAD | TAN |
| 0 | 0.999 | 0.999 | 0.999 | 0.999 | 0.999 | 0.999 | 0.999 | 0.999 | 0.999 | 0.999 | 0.999 | 0.999 |
| 11 | 0.984 | 0.984 | 0.983 | 0.983 | 0.981 | 0.982 | 0.979 | 0.980 | 0.974 | 0.977 | 0.969 | 0.970 |
| 22 | 0.968 | 0.968 | 0.965 | 0.965 | 0.961 | 0.962 | 0.955 | 0.956 | 0.946 | 0.951 | 0.917 | 0.923 |
| 33 | 0.950 | 0.951 | 0.945 | 0.946 | 0.939 | 0.941 | 0.930 | 0.931 | 0.915 | 0.923 | 0.852 | 0.864 |
| 44 | 0.933 | 0.933 | 0.925 | 0.927 | 0.916 | 0.919 | 0.903 | 0.905 | 0.884 | 0.896 | 0.777 | 0.797 |
| 55 | 0.915 | 0.915 | 0.903 | 0.906 | 0.891 | 0.896 | 0.874 | 0.877 | 0.851 | 0.867 | 0.701 | 0.728 |
| 66 | 0.897 | 0.897 | 0.881 | 0.886 | 0.867 | 0.873 | 0.845 | 0.849 | 0.820 | 0.839 | 0.626 | 0.661 |
| 77 | 0.878 | 0.979 | 0.860 | 0.864 | 0.843 | 0.950 | 0.816 | 0.821 | 0.789 | 0.812 | 0.556 | 0.594 |
| 88 | 0859 | 0.860 | 0.837 | 0.843 | 0.818 | 0.825 | 0.787 | 0.793 | 0.756 | 0.784 | 0.495 | 0.534 |
| 99 | 0.840 | 0.841 | 0.816 | 0.822 | 0.794 | 0.802 | 0.758 | 0.765 | 0.727 | 0.758 | 0.438 | 0.476 |
| 110 | 0.821 | 0.822 | 0.793 | 0.800 | 0.768 | 0.778 | 0.729 | 0.737 | 0.695 | 0.731 | 0.387 | 0.425 |

OPTICAL MODULE

CROSS-REFERENCE TO RELATED APPLICATIONS

This application is the U.S. national stage application of International Patent Application No. PCT/KR2022/012822, filed Aug. 26, 2022, which claims the benefit under 35 U.S.C. § 119 of Korean Application No. 10-2021-0114290, filed Aug. 27, 2021, the disclosures of each of which are incorporated herein by reference in their entirety.

TECHNICAL FIELD

The embodiment relates to an optical module capable of realizing high resolution and miniaturization.

BACKGROUND ART

Camera modules perform the function of photographing objects and saving them as images or videos, and are installed in various applications. In particular, the camera module is manufactured in an ultra-small size and is applied to not only portable devices such as smartphones, tablet PCs, and laptops, but also drones and vehicles, providing various functions.

For example, an optical system of the camera module may include an imaging lens that forms an image, and an image sensor that converts the formed image into an electrical signal. At this time, the camera module may perform an autofocus (AF) function that automatically adjusts a distance between the image sensor and the imaging lens to align the focal length of the lens, and may focus on distant objects through a zoom lens. The zooming function of zoom up or zoom out may be performed by increasing or decreasing the magnification of the camera. In addition, the camera module adopts image stabilization (IS) technology to correct or inhibit image shake caused by camera movement due to an unstable fixation device or the user's movement.

The most important element for this camera module to obtain an image is the imaging lens that forms the image. Recently, interest in high resolution has been increasing, and research using multiple lenses is being conducted to achieve this. In addition, research using a plurality of imaging lenses with positive (+) or negative (−) refractive power is being conducted to realize high resolution.

In addition, recently, as the front display of smartphones equipped with a camera module is required, the form factor of the front camera is continuously changing, and as a result, an under display camera that hides the front camera under the display is being applied.

However, when the camera is placed at the bottom of the display, problems such as deterioration in image quality of the camera module, reduction in brightness, and occurrence of ghosts/flares occur due to loss of light due to the display panel. In particular, as brightness drops to 20% of the existing level, a new optical structure that may compensate for the brightness of the camera is required.

Therefore, an optical system with a new structure that may have improved resolution and improved illuminance regardless of the position of the camera is required.

DISCLOSURE

Technical Problem

The embodiment seeks to provide an optical system that has improved resolution, improved illuminance, and improved optical characteristics and can be miniaturized.

Technical Solution

An optical module according to an embodiment includes a sensor; and an optical system including a first lens, a second lens, a third lens, a fourth lens, a fifth lens, and a sixth lens arranged sequentially along an optical axis from the object side to the sensor side, wherein at least one of the object side surface and the sensor side surface of the fifth lens includes a freeform surface, and the fourth lens satisfies Equation A below, $$|\max\ Sag\_O\_x\_5| \neq |\max\ Sag\_O\_y\_5| \quad \text{[Equation A]}$$

(In equation A, max |Sag_O_x_5| means an absolute value of a maximum Sag value in a X-axis direction on the object side surface of the fifth lens, and max |Sag_O_y_5| means an absolute value of a maximum Sag value in a Y-axis direction on the object side surface of the fifth lens.)

The optical system satisfies the following Equations 1 to 3

$$60° \leq FOV \leq 90° \quad \text{[Equation 1]}$$

(FOV in Equation 1 means an angle of view.)

$$0.50 \leq TTL/ImgH \leq 1.0 \quad \text{[Equation 2]}$$

(In Equation 2, TTL means a distance in the optical axis direction from a vertex of the object side surface of the first lens to an image surface of an image sensor unit, and ImgH means twice the diagonal distance from the image surface of the image sensor unit overlapping the optical axis to the 1.0 field region of an image sensor.)

$$CA\_O\_x < CA\_O\_5 \quad \text{[Equation 3]}$$

(In Equation 3, CA_O_x means an effective diameter of the object side surface of the lens closest to an aperture among the lenses between the aperture and the sensor, and CA_O_5 means an effective diameter of the object side surface of the fifth lens.)

Advantageous Effects

The optical system and camera module according to the embodiment may have improved optical characteristics. In detail, the optical system may have improved aberration characteristics, resolution, etc. as a plurality of lenses have a set shape, refractive power, thickness, interval, etc.

Additionally, the optical system and camera module according to the embodiment may have improved distortion and aberration control characteristics and may have good optical performance not only in a center portion but also in a peripheral region of the field of view (FOV).

Additionally, the optical system according to the embodiment may have improved optical characteristics and a small TTL (Total Track Length), so the optical system and the camera module including the same may be provided in a slim and compact structure.

Additionally, the embodiment includes six lenses sequentially arranged along the optical axis in the direction from the object side to the sensor side, and at least one of the object side surface and sensor side surface of the fifth lens among the six lenses may be formed as a freeform surface.

In detail, at least one of the object side surface and the sensor side surface of the fifth lens may have a Sag value and a change in the Sag value defined by equations, and the free curved shape of at least one of the object side surface or the sensor side surface of the fifth lens may be defined by the Sag value and a change value of the Sag value defined by the above equations.

Accordingly, when light passes through the fifth lens and moves to the image sensor unit, a relative illumination of the light incident on the image sensor unit can be improved. In detail, the relative illumination of the light passing through the fifth lens and incident on the image sensor unit may be 30% or more. In detail, the relative illumination of the light passing through the fifth lens and incident on the image sensor unit may be 35% or more. In detail, the relative illumination of the light passing through the fifth lens and incident on the image sensor unit may be 45% or more.

Accordingly, the camera module including the optical system can compensate for a decrease in the amount of light that may vary depending on the position of the display device. That is, the camera module including the optical system can secure sufficient brightness of light without being affected by the position of the display device, thereby realizing improved resolution.

Therefore, the optical system according to the embodiment can increase the amount of light incident on the image sensor unit while maintaining the size of the lenses and improved optical characteristics without enlarging an aperture of the lenses, in order to increase the amount of light incident on the image sensor unit.

Additionally, the optical module according to the embodiment can implement miniaturization of the optical system and optical module by using a fifth lens having a freeform surface.

In detail, the optical module according to the embodiment can improve the relative illumination while reducing the size of the optical system and optical module.

If there is no fifth lens including a freeform surface, the TTL (distance in the optical axis direction of the first lens and the image sensor unit) of the optical system must be increased to improve the relative illumination, but the optical module according to the embodiment can improve the relative illumination without increasing TTL by controlling the direction of movement of light by a fifth lens including a freeform surface.

That is, the optical module according to the embodiment can reduce a size of TTL by 10% to 20% compared to an optical module that does not include a fifth lens including a freeform surface. Accordingly, the optical module can be miniaturized, and the optical module can be easily applied to various display devices.

Additionally, the optical module according to the embodiment may have an improved MTF and improved resolution by a fifth lens having a freeform surface.

In detail, the optical module according to the embodiment may have improved MTF characteristics by increasing the amount of light incident on the image sensor unit to the fifth lens having a freeform surface.

In addition, the optical module according to the embodiment improves the relative illumination of the light incident on the image sensor unit, thereby inhibiting a decrease in resolution due to post-processing after image acquisition.

In other words, an optical module that does not include a lens with a freeform surface has a low relative illumination of the image sensor unit, so a post-processing process is required to obtain the image through the image sensor unit and then adjust the image size to be implemented. Accordingly, the resolution of the optical module may deteriorate during this post-processing process.

However, the optical module according to the embodiment increases the relative illumination of the image sensor unit by using a lens having a freeform surface, and as a result, post-processing is not required or resolution is not significantly reduced due to the post-processing process, so it may have improved resolution.

DESCRIPTION OF DRAWINGS

FIG. 6 is a graph for explaining Sag values at various angles of the optical system and the fifth lens of the optical module according to the embodiment.

FIG. 9 is a table for explaining the lenses of the optical system and optical module according to the first embodiment.

FIG. 10 is a table explaining the optical system and the fifth lens of the optical module according to the first embodiment.

FIGS. 11*a*-11*c* are tables explaining the optical system and the fifth lens of the optical module according to the embodiment.

FIG. 12 is a table explaining specific values of the optical system and optical module according to the first embodiment.

FIGS. 13 to 17 are tables for explaining the slope angle, interval, thickness, Sag value, and aspheric coefficient of the lenses of the optical system and optical module according to the first embodiment.

FIG. 19 is a table explaining the MTF characteristics of the optical system and optical module according to the first embodiment.

FIG. 21 is a table for explaining the lenses of the optical system and optical module according to the second embodiment.

FIG. 22 is a table explaining the optical system and the fifth lens of the optical module according to the second embodiment.

FIG. 23 is a table explaining specific values of the optical system and optical module according to the second embodiment.

FIGS. 24 to 28 are tables explaining the slope angle, interval, thickness, Sag value, and aspherical coefficient of the lenses of the optical system and optical module according to the second embodiment.

FIG. 30 is a table explaining the MTF characteristics of the optical system and optical module according to the second embodiment.

FIG. 32 is a table for explaining the lenses of the optical system and optical module according to the third embodiment.

FIG. 33 is a table explaining the optical system and the fifth lens of the optical module according to the third embodiment.

FIG. 34 is a table explaining specific values of the optical system and optical module according to the third embodiment.

FIGS. 35 to 39 are tables explaining the slope angle, interval, thickness, Sag value, and aspherical coefficient of the lenses of the optical system and optical module according to the third embodiment.

FIG. 41 is a table explaining the MTF characteristics of the optical system and optical module according to the third embodiment.

MODE FOR INVENTION

Figure 1:
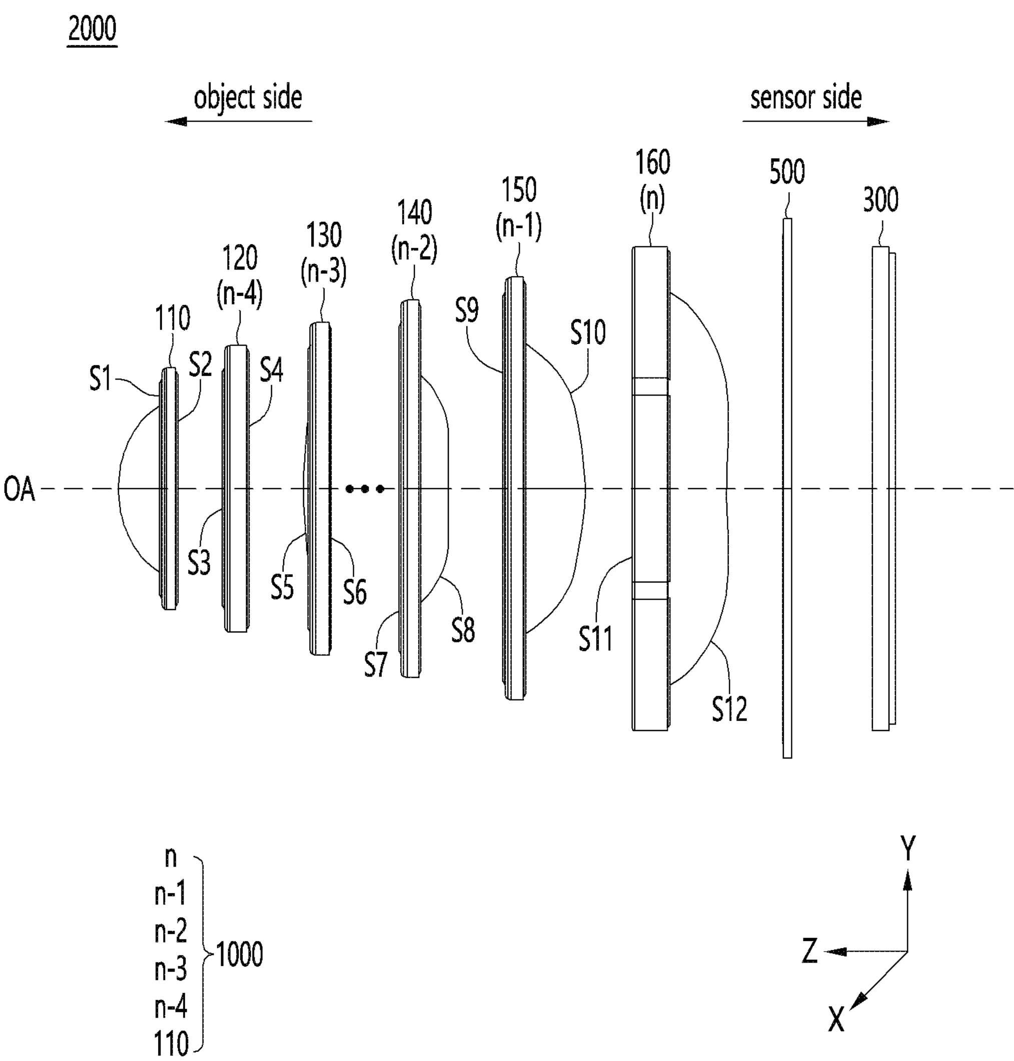
FIG. 1 is a diagram showing the configuration of an optical system and an optical module according to an embodiment.

Hereinafter, preferred embodiments of the invention will be described in detail with reference to the accompanying drawings.

A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. The terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component.

In the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

In the following description, the first lens refers to the lens closest to the object side, and the last lens (n-th lens) refers to the lens closest to the sensor side. Additionally, unless otherwise specified, the units for lens radius, effective diameter, thickness, interval, BFL (Back focal length), TTL (Total track length or Total top length), etc. are all mm.

Additionally, a shape of the lens is expressed based on the optical axis of the lens. For example, the fact that the object-side surface of the lens is convex means that a vicinity of the optical axis on the object-side surface of the lens is convex, and does not mean that a periphery of the optical axis is convex. Therefore, even if the object-side surface of the lens is described as convex, the periphery region of the optical axis on the object-side surface of the lens may be concave. In addition, "object-side surface" may refer to a surface of the lens facing the object side based on the optical axis, and "sensor side surface (image side surface) may be defined as a surface of the lens facing the imaging surface based on the optical axis.

Additionally, a critical point of the lens is defined as the point on the lens surface that becomes 0 during the first differentiation. In detail, the critical point means a point at which the sign of the slope value for the optical axis OA and the direction perpendicular to the optical axis OA changes from positive (+) to negative (−) or from negative (−) to positive (+), where the slope value is 0. Here, the critical point is the point where convexity and concavity change, and may mean the point where the sign changes from positive (+) to negative (−) or from negative (−) to positive (+) during the second differentiation. The critical point may be a point where the sign of refractive power changes. The critical point may be a point where the sign of the slope angle changes.

Additionally, the Sag value of the object side surface of the lens may be defined as the distance in the optical axis direction between an arbitrary point on the object side surface of the lens and the point of contact between the optical axis and the object side surface of the lens. Additionally, the Sag value of the sensor side surface of the lens may be defined as the distance in the optical axis direction between an arbitrary point on the sensor side surface of the lens and the contact point between the optical axis and the sensor side surface of the lens.

Additionally, a size of the Sag value described below may be compared based on the absolute value of the Sag value.

In addition, in the X-axis (first direction), Y-axis (second direction), and Z-axis direction (third direction) shown in the drawing, the Z-axis direction (third direction) may refer to an optical axis direction or a direction parallel to the optical axis direction.

Hereinafter, for convenience of explanation, the X-axis direction (first direction) is defined as a direction perpendicular to the Z-axis direction (third direction) on the same plane, and the Y-axis direction (second direction) may be defined as a direction perpendicular to the Z-axis direction (third direction) in a different plane.

Additionally, the X-axis direction (first direction), the Y-axis direction (second direction), and the Z-axis direction (third direction) may be defined as vertical directions in the same plane or another plane.

Hereinafter, an optical system, an optical module including the optical system, and a camera module including the optical system and the optical module according to embodiments will be described with reference to the drawings.

Referring to FIG. 1, an optical system 1000 according to an embodiment may include a plurality of lenses. For example, the optical system 1000 may include n lenses. In detail, the optical system 1000 may include a first lens 110 to an n-th lens (n).

In detail, the optical system 1000 may include the first lens 110 to the nth lens (n) sequentially arranged from the object side to the sensor side. At this time, n may include a natural number of 2 or more. In detail, n may be a natural number having a value of 2 to 5.

FIG. 1 show that the optical system 1000 according to the embodiment includes six lenses such as a first lens 110, a second lens 120, a third lens 130, a fourth lens 140, a fifth lens 150 and a sixth lens 160, but the embodiment is not limited thereto, and the optical system 1000 may include two to four lenses.

That is, when n has a value of 6 in the optical system 1000 according to the embodiment, the optical system 1000 may include a first lens, a second lens, a third lens, a fourth lens, a fifth lens and a sixth lens. That is, if n has a value of 6, a n−4th lens may be a second lens, and a n−3th lens may be a third lens, a n−2th lens may be a fourth lens, and a n−1th lens may be a fifth lens, and a n-th lens may be the fifth lens.

Hereinafter, for convenience of explanation, it will be mainly described that the optical system 1000 according to the embodiment includes six lenses, a first lens 110, a second lens 120, a third lens 130, a fourth lens 140, a fifth lens 150 and a sixth lens 160.

Referring to FIG. 1, the optical system 1000 may further include an image sensor unit 300 and a filter unit 500 to form an optical module 2000.

That is, the optical module 200 may include an optical system 1000 including n lenses described above, and a filter unit 500 and an image sensor unit 300 disposed in the sensor side direction of the optical system.

The first lens 110, the second lens 120, the third lens 130, the fourth lens 140, the fifth lens 150 and the sixth lens 160 may be sequentially arranged along the optical axis OA of the optical system 1000.

Light corresponding to information of an object disposed on the object side may sequentially pass through the first lens 110, the second lens 120, the third lens 130, the fourth lens 140, the fifth lens 150 and the sixth lens 160 and the filter unit 500 and be incident on the image sensor unit 300.

The first lens 110, the second lens 120, the third lens 130, the fourth lens 140, the fifth lens 150 and the sixth lens 160 may each include an effective region and a non-effective region. The effective region may be an effective diameter through which light incident on each lens of the first lens 110, the second lens 120, the third lens 130, the fourth lens 140, the fifth lens 150 and the sixth lens 160 passes. That is, the effective region may be defined as a region in which the incident light is refracted to realize optical characteristics.

The effective diameter (effective region) of the lens may be related to an inner diameter of a spacer disposed between the lenses. That is, the effective diameter of the lens may be related to the inner diameter of the spacer disposed between surfaces of adjacent lenses.

In detail, the effective diameter of the lens may be the same as or different from the inner diameter of the spacer disposed between the surfaces of adjacent lenses. More specifically, the effective diameter of the lens may be less than or greater than the inner diameter of the spacer disposed between the surfaces of adjacent lenses.

More specifically, the effective diameter of the lens may have a size within ±0.4 mm of the inner diameter of the spacer disposed between the surfaces of adjacent lenses. More specifically, the effective diameter of the lens may have a size within ±0.3 mm of the inner diameter of the spacer disposed between the surfaces of adjacent lenses. More specifically, the effective diameter of the lens may have a size within ±0.2 mm of the inner diameter of the spacer disposed between the surfaces of adjacent lenses. More specifically, the effective diameter of the lens may have a size within ±0.1 mm of the inner diameter of the spacer disposed between the surfaces of adjacent lenses.

Alternatively, the effective diameter of the lens may be related to the inner diameter of a flange portion of the lens on which the spacer is supported.

In detail, the effective diameter may be 2 mm or less, 1 mm or less, or 0.3 mm or less relative to the inner diameter of the flange portion.

The non-effective region may be arranged around the effective region. The non-effective region may be arranged on the periphery of the effective region. That is, a region excluding the effective region of the lens may be a non-effective region. The non-effective region may be a region where the light is not incident. That is, the non-effective region may be a region unrelated to the optical characteristics. Additionally, the non-effective region may be a region fixed to a barrel (not shown) that accommodates the lens.

The optical system 1000 according to the embodiment may include an aperture (or aperture stop) (not shown) to control the amount of incident light. At least one aperture may be disposed between two adjacent lenses among the first lens 110, the second lens 120, the third lens 130, the fourth lens 140, the fifth lens 150 and the six lens 160. For example, the aperture may be disposed between the first lens 110 and a lens closest to the first lens 110. For example, the aperture may be disposed between the first lens 110 and the second lens 120.

In addition, at least one lens among the first lens 110, the second lens 120, the third lens 130, the fourth lens 140, the fifth lens 150 and the six lens 160 may serve as an aperture. For example, the object side or sensor side of at least one of the first lens, the second lens, the third lens, the fourth lens or the fifth lenses 150 may function as an aperture to adjust the amount of light. Accordingly, the overall length of the optical system can be reduced by removing the aperture disposed between the lenses, thereby making it possible to miniaturize the optical system.

At least one lens among the first lens 110, the second lens 120, the third lens 130, the fourth lens 140, the fifth lens 150 and the six lens 160 may include a freeform surface on at least one surface of the lens. That is, at least one lens among the first lens 110, the second lens 120, the third lens 130, the fourth lens 140, or the fifth lens 150 may be a freeform lens.

A freeform lens in which at least one surface of the lens has a freeform surface will be described in detail below.

The first lens 110 may have positive (+) refractive power on the optical axis. The first lens 110 may include plastic or glass. For example, the first lens 110 may be made of plastic.

The first lens 110 may include a first surface S1 defined as an object side surface and a second surface S2 defined as a sensor side surface. The first surface S1 may be convex with respect to the object side surface on the optical axis, and the second surface S2 may be concave with respect to the sensor side surface on the optical axis. That is, the first lens 110 may overall have a meniscus shape convex from the optical axis toward the object side.

At least one of the first surface S1 or the second surface S2 may be an aspherical surface. For example, both the first surface S1 and the second surface S2 may be aspherical.

In the first lens 110, an effective diameter of the first surface S1 of on the object side may be different from the effective diameter of the second surface S2 on the sensor side. For example, the effective diameter of the first side S1 of the first lens 110 may be larger than the effective diameter of the second side S2.

The second lens 120 may have negative refractive power on the optical axis. The second lens 120 may include plastic or glass. For example, the second lens 120 may be made of plastic.

The second lens 120 may include a third surface S3 defined as the object side surface and a fourth surface S4 defined as the sensor side surface. The third surface S3 may be convex with respect to the object side surface on the optical axis, and the fourth surface S4 may be concave with respect to the sensor side surface on the optical axis. That is, the second lens 120 may overall have a meniscus shape convex from the optical axis toward the object side.

At least one of the third surface S3 or the fourth surface S4 may be an aspherical surface. For example, both the third surface S3 and the fourth surface S4 may be aspherical.

The second lens 120 may include a critical point. In detail, at least one of the third and fourth surfaces S3 and S4, which are the object side surface and the sensor side surface of the second lens 120, may include a critical point. For example, the third surface S3 of the second lens 120 may include a critical point.

An effective diameter of the third surface S3 of the second lens 120 on the object side may be different from an effective diameter of the fourth surface S4 on the sensor side. For example, the effective diameter of the third surface S3 of the second lens 120 may be smaller than the effective diameter of the fourth surface S4.

The third lens 130 may have positive (+) or negative (−) refractive power on the optical axis. The third lens 130 may include plastic or glass. For example, the third lens 130 may be made of plastic.

The third lens 130 may include a fifth surface S5 defined as an object side surface and a sixth surface S6 defined as a sensor side surface. The fifth surface S5 may be convex with respect to the object side surface on the optical axis, and the sixth surface S6 may be concave with respect to the sensor side surface on the optical axis. That is, the third lens 130 may have an overall meniscus shape convex from the optical axis to toward object side. Alternatively, the fifth surface S5 may be convex with respect to the object side surface on the optical axis, and the sixth surface S6 may be convex with respect to the sensor side surface on the optical axis. That is, the third lens 130 may have an overall shape in which both sides are convex on the optical axis. Alternatively, the fifth surface S5 may be concave with respect to the object side surface on the optical axis, and the sixth surface S6 may be concave with respect to the sensor side surface on the optical axis. That is, the third lens 130 may have an overall shape where both sides are concave on the optical axis. Alternatively, the fifth surface S5 may be concave with respect to the object side surface of the optical axis, and the sixth surface S6 may be convex with respect to the sensor side surface on the optical axis. That is, the third lens 130 may overall have a meniscus shape convex from the optical axis toward the sensor side.

At least one of the fifth surface S5 or the sixth surface S6 may be an aspherical surface. For example, both the fifth surface S5 and the sixth surface S6 may be aspherical.

An effective diameter of the fifth surface S5 of the third lens 130 on the object side may be different from an effective diameter of the sixth surface S6 on the sensor side. For example, the effective diameter of the fifth surface S5 of the third lens 130 may be smaller than the effective diameter of the sixth surface S6.

The fourth lens 140 may have positive (+) or negative (−) refractive power on the optical axis. The fourth lens 140 may include plastic or glass. For example, the fourth lens 140 may be made of plastic.

The fourth lens 140 may include a seventh surface S7 defined as an object side surface and a eighth surface S8 defined as a sensor side surface. The seventh surface S7 may be convex with respect to the object side surface on the optical axis, and the eighth surface S8 may be concave with respect to the sensor side surface on the optical axis. That is, the fourth lens 140 may have an overall meniscus shape convex from the optical axis to toward object side. Alternatively, the seventh surface S7 may be convex with respect to the object side surface on the optical axis, and the eighth surface S8 may be convex with respect to the sensor side surface on the optical axis. That is, the fourth lens 140 may have an overall shape in which both sides are convex on the optical axis. Alternatively, the seventh surface S7 may be concave with respect to the object side surface on the optical axis, and the eighth surface S8 may be concave with respect to the sensor side surface on the optical axis. That is, the fourth lens 140 may have an overall shape where both sides are concave on the optical axis. Alternatively, the seventh surface S7 may be concave with respect to the object side surface on the optical axis, and the eighth surface S8 may be convex with respect to the sensor side surface on the optical axis. That is, the fourth lens 140 may overall have a meniscus shape convex from the optical axis toward the sensor side.

At least one of the seventh surface S7 and the eighth surface S8 may be an aspherical surface. For example, both the seventh surface S7 and the eighth surface S8 may be aspherical.

The fourth lens 140 may include a critical point. In detail, at least one of the seventh surface S7 or eighth surface S8, which are the object side surface and the sensor side surface of the fourth lens 140, may include a critical point. For example, the seventh surface S7 and eighth surface S8 of the fourth lens 140 may include a critical point.

An effective diameter of the seventh surface S7 of the fourth lens 140 on the object side may be different from an effective diameter of the eighth surface S8 on the sensor side. For example, the effective diameter of the seventh surface S7 of the fourth lens 140 may be smaller than the effective diameter of the eighth surface S8.

The fifth lens 150 may have positive (+) refractive power at the optical axis. The fifth lens 150 may include plastic or glass. For example, the fifth lens 150 may be made of plastic.

The fifth lens 150 may include a ninth surface S9 defined as an object side surface and a tenth surface S10 defined as a sensor side surface. The ninth surface S9 may be convex with respect to the object side surface on the optical axis, and the tenth surface S10 may be convex with respect to the sensor side surface of the optical axis. That is, the fifth lens 150 may have an overall shape where both sides are convex on the optical axis.

At least one of the ninth surface S9 and the tenth surface S10 may be a free-form surface. That is, the fifth lens 150 may be a freeform lens.

The fifth lens 150 may include a critical point. In detail, at least one of the ninth surface S9 or the tenth surface S10, which are the object side surface and the sensor side surface of the fifth lens 150, may include a critical point. For example, the ninth surface S9 of the fifth lens 150 may include a critical point.

An effective diameter of the ninth surface S9 on the object side of the fifth lens 150 may be different from an effective diameter of the tenth surface S10 on the sensor side. For example, the effective diameter of the ninth surface S9 of the fifth lens 150 may be smaller than the effective diameter of the tenth surface S10.

The fifth lens, which is a freeform lens, will be described in detail below.

The sixth lens 160 may have negative refractive power on the optical axis. The sixth lens 160 may include plastic or glass. For example, the sixth lens 160 may be made of plastic.

The sixth lens 160 may include an eleventh surface S11 defined as the object side surface and a twelfth surface S12 defined as the sensor side surface. The eleventh surface S11 may be concave with respect to the object side surface on the optical axis, and the twelfth surface S12 may be concave with respect to the sensor side surface on the optical axis. That is, the sixth lens 160 may have an overall shape in which both sides are concave on the optical axis.

At least one of the eleventh surface S11 and the twelfth surface S12 may be an aspherical surface. For example, both the eleventh surface S11 and the twelfth surface S12 may be aspherical.

The eleventh surface S11 and the twelfth surface S12, which are the object side surface and the sensor side surface of the sixth lens 160, may include a critical point. For example, the twelfth surface S12 of the sixth lens 160 may include a critical point.

An effective diameter of the eleventh surface S11 of the sixth lens 160 on the object side may be different from an effective diameter of the twelfth surface S12 on the sensor side. For example, the effective diameter of the eleventh surface S11 of the sixth lens 160 may be smaller than the effective diameter of the twelfth surface S12.

As previously described, at least one lens among the first lens 110, the second lens 120, the third lens 130, the fourth lens 140, the fifth lens 150 and the sixth lens 160 may be formed in a freeform shape.

For example, among the lenses of the optical system 1000, a lens disposed close to the image sensor unit 300 may be formed in a freeform shape. For example, the fifth lens 150 may be formed in a freeform shape. That is, when the optical system 1000 includes n lenses, the n−1th lens may be formed in a freeform shape.

For convenience of explanation, it will be mainly described that the fifth lens 150 is a freeform lens.

At least one of the ninth surface S9 and the tenth surface S10 of the fifth lens 150 may be formed in a freeform shape. In detail, at least one of the ninth surface S9 and the tenth surface S10 may include a freeform surface. For example, the fifth lens 150 has one of the ninth surface S9 and the tenth surface S10 having a freeform surface, or both the ninth surface S9 and the tenth surface S10 may have freeform surfaces.

The fifth lens 150 may have a double plane symmetrical shape. In detail, the fifth lens 150 may have a shape that is symmetrical to the X-Z plane and symmetrical to the Y-Z plane. Additionally, the fifth lens 150 may have a shape that is asymmetrical to the X-Y plane. That is, the fifth lens 150 may have a symmetrical shape in the X and Y axes and an asymmetrical shape in the Z axis.

Figure 2:
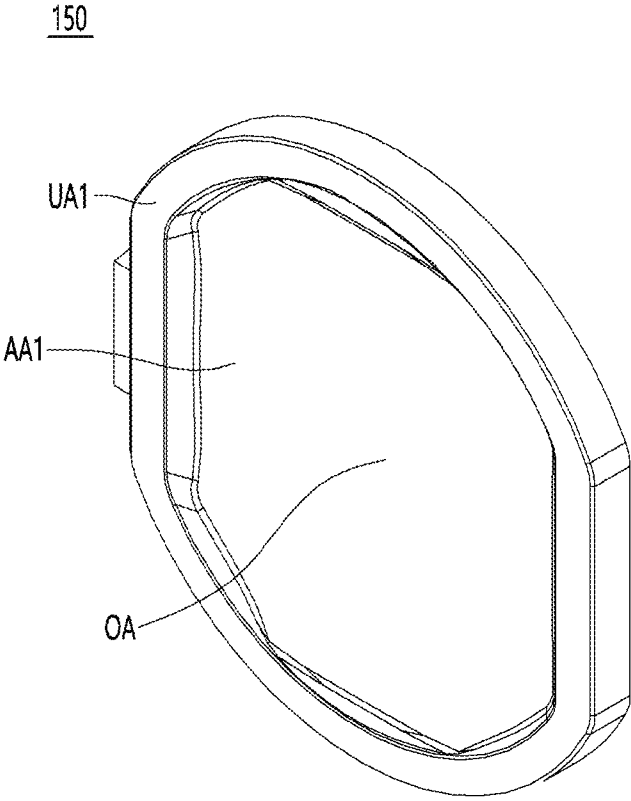
FIGS. 2 and 3 are diagrams for explaining an object side surface of an optical system and a fifth lens of an optical module according to an embodiment.
Figure 3:
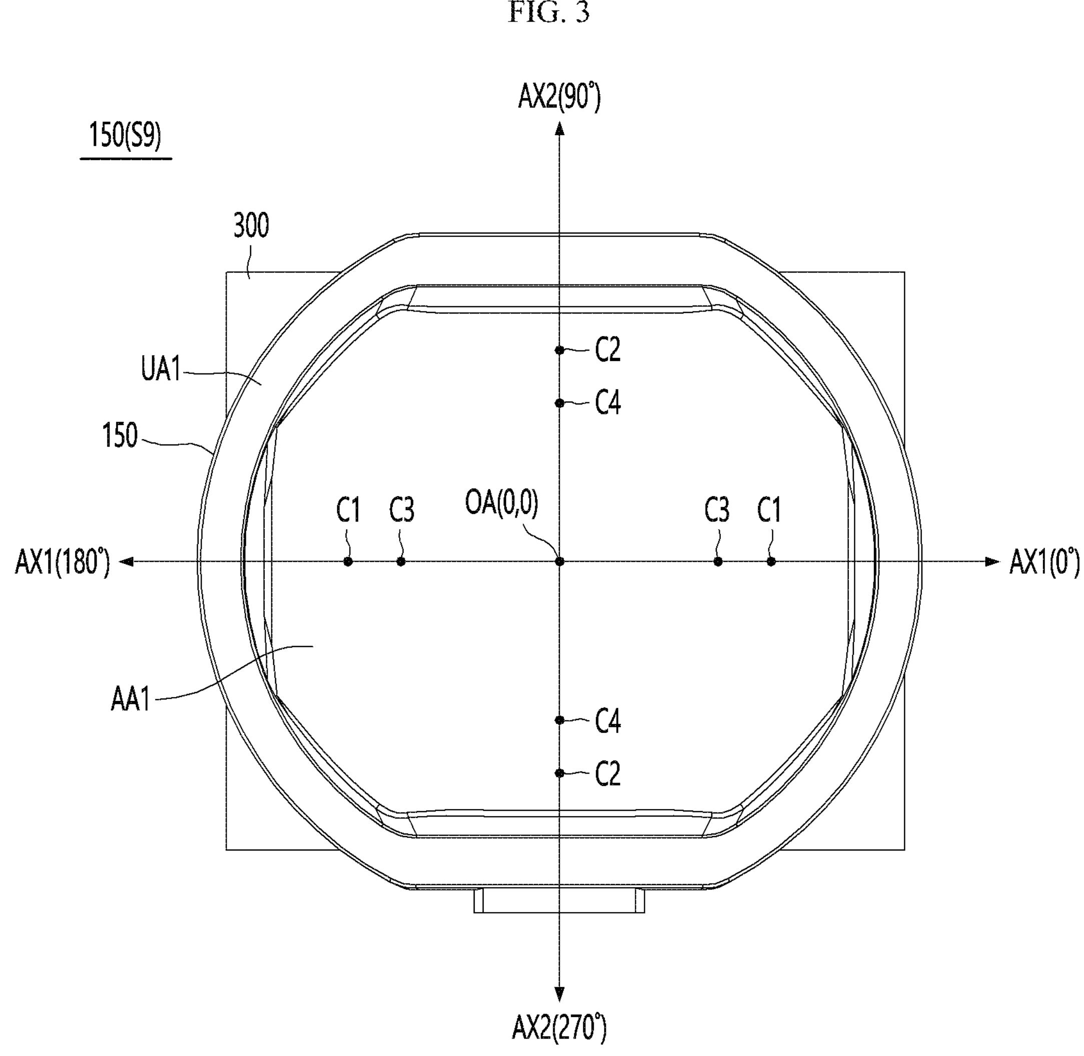

FIGS. 2 and 3 are diagrams for explaining the freeform surface of the ninth surface S9 of the fifth lens 150.

Referring to FIG. 2, the ninth surface S9 of the fifth lens 150 may include a first effective region AA1 and a first ineffective region UA1. In detail, the ninth surface S9 of the fifth lens 150 may include the first effective region AA1, which is a region through which light incident on the fifth lens 150 passes. Light incident on the fifth lens 150 may be refracted in the first effective region AA1 of the ninth surface S9 of the fifth lens 150 to implement optical characteristics.

Additionally, the ninth surface S9 of the fifth lens 150 may include a first ineffective region UA1, which is a region through which light incident on the fifth lens 150 does not pass. Light incident on the fifth lens 150 may not pass through the first ineffective region UA1 of the fifth lens 150. Accordingly, the first ineffective region UA1 of the ninth surface S9 may be unrelated to the optical characteristics of light incident on the fifth lens 150. Additionally, a portion of the first ineffective region UA1 may be fixed to the barrel accommodating the fifth lens 150.

Referring to FIG. 3, a virtual axis for setting the coordinates of the ninth surface S9 of the fifth lens 150 may be set.

In detail, a first axis AX1 and a second axis AX2 may be set on the ninth surface S9 of the fifth lens 150. The first axis AX1 may be defined as a direction parallel to the longitudinal direction of the long axis of the image sensor unit 300. That is, the first axis AX1 may be defined as an axis that passes through the optical axis OA and extends in a direction parallel to the long axis of the image sensor unit 300.

Additionally, the second axis AX2 may be defined as a direction parallel to the minor axis longitudinal direction of the image sensor unit 300. That is, the second axis AX2 may be defined as an axis that passes through the optical axis OA and extends in a direction parallel to the minor axis of the image sensor unit 300.

For example, the first axis AX1 may be defined as the X-axis direction and may be defined as an axis having angles of 0° and 180° with respect to the optical axis OA. Additionally, the second axis AX2 may be defined as the Y-axis direction and may be defined as an axis having angles of 90° and 270° with respect to the optical axis OA.

However, the embodiment is not limited to this, and the first axis may be defined as the Y-axis direction, and the second axis may be defined as the X-axis direction. Hereinafter, for convenience of explanation, the description will focus on the case where the first axis AX1 is defined in the X-axis direction and the second axis AX2 is defined in the Y-axis direction.

The first axis AX1 and the second axis AX2 may be perpendicular to each other. That is, the first axis AX1 and the second axis AX2 may be perpendicular to each other in the optical axis OA. Accordingly, the first axis AX1 may be perpendicular to the optical axis OA. Additionally, the second axis AX2 may be perpendicular to the optical axis OA. That is, the optical axis OA, the first axis AX1, and the second axis AX2 may be perpendicular to each other.

A plurality of coordinates may be set on the ninth surface S9 of the fifth lens 150, respectively, on the first axis AX1 and the second axis AX2.

In detail, the ninth surface S9 of the fifth lens 150 may have a first coordinate C1 and a third coordinate C3 set on the first axis AX1. In detail, the ninth surface S9 of the fifth lens 150 may have a first coordinate C1 having a coordinate of (±A, 0) and a third coordinate C3 having a coordinate of (±B, 0) on the first axis AX1.

In addition, the ninth surface S9 of the fifth lens 150 may have a first Sag value S1 at the first coordinate C1 and a third Sag value S3 at the third coordinate C3.

Additionally, the ninth surface S9 of the fifth lens 160 may have a second coordinate C2 and a fourth coordinate C4 set on the second axis AX2. In detail, the ninth surface S9 of the fifth lens 150 may have a second coordinate C2 having a coordinate of (0, ±A) and a fourth coordinate C4 having a coordinate of (0, ±B) on the second axis AX2.

In addition, the ninth surface S9 of the fifth lens 160 may have a second Sag value S2 at the second coordinate C2 and a fourth Sag value S4 at the fourth coordinate (C4).

At this time, the fifth lens may satisfy the following equations A to I.

$$|\text{max Sag\_O\_x\_5}| \neq |\text{max Sag\_O\_y\_5}| \quad \text{[Equation A]}$$

(In Equation A, max |Sag_O_x_5| means the absolute value of the maximum Sag value in the X-axis direction from the object-side surface of the fifth lens, and max |Sag_O_y_5| means the absolute value of the maximum Sag value in the Y-axis direction from the object-side surface of the fifth lens.)

$$0.1\ \mu m \leq \text{max }|\text{Sag\_O\_x\_5}| - \text{max }|\text{Sag\_O\_y\_5}| \leq 5\ \mu m, \text{ or } 0.2\ \mu m \leq \text{max }|\text{Sag\_O\_x\_5}| - \text{max }|\text{Sag\_O\_y\_5}| \leq 3\ \mu m, \text{ or } 0.3\ \mu m \leq \text{max }|\text{Sag\_O\_x\_5}| - \text{max }|\text{Sag\_O\_y\_5}| \leq 1\ \mu m \quad \text{[Equation B]}$$

$$|S2-S1| > |S4-S3| \quad \text{[Equation } C\text{]}$$

$$|A| > |B|$$

$$|S4-S3| \leq 1.0\ \mu m \text{ or } |S4-S3| \leq 0.5\ \mu m \text{ or } |S4-S3| \leq 0.3\ \mu m$$

In Equation C, each formula may be independent, or multiple formulas may be combined with each other.

That is, in the ninth surface S11 of the fifth lens 150, a difference between a Sag value in the first axis and a Sag value in the second axis at coordinates arranged far from the optical axis (0,0) may be greater than a difference between a Sag value in the first axis and a Sag value in the second axis at coordinates arranged close to the optical axis (0,0).

That is, a difference between a Sag value in the first axis and a Sag value in the second axis may increase as the ninth surface S9 of the fifth lens 150 moves away from the optical axis (0,0).

Additionally, the range of a value of |S4-S3| and a value of |S2-S1| may be related to the amount of light passing through the fifth lens and incident on the image sensor unit and the optical characteristics of the optical system.

In detail, when the |S4-S3| is set to a value of 1.0 μm or less, 0.5 μm, or 0.3 μm, the amount of light passing through the fifth lens and incident toward the image sensor unit may be increased. In addition, when the |S2-S1| is set to a value greater than a value of |S4-S3|, that is, when the value of |S2-S1| exceeds 1.0 μm, 0.5 μm, or 0.3 μm, the amount of the light that passes through the fifth lens 150 and incident in the direction of the image sensor unit may be increased. Accordingly, the relative illumination (RI) of the image sensor unit may be increased to 35% or more, and improved optical characteristics may be achieved. That is, the optical system including the fifth lens may have improved MTF characteristics. Additionally, resolution may be improved by increasing the amount of light incident on the image sensor unit.

Here, the relative illumination of the image sensor unit may be defined as a relative ratio of the illuminance in the darkest region to the illuminance in the brightest region among the plurality of regions of the image sensor unit. That is, when the relative illumination is 35% or more, the illuminance in the darkest region of the image sensor unit may mean 35% or more of the illuminance in the brightest region of the image sensor unit.

However, when a value of |S4-S3| is set to a value exceeding 1.0 μm, the amount of light passing through the fifth lens 150 and incident toward the image sensor unit may decreases, or the MTF characteristics of the entire optical system may be degraded, thereby degrading the optical characteristics.

That is, when the value of |S4-S3| of the fifth lens 150 does not satisfy a value of 1.0 μm or less, the amount of light incident on the image sensor unit may decrease to reduce resolution, or the overall optical characteristics of the optical system may decrease to increase aberration and distortion.

On the ninth surface S9 of the fifth lens 150, the absolute values of the Sag value on the first axis and the Sag value on the second axis gradually increase as a distance from the optical axis (0,0) increases. And, the difference between the Sag value on the first axis and the Sag value on the second axis may increase from a specific point.

In addition, the left and right Sag values of the ninth surface S9 of the fifth lens 150 in the first axis AX1 direction and the up and down Sag values in the second axis AX2 direction may be symmetrical to each other.

Accordingly, the ninth surface S9 of the fifth lens 150, whose free-form shape is defined by the Sag values, may be symmetrical in the first axis AX1 direction and symmetrical in the second axis direction AX2. However, rotational symmetry from the first axis AX1 to the second axis AX2 is not satisfied.

Meanwhile, the Sag value of the ninth surface S9 of the fifth lens 150 may be set by equation D below.

$$Z = \frac{cr^2}{1+\sqrt{(1+k)c^2r^2}} + \sum_{i=1}^{n} C_j Z_j \quad \text{[Equation D]}$$

(In equation D, Z is the Sag value of the fifth lens, c is the curvature value of the fifth lens, r is the effective diameter value of the fifth lens, k is Conic constant, Cj is the Zernike coefficient at order j, and Zj is the Zernike basis at order j.)

Additionally, the first coordinate C1, the second coordinate C2, the third coordinate C3, and the fourth coordinate C4 may satisfy the following equation E.

$$h1 = H - t1 * \tan(\theta h - \alpha),$$ [Equation E]

$$|B| < 0.7 * h1 \leq |A|$$

(In equation E, h1 is a distance from the optical axis in the negative or positive direction of the first axis, His ½ of the minor axis length of the image sensor unit, t1 is a distance from the ninth surface S9 to the image sensor unit, θh is the chief ray angle at the 0.6 field of the image sensor unit, and α is sin−1 (1/(2*F number)). Here, the field of the image sensor unit may be defined as a relative distance from the center of the image sensor unit to any point of the diagonal length when the center of the image sensor unit is set to 0 field and half of the diagonal length from the center toward the edge of the image sensor unit is set to 1.0 field.)

Meanwhile, when the optical system is applied to a mobile display device such as a smartphone, the average angle of θh may be 34°.

Additionally, the ninth surface S9 of the fifth lens 150 may satisfy Equation F below.

$$|S4 - S3| = 0$$ [Equation F]

That is, the third Sag value of the third coordinate and the fourth Sag value of the fourth coordinate may be the same. That is, the absolute value of the difference between the third Sag value of the third coordinate and the fourth Sag value of the fourth coordinate that satisfies Equation D may be 0 or more and 1.0 μm or less.

In detail, the absolute value of the difference between the third Sag value of the third coordinate and the fourth Sag value of the fourth coordinate that satisfies the equation E may be 0 or more and 0.5 μm or less. In more detail, the absolute value of the difference between the third Sag value of the third coordinate and the fourth Sag value of the fourth coordinate that satisfies the equation E may be 0 or more and 0.3 μm or less.

Figure 4:
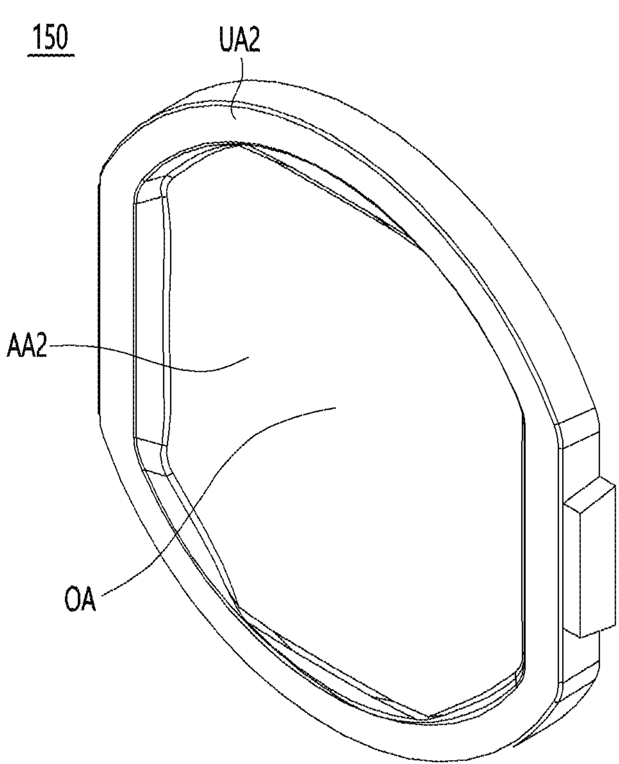
FIGS. 4 and 5 are diagrams for explaining the sensor side surface of the optical system and the fifth lens of the optical module according to the embodiment.
Figure 5:
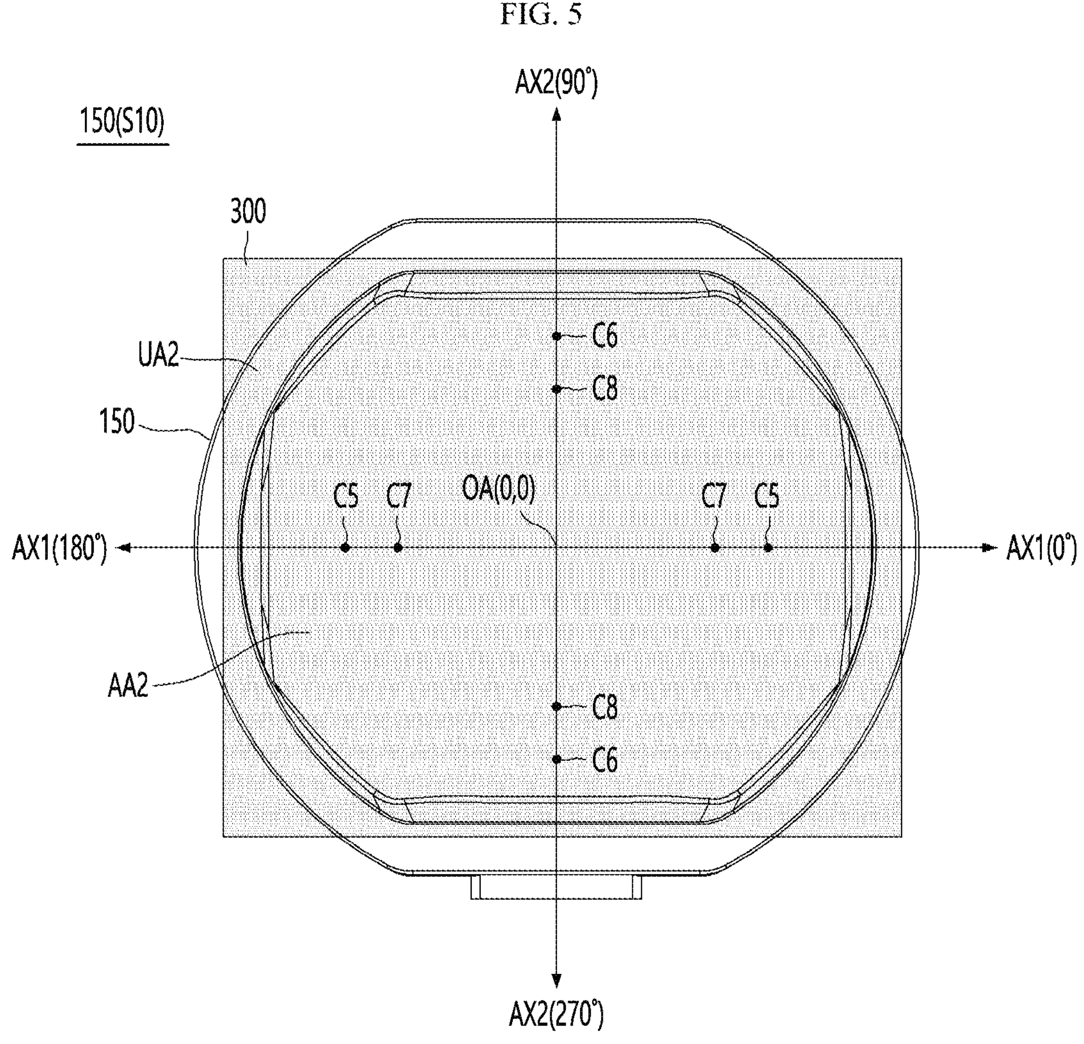

FIGS. 4 and 5 are diagrams for explaining the freeform surface of the tenth surface S10 of the fifth lens 150.

Referring to FIG. 4, the tenth surface S10 of the fifth lens 150 may include a second effective region AA2 and a second ineffective region UA2. In detail, the tenth surface S10 of the fifth lens 150 may include the second effective region AA2, which is a region through which light incident on the fifth lens 150 passes. Light incident on the fifth lens 150 may be refracted in the second effective region AA2 of the tenth surface S10 of the fifth lens 150 to implement optical characteristics.

Additionally, the tenth surface S10 of the fifth lens 150 may include a second ineffective region UA2, which is a region through which light incident on the fifth lens 150 does not pass. Light incident on the fifth lens 150 may not pass through the second ineffective region UA2 of the fifth lens 150. Accordingly, the second ineffective region UA2 of the tenth surface S10 may be unrelated to the optical characteristics of light incident on the fifth lens 150. Additionally, a portion of the second ineffective region UA2 may be fixed to the barrel accommodating the fifth lens 150.

Referring to FIG. 5, a virtual axis for setting the coordinates of the tenth surface S10 of the fifth lens 150 may be set at the tenth surface S10 of the fifth lens 150.

In detail, a first axis AX1 and a second axis AX2 may be set on the tenth surface S10 of the fifth lens 150. The first axis AX1 may be defined as a direction parallel to the longitudinal direction of the long axis of the image sensor unit 300. That is, the first axis AX1 may be defined as an axis that passes through the optical axis OA and extends in a direction parallel to the long axis of the image sensor unit 300.

Additionally, the second axis AX2 may be defined as a direction parallel to the minor axis longitudinal direction of the image sensor unit 300. That is, the second axis AX2 may be defined as an axis that passes through the optical axis OA and extends in a direction parallel to the minor axis of the image sensor unit 300.

For example, the first axis AX1 may be defined as the X-axis direction or the Y-axis direction, and may be defined as an axis having angles of 0° and 180° with respect to the optical axis OA. Additionally, the second axis AX2 may be defined as the Y-axis direction or the X-axis direction, and may be defined as an axis having angles of 90° and 270° with respect to the optical axis OA.

The first axis AX1 and the second axis AX2 may be perpendicular to each other. That is, the first axis AX1 and the second axis AX2 may be perpendicular to each other in the optical axis OA. Accordingly, the first axis AX1 may be perpendicular to the optical axis OA. Additionally, the second axis AX2 may be perpendicular to the optical axis OA. That is, the optical axis OA, the first axis AX1, and the second axis AX2 may be perpendicular to each other.

A plurality of coordinates may be set on the tenth surface S10 of the fifth lens 150, respectively, on the first axis AX1 and the second axis AX2.

In detail, the tenth surface S10 of the fifth lens 150 may have a fifth coordinate C5 and a seventh coordinate C7 set on the first axis AX1. In detail, the tenth surface S10 of the fifth lens 150 may set a fifth coordinate C5 having a coordinate of (±C, 0) and a seventh coordinate C7 of a coordinate of (±D, 0) on the first axis AX1.

In addition, the tenth surface S10 of the fifth lens 150 may have a fifth Sag value S5 at the fifth coordinate C5 and a seventh Sag value S7 at the seventh coordinate C7.

Additionally, the tenth surface S10 of the fifth lens 150 may have a sixth coordinate C6 and an eighth coordinate C8 set on the second axis AX2. In detail, the tenth surface S10 of the fifth lens 150 may set a sixth coordinate C6 having a coordinate of (0, ±C) and an eighth coordinate C8 having a coordinate of (0, ±D) on the second axis AX2.

In addition, the tenth surface S10 of the fifth lens 150 may have a sixth Sag value S6 at the sixth coordinate C6 and an eighth Sag value S8 at the eighth coordinate C8.

At this time, the fifth lens may satisfy the following equation G.

$$|S6 - S5| > |S8 - S7|$$ [Equation G]

$$|C| > |D|$$

$$|S8 - S7| \leq 1.0\ \mu m \text{ or } |S8 - S7| \leq 0.5\ \mu m \text{ or } |S8 - S7| \leq 0.3\ \mu m$$

In the above equation G, each equation may be independent, or multiple equations may be combined with each other.

Additionally, the range of a value of |S8-S7| may be related to the amount of light passing through the fifth lens 150 and incident on the image sensor unit and the optical characteristics of the optical system.

In detail, when |S8-S7| is set to a value of 1.0 μm or less, 0.5 μm or less, or 0.3 μm or less, the amount of light passing through the fifth lens 150 and incident toward the image sensor unit may be increased. Additionally, when the |S8-S7| of the fifth lens 150 is set to a value of 1.0 fem or less, 0.5 μm or less, or 0.3 μm, improved optical characteristics may be achieved. That is, the optical system including the fifth lens 150 may have improved MTF characteristics. In detail, when the |S6-S5| is set to a value greater than a value of |S8-S7|, that is, when the value of |S6-S5| is set to a value of more than 0.3 μm, more than 0.5 μm, or more than 1.0 μm, the amount of light passing through the sixth lens 160 and incident on the image sensor unit may be increased.

Accordingly, the relative illumination (RI) of the image sensor unit may be increased to 35% or more, and improved optical characteristics may be achieved. That is, the optical system including the fifth lens may have improved MTF characteristics. Additionally, resolution may be improved by increasing the amount of light incident on the image sensor unit.

However, when a value of |S8-S7| is set to a value exceeding 1.0 μm, in detail, the value of |S6-S5| is set greater than the value of |S8-S7|, that is, the value of |S6-S5| is set to a value exceeding 1.0 μm, the amount of light passing through the fifth lens 150 and incident on the image sensor unit may be reduced, or the MTF characteristics of the entire optical system may be reduced, thereby deteriorating the optical characteristics.

That is, when the value of |S8-S7| of the fifth lens 150 does not satisfy a value of 1.0 μm or less, in detail, the value of |S6-S5| is set to a value greater than the value of |S8-S7|, that is, when the value of |S6-S5| is set to a value exceeding 10 μm, the amount of light incident on the image sensor unit may decrease, leading to a decrease in resolution, or the overall optical characteristics of the optical system may decrease to increase aberration. and distortion.

That is, on the tenth surface S10 of the fifth lens 150, a difference between a Sag value in the first axis and a Sag value in the second axis at coordinates arranged far from the optical axis (0,0) may be greater than a difference between a Sag value in the first axis and a Sag value in the second axis at coordinates arranged close to the optical axis (0,0).

That is, a difference between a Sag value in the first axis and a Sag value in the second axis may increase as a distance from the optical axis (0,0) of the tenth surface S10 of the fifth lens 150 increases.

On the tenth surface S10 of the fifth lens 150, it may be seen that the absolute value of the Sag value in the first axis and the absolute value of the Sag value in the second axis gradually increase as the distance from the optical axis (0,0) increases, and the difference between the Sag value on the first axis and the Sag value on the second axis may increase from a specific point.

In addition, in the tenth surface S10 of the fifth lens 150, the left and right Sag values based on the optical axis in the first axis AX1 direction and up and down Sag values based on the optical axis in the second axis AX2 direction may be symmetrical to each other.

Accordingly, the tenth surface S10 of the fifth lens 150, whose free-form shape is defined by the Sag values, may be symmetrical in the first axis AX1 direction and symmetrical in the second axis direction AX2. However, rotational symmetry from the first axis AX1 to the second axis AX2 is not satisfied.

Meanwhile, the Sag value of the tenth surface S10 of the fifth lens 150 may be set by equation H.

Additionally, the fifth coordinate C5, the sixth coordinate C6, the seventh coordinate C7, and the eighth coordinate C8 may satisfy the following equation H.

$$h2 = H - t2 * \tan(\theta h - \alpha),$$
$$|D| < 0.7 * h1 \le |C| \quad \text{[Equation H]}$$

(In equation H, h2 is a distance from the optical axis in the negative or positive direction of the first axis, His ½ of the minor axis length of the image sensor unit, t2 is a distance from the tenth surface S10 to the image sensor unit, θh is the chief ray angle at the 0.6 field of the image sensor unit, and α is sin−1 (1/(2*F number)). Here, when half of the diagonal length from the center toward the edge of the image sensor unit is set as a 1.0 field, it may be defined as a relative distance from the center of the image sensor unit to an arbitrary point of the diagonal length.)

Meanwhile, when the optical system is applied to a mobile display device such as a smartphone, the average angle of θh may be 34°.

Additionally, the tenth surface S10 of the fifth lens 150 may satisfy Equation I below.

$$|S8 - S7| = 0 \quad \text{[Equation I]}$$

That is, the seventh Sag value of the seventh coordinate and the eighth Sag value of the eighth coordinate may be the same. That is, the absolute value of the difference between the seventh Sag value of the seventh coordinate and the eighth Sag value of the eighth coordinate that satisfies Equation D may be 0 or more and 1.0 μm or less.

In detail, the absolute value of the difference between the seventh Sag value of the seventh coordinate and the eighth Sag value of the eighth coordinate that satisfies the equation G may be 0 or more and 0.5 μm or less. In more detail, the absolute value of the difference between the seventh Sag value of the seventh coordinate and the eighth Sag value of the eighth coordinate that satisfies the equation G may be 0 or more and 0.1 μm or less.

FIG. 6 is a table of Sag values at various angles of the ninth and tenth surfaces of the fifth lens having a freeform surface.

In detail, FIG. 6 is a table showing Sag values at 0°, 30°, 45°, 53°, 60°, and 90°.

Figure 7:
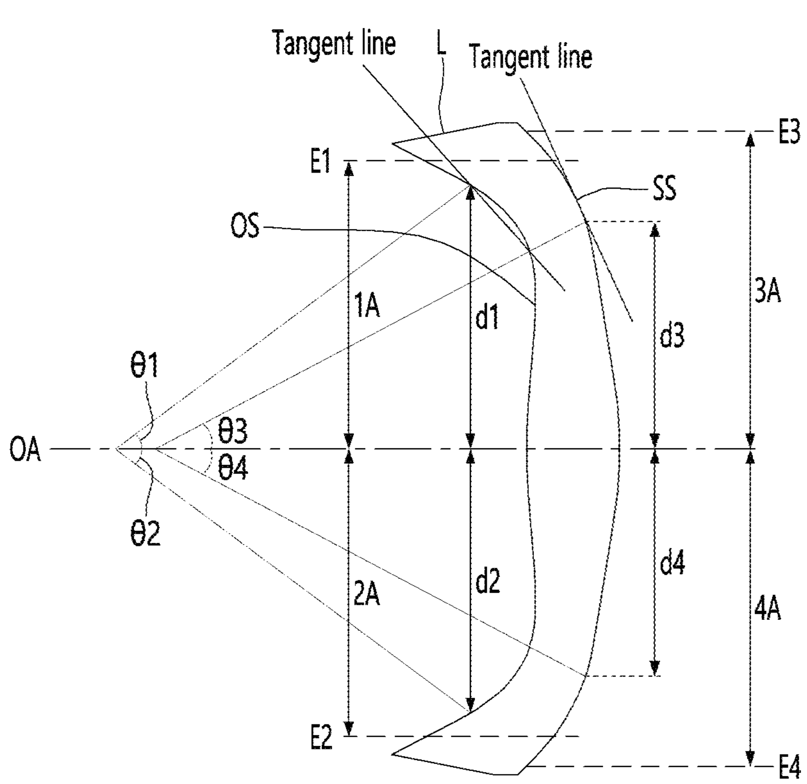
FIG. 7 is a diagram for explaining a slope angle of the lens of the optical system and the optical module according to the embodiment.

Referring to FIGS. 6 and 7, the ninth and tenth surfaces of the fifth lens may be symmetrical in the first axis direction AX1 and symmetrical in the second axis direction AX2 at all angles. However, the ninth and tenth surfaces of the fifth lens do not satisfy rotational symmetry from the first axis AX1 to the second axis AX2 at all angles.

In the optical system according to the embodiment, the fifth lens 150 may have a relationship between the Sag value and the Sag values set by the equations, and the object-side surface and the sensor-side surface of the fifth lens 150 may have a freeform surface formed by the relationship between the Sag value and the Sag values.

Accordingly, when light passes through the optical system according to the embodiment and is incident on the image sensor unit, the relative illumination of the image sensor unit may be improved.

That is, the optical system according to the embodiment, light is incident on the image sensor unit through the fifth lens 150, thereby expanding the region where light is incident on the image sensor unit from the optical system, that is, by expanding the effective region of the image sensor unit, the relative illumination of the image sensor unit may be improved.

In detail, the optical system according to the embodiment is configured so that when comparing the illuminance in the brightest and darkest regions of the image sensor unit, light may be incident on the image sensor unit so that the illuminance in the darkest region has an illuminance of 30% or more with respect to the illuminance of the brightest region. In detail, the optical system according to the embodiment is configured so that when comparing the illuminance in the brightest and darkest regions of the image sensor unit, light may be incident on the image sensor unit so that the illuminance in the darkest region has the illuminance of 35% or more with respect to the illuminance in the bright region. More specifically, the optical system according to the embodiment is such that when comparing the illuminance in the brightest region and the darkest region of the image sensor unit, light may be incident on the image sensor unit so that the illuminance in the darkest region has the illuminance of 45% or more with respect to the illuminance in the bright region.

Therefore, the optical system according to the embodiment may increase the amount of light incident on the image sensor unit while maintaining improved optical characteristics without increasing the aperture of the lenses in order to increase the amount of light incident on the image sensor unit.

Additionally, the optical module according to the embodiment may implement miniaturization of the optical system and optical module by using a fifth lens having a freeform surface.

In detail, the optical module according to the embodiment may improve the relative illumination while reducing the size of the optical system and optical module.

When there is no fifth lens including a freeform surface, TTL (distance in the optical axis direction between the first lens and the image sensor unit) of the optical system must be increased in order to improve the relative illumination, but the optical module according to the embodiment may improve the relative illumination without increasing TTL by controlling the direction of light movement using the fifth lens including the freeform surface.

That is, the optical module according to the embodiment may reduce the size of TTL by 10% to 20% compared to the optical module that does not include the fifth lens including a freeform surface. Accordingly, the optical module may be miniaturized, and the optical module may be easily applied to various display devices.

Additionally, the optical module according to the embodiment may have improved MTF and improved resolution by a fifth lens having a freeform surface.

In detail, the optical module according to the embodiment may have improved MTF characteristics by increasing the amount of light incident on the image sensor unit through the fifth lens having the freeform surface.

In addition, the optical module according to the embodiment improves the relative illumination of the light incident on the image sensor unit, thereby inhibiting a decrease in resolution due to post-correction after image acquisition.

In other words, an optical module that does not include a lens with a freeform surface has a low relative illumination of the image sensor unit, and a post-correction process is required to obtain an image through the image sensor unit and the resolution of the optical module may be lowered during the post-correction process.

However, the optical module according to the embodiment increases the relative illumination of the image sensor unit by using a lens having a freeform surface, and as a result, post-correction is not required or resolution is not significantly reduced due to the post-correction process, so it may have improved resolution.

Meanwhile, the fourth lens 140 and the sixth lens 160, which are disposed adjacent to the fifth lens 140, which is a freeform lens, may have the peripheral shape of the lens curved toward the object side surface. In detail, the fourth lens 140 and the sixth lens 160 may be formed in a shape that bends in the direction of the object side as it goes from the optical axis to the end of the effective diameter of the lens.

The shapes of the fourth lens 140 and the sixth lens 160 may be defined by changes in the slope angle of the lenses. In addition, the thickness and interval of the fourth lens 140 and the sixth lens 160 at each position may be defined by changes in the slope angles of the fourth lens 140 and the sixth lens 160.

FIG. 7 is a diagram for explaining the slope angle of a lens of an optical module according to an embodiment. The definition of the slope angle of the lens described in FIG. 7 may be equally applied to the first to fifth lenses.

Referring to FIG. 7, the lens L may have a normal line defined that passes through an arbitrary point on the object-side surface OS of the lens. In detail, on the object-side surface OS of the lens, a normal line extending in a direction perpendicular to a tangent line passing through an arbitrary point of the object-side surface OS and passing through the arbitrary point may be defined.

Accordingly, the object-side surface OS of the lens may have a slope angle defined as the angle between the normal line passing through the arbitrary point of the object-side surface OS and the internal angle formed by the optical axis.

The slope angle may be expressed as positive (+) or negative (−) depending on the position at which the internal angle is formed. In detail, when the internal angle is formed toward the sensor side based on the object-side surface OS of the lens, the slope angle may be positive (+). Additionally, when the internal angle is formed in the direction of the object side based on the object-side surface OS, the slope angle may be negative (−). That is, the increase or decrease in the slope angle of the lens L may be determined based on the absolute value of the slope angle. That is, the description of the size of the slope angle described below is based on the size of the absolute value of the slope angle, which is the absolute value of the internal angle.

The lens L may have a first end E1 and a second end E2 defining an effective region of the object-side surface OS of the lens. In detail, the object-side surface OS of the lens may be defined as a first end E1 and a second end E2 in the X-axis or Y-axis direction with respect to the optical axis.

At this time, the size of the slope angle of the object-side surface OS of the lens may change according to positions in the first region 1A from the optical axis OA to the first end E1 and the second region 2A from the optical axis OA to the second end E2. The first region 1A and the second region 2A may each be defined as an effective radius that is half of the effective diameter (effective region) of the object-side surface OS of the lens.

The object-side surface OS of the lens may be defined by a first slope angle θ1 on the first region 1A and a second slope angle θ2 on the second region 2A.

The first slope angle θ1 and the second slope angle θ2 may have a positive (+) or negative (−) value depending on the position of the internal angle.

Likewise, a slope angle may be defined on the sensor-side surface SS of the lens. In detail, the lens L may have a normal line defined that passes through an arbitrary point on the sensor-side surface SS of the lens. In detail, on the sensor-side surface SS of the lens, a normal line extending in a direction perpendicular to a tangent line passing through an arbitrary point of the sensor-side surface SS and passing through an arbitrary point may be defined.

Accordingly, the sensor-side surface SS of the lens may have a slope angle defined as the angle between the normal line passing through an arbitrary point of the sensor-side surface SS and the internal angle formed by the optical axis.

At this time, the size of the slope angle of the sensor-side surface SS of the lens may change according to positions in the third region 3A from the optical axis OA to the third end E3 and the fourth region 4A from the optical axis OA to the fourth end E4. The third region 3A and the fourth region 4A may each be defined as an effective radius that is half of the effective diameter (effective region) of the sensor-side surface SS of the lens.

The sensor-side surface SS of the lens may be defined by a third slope angle θ3 in the third region 3A and a fourth slope angle θ4 in the fourth region 4A.

The third slope angle θ3 and the fourth slope angle θ4 may have positive (+) or negative (−) values depending on the position of the inner angle.

The size of the slope angle of the third lens 130, the fourth lens 140 and the fifth lens 150 may change as it moves from the optical axis of the lens toward the end of the effective diameter. In detail, the optical module according to the embodiment may improve optical properties of the optical module by setting a slope angle for each position of the fifth lens 150, which is a freeform lens, and the fourth lens 140 and the sixth lens 160 disposed closest to the fifth lens 150 and a thickness and interval for each position set by the slope angle within a set range.

First, the fourth lens 140 will be described.

The size of the slope angle of the seventh surface S7 of the fourth lens 140 may vary depending on the position of the seventh surface S7. In detail, the size of the slope angle of the seventh surface S7 may vary depending on the position within the effective region of the seventh surface S7. In more detail, the size of the slope angle of the seventh surface S7 may be changed for each position of the seventh surface S7 while extending from the optical axis in the X-axis or Y-axis direction of the seventh surface S7 perpendicular to the optical axis.

In detail, the first slope angle θ1 and the second slope angle θ2 of seventh surface S7 may change in the first region 1A and the second region 2A. In detail, the first slope angle θ1 may increase in the first region 1A, and the second slope angle θ2 may increase in the second region 2A.

That is, on the seventh surface S7, the absolute value of the first slope angle θ1 may gradually increase while extending from the optical axis toward the first end E1, and the absolute value of the second slope angle θ2 may gradually increase while extending from the optical axis toward the second end E2.

Accordingly, the seventh surface S7 may be formed in a shape whose curvature gradually increases while extending from the optical axis toward the first end E1 and the second end E2. That is, the seventh surface S7 may be formed in a shape that is curved in the direction toward the object, and may be formed so that the curvature increases as it extends from the optical axis toward the first end E1 and the second end E2.

Additionally, in the first region and the second region of the seventh surface S7, the first and second regions extending from more than 0.1 to 0.3 from the optical axis in the direction of the first end E1 and the second end E2 may be a point where the signs of the first slope angle θ1 and the second slope angle θ2 change. That is, in the first and second regions ranging from the optical axis to a distance of more than 10% to 30% of the effective radius of the seventh surface S7, a critical point may be located near a point where the signs of the first slope angle θ1 and the second slope angle θ2 change.

In addition, the change amount of the first slope angle θ1 and the second slope angle θ2 of the seventh surface S7 may gradually increase while extending from the optical axis toward the first end E1 and the second end E2.

In detail, when the total distance from the optical axis to the first end E1 is defined as 1, in the first region of the seventh surface S7, the change amount of the first slope angle θ1 in the first region from the optical axis to 0.5 in the direction of the first end E1 may be smaller than the change amount of the slope angle in the first region from greater than 0.5 to 1.

In addition, in the second region of the seventh surface S7, the change amount in the second slope angle θ2 in the second region from the optical axis to 0.5 in the direction of the second end E2 may be smaller than the change amount of the sloe angle in the second region from greater than 0.5 to 1.

That is, the change amount in the first slope angle θ1 and the second slope angle θ2 of greater than 50% to 100% of the effective radius of the seventh surface S7 on the optical axis may be greater than the change amount in the first slope angle θ1 and the second slope angle θ2 of 50% or less of the effective radius.

Accordingly, the seventh surface S7 may be formed in a shape having a small curvature and a small change amount in curvature in the first and second regions from the optical axis to 50% of the effective diameter, and may have a large curvature and a large change amount in curvature while extending from greater than 50% to the end of the effective diameter.

Additionally, the size of the slope angle of the eighth surface S8 of the fourth lens 150 may change depending on the position of the eighth surface S8. In detail, the size of the slope angle of the eighth surface S8 may vary depending on the position within the effective region of the eighth surface S8. In more detail, the size of the inclination angle of the eighth surface S8 may be changed for each position of the eighth surface S8 while extending from the optical axis in the X-axis or Y-axis direction of the eighth surface S8 perpendicular to the optical axis.

In detail, the third slope angle θ3 and the fourth slope angle θ4 of the eighth surface S8 may change in the third region 3A and the fourth region 4A. In detail, the third slope angle θ3 may increase or decrease in the third region 3A, and the fourth slope angle θ4 may increase or decrease in the fourth region 4A. In more detail, the third slope angle θ3 may increase, decrease, and then increase again in the third region 3A. Additionally, the fourth slope angle θ4 may increase, decrease, and then increase again in the fourth region 4A.

That is, the absolute value of the third slope angle θ3 may gradually increase, decrease, and then increase again as the eighth surface S8 extends from the optical axis in the direction of the third end E3, and the absolute value of the fourth inclination angle θ4 may gradually increase, then decrease, and then increase again as the eight surface S8 extend in the direction of the fourth end E4 from the optical axis.

Accordingly, the eighth surface S8 may be formed in a shape in which the curvature gradually increases and then decreases and then increases again while extending from the optical axis to the third end E3 and the fourth end E4. That is, the eighth surface S8 may be formed in a shape that is curved toward the object, and the curvature may decrease and then increase while extending from the optical axis to the third end E3 and the fourth end E4.

For example, when the total distance from the optical axis to the third end E3 and the fourth end E4 is defined as 1, respectively, in the third and fourth regions of the eighth surface S8, a third slope angle θ3 and a fourth slope angle θ4 may increase in the third and fourth regions from greater than 0.1 to 0.3 in the direction of the third and fourth ends E3 and E4 from the optical axis. That is, the third slope angle θ3 and the fourth slope angle θ4 in the third and fourth regions from the optical axis to a distance of 10% to 30% of the effective radius of the eighth surface S8 may increase.

In addition, in the third region and the fourth region of the eighth surface S8, a third slope angle θ3 and a fourth slope angle θ4 in the third region and the fourth region from the optical axis to greater than 0.3 to 0.5 in the direction of the third end E3 and the fourth end E4 may decrease. That is, the third slope angle θ3 and the fourth slope angle θ4 in the third region and the fourth region from the optical axis to a distance greater than 30% to 50% of the effective radius of the eighth surface S8 may decrease.

In addition, in the third and fourth regions of the eighth surface S8, a third slope angle θ3 and a fourth slope angle θ4 in the third and fourth regions from greater than 0.75 to 0.95 in a direction from the optical axis to the third and fourth ends E3 and E4 may increase. That is, the third slope angle θ3 and the fourth slope angle θ4 in the third and fourth regions from the optical axis to a distance greater than 75% to 95% of the effective radius of the eighth surface S10 may increase.

Additionally, the eighth surface S8 may include a region where the sign of the inclination angle changes. In detail, the eighth surface S8 may include a critical point. In detail, the third region and the fourth region of the eighth surface S8 may include a critical point at which the sign of the slope angle in the third and fourth regions changes from the optical axis to the third end E3 and the fourth end of 0.3 to 0.5. That is, in the third and fourth regions extending from the optical axis to a distance of more than 30% to 50% of the effective radius of the eighth surface S8, a critical point may be located near a point where the signs of the third inclination angle θ3 and the fourth inclination angle θ4 change.

In addition, the amount of change in the third slope angle θ3 and the fourth slope angle θ4 of the eighth surface S8 may gradually increase as it extends from the optical axis toward the third end E3 and the fourth end E4.

In detail, the third region of the eighth surface S8 is that the amount of change in the third slope angle θ3 in the third region from the optical axis to 0.5 in the direction of the third end E3 may be less than the amount of change in the third slope angle θ3 in the third region, which ranges from more than 0.5 to 1.

Additionally, the fourth region of the eighth surface S8 is that the amount of change in the fourth slope angle θ4 in the fourth region from the optical axis to 0.5 in the direction of the fourth end E4 may be smaller than the amount of change in the fourth slope angle θ4 in the fourth region, which ranges from more than 0.5 to 1.

That is, the amount of change in the third slope angle θ3 and the fourth slope angle θ4 of more than 50% to 100% of the effective radius of the eighth surface S8 on the optical axis may be greater than the amount of change in the third slope angle θ3 and fourth slope angle θ4 of 50% or less.

Accordingly, the eighth surface S8 has a small curvature and a small curvature change in the third and fourth regions up to 50% of the effective diameter on the optical axis, and the eighth surface S8 may be formed into a shape with large curvature and large curvature change while extending from more than 50% to the end of the effective diameter.

Additionally, the fourth lens 140 may have different slope angles on the seventh surface S7 and the eighth surface S8.

For example, the maximum size of the absolute value of the slope angle of the seventh surface S7 of the fourth lens 140 may be different from the maximum size of the absolute value of the slope angle of the eighth surface S8. In detail, the maximum absolute value of the slope angle of the seventh surface S7 may be greater than the maximum absolute value of the slope angle of the eighth surface S8.

In addition, a difference between a maximum size of an absolute value of the slope angle of the seventh surface S7 and a minimum size that is not 0 and a difference between a maximum size and the minimum non-zero size of an absolute value of the slope angle of the eighth surface S8 of the fourth lens 140 may be different. The difference between the maximum size and the minimum non-zero absolute value of the slope angle of the seventh surface S7 may be greater than the difference between the maximum size and the minimum non-zero size of the absolute value of the slope angle of the eighth surface S8.

Additionally, the thickness of the fourth lens 140 may change while extending from the optical axis in the direction of the effective diameter. In detail, the fourth lens 140 may vary in thickness while extending from the optical axis toward the first end E1 or the second end E2, which is the effective region of the seventh surface S7.

For example, the thickness of the fourth lens 140 may increase while extending from the optical axis toward the first end E1, which is the effective region of the seventh surface S7. Additionally, the thickness of the fourth lens 140 may increase while extending from the optical axis toward the second end E2, which is the effective region of the seventh surface S7.

A maximum thickness of the fourth lens 140 may be the end of the effective region of the fourth lens 140. Additionally, a minimum thickness of the fourth lens 140 may be within the effective region of the fifth lens 150. For example, the minimum thickness of the fourth lens 140 may be a thickness at the optical axis of the fourth lens 140.

Additionally, the Sag value of the fourth lens 140 may change as it extends from the optical axis in the direction of the effective diameter.

The size of the Sag value of the seventh surface S7 of the fourth lens 140 may change depending on the position of the seventh surface S7. In detail, the size of the Sag value of the seventh surface S7 may change depending on the position within the effective region of the seventh surface S7. In more detail, the size of the Sag value of the seventh surface S7 may change for each position of the seventh surface S7 while extending from the optical axis in the X-axis or Y-axis direction of the seventh surface S7 perpendicular to the optical axis.

In detail, the Sag value of the seventh surface S7 may change in the first region 1A and the second region 2A. In detail, the Sag value may increase in the first region 1A and may increase in the second region 2A.

That is, the absolute value of the Sag value may gradually increase as the seventh surface S7 extends from the optical axis toward the first end E1, and the absolute value of the Sag value may gradually increase as it extends from the optical axis toward the second end E2.

Additionally, the amount of change in the Sag value of the seventh surface S7 may gradually increase as it extends from the optical axis toward the first end E1 and the second end E2.

In detail, in the first region of the seventh surface S7, the amount of change in the Sag value in the first region from the optical axis to 0.5 in the direction of the first end E1 may be smaller than the amount of change in the sag value in the first region, which ranges from more than 0.5 to 1.

In addition, in the second region of the seventh surface S7, the amount of change in the Sag value in the second region from the optical axis to 0.5 in the direction of the second end E2 may be smaller than the amount of change in the sag value in the second region, which ranges from more than 0.5 to 1

That is, the amount of change in the Sag value of more than 50% to 100% of the effective radius of the seventh surface S7 on the optical axis may be greater than the amount of change in the Sag value of 50% or less.

Additionally, the size of the Sag value of the eighth surface S8 of the fourth lens 140 may change depending on the position of the eighth surface S8. In detail, the size of the Sag value of the eighth surface S8 may change depending on the position within the effective region of the eighth surface S8. In more detail, the size of the Sag value of the eighth surface S8 may change for each position of the eighth surface S8 while extending from the optical axis in the X-axis or Y-axis direction of the eighth surface S8 perpendicular to the optical axis.

In detail, the sag value of the eighth surface S8 may change in the third region 3A and the fourth region 4A. In detail, the sag value may increase or decrease in the third region 3A and the fourth region 34, and in more detail, the sag value may increase, and then decrease, and then increase again in the third region 3A and the fourth region 34.

That is, the absolute value of the sag value of the eighth surface S8 may gradually increase, and then gradually decrease, and then gradually increase again as it extends from the optical axis toward the third end E3 and the fourth end E4.

For example, in the third region and the fourth region of the eighth surface S8, the sag value in the third region and the fourth region may increase from 0.1 to 0.4 in the direction from the optical axis to the first end E1.

Additionally, in the third region and the fourth region of the eighth surface S8, the sag value in the third region and the fourth region may reduce from more than 0.4 to 0.5 in the direction from the optical axis to the first end E1.

Additionally, in the third region and the fourth region of the eighth surface S8, the sag value in the third region and the fourth region may increase from more than 0.5 to 1 in the direction from the optical axis to the first end E1.

Additionally, the eighth surface S8 may include an region where the sign of the sag value changes. In detail, in the third region and the fourth region of the eighth surface S8, the sign of the sag value in the third region and the fourth region may vary from 0.35 to 0.6 in the direction from the optical axis to the third end E3 and the fourth end E4.

Additionally, the amount of change in the Sag value of the eighth surface S8 may gradually increase as it extends from the optical axis toward the third end E3 and the fourth end E4.

In detail, in the third region and the fourth region of the eighth surface S8, the amount of Sag value change in the third and fourth regions up to 0.5 from the optical axis toward the third end E3 and the fourth end E4 may be less than the amount of change in the Sag value in the third and fourth regions, which ranges from more than 0.5 to 1.

That is, the amount of change in the Sag value of more than 50% to 100% of the effective radius of the eighth surface S8 on the optical axis may be greater than the amount of change in the Sag value of 50% or less.

Hereinafter, the sixth lens 160 will be described.

The size of the slope angle of the eleventh surface S11 of the sixth lens 160 may change depending on the position of the eleventh surface S11. In detail, the size of the slope angle of the eleventh surface S11 may vary depending on the position within the effective region of the eleventh surface S11. In more detail, the size of the slope angle of the eleventh surface S11 may change for each position of the eleventh surface S11 while extending from the optical axis in the X-axis or Y-axis direction of the eleventh surface S11 perpendicular to the optical axis.

In detail, the first slope angle θ1 and the second slope angle θ2 of the eleventh surface S11 may change in the first region 1A and the second region 2A. In detail, the first slope angle θ1 may increase and then decrease in the first region 1A, and the second slope angle θ2 may increase and then decrease in the second region 2A.

That is, the absolute value of the first slope angle θ1 of the eleventh surface S11 may gradually increase and then decrease as it extends from the optical axis toward the first end E1, and the absolute value of the second slope angle θ2 may gradually increase and then decrease as it extends from the optical axis toward the second end E2.

Accordingly, the eleventh surface S11 may be formed in a shape whose curvature gradually increases and then decreases while extending from the optical axis toward the first end E1 and the second end E2. That is, the eleventh surface S11 is formed in a shape that bends in the direction of the object side, and the curvature may be formed to increase and then decrease as it extends from the optical axis toward the first end E1 and the second end E2.

In detail, when the total distance from the optical axis to the first end E1 and the second end E2 is defined as 1, the first slope angle θ2 and the second slope angle θ2 in the first region and the second region from 0.1 to 0.5 in the direction from the optical axis to the first end E1 and the second end E2 may increase.

In addition, the first slope angle θ2 and the second slope in the first and second regions exceed 0.5 to 0.7 in the direction from the optical axis to the first end E1 and the second end E2 angle θ2 may decrease. That is, the first slope angle θ1 and the second slope angle θ2 in the first region and the second region from the optical axis to a distance of more than 50% to 70% of the effective radius of the eleventh surface S11 may decrease.

Additionally, in the first and second regions ranging from more than 0.7 to 0.95 from the optical axis in the direction of the first end E1 and the second end E2, the first slope angle θ2 and the second slope angle θ2 may increase. That is, in the first region and the second region from the optical axis to a distance of more than 70% to 95% of the effective radius of the eleventh surface S11, the first slope angle θ1 and the second slope angle θ2 may increase.

Additionally, the size of the slope angle of the twelfth surface S12 of the sixth lens 160 may change depending on the position of the twelfth surface S12. In detail, the size of the slope angle of the twelfth surface S12 may change depending on the position within the effective region of the twelfth surface S12. In more detail, the size of the slope angle of the twelfth surface S12 may change for each position of the twelfth surface S12 while extending from the optical axis in the X-axis or Y-axis direction of the twelfth surface S12 perpendicular to the optical axis.

In detail, the third inclination angle θ3 and the fourth inclination angle θ4 of the twelfth surface S12 may change in the third region 3A and the fourth region 4A. In detail, the third inclination angle θ3 may increase or decrease in the third region 3A, and the fourth inclination angle θ4 may increase or decrease in the fourth region 4A. In more detail, the third inclination angle θ3 may increase, decrease, and then increase again in the third region 3A. Additionally, the fourth inclination angle θ4 may increase, decrease, and then increase again in the fourth region 4A.

That is, as the twelfth surface S12 extends from the optical axis toward the third end E3, the absolute value of the third slope angle θ3 may gradually increase, decrease, and then increase again, and as it extends from the optical axis toward the fourth end E4, the absolute value of the fourth slope angle θ4 may gradually increase, decrease, and then increase again.

Accordingly, the twelfth surface S12 extends from the optical axis toward the third end E3 and the fourth end E4, and may be formed in a shape in which the curvature gradually increases, then decreases, and then increases again. That is, the twelfth surface S12 is formed in a shape that bends in the direction of the object side, and the curvature may be formed to increase, decrease, and then increase again as it extends from the optical axis toward the third end E3 and the fourth end E4.

For example, when the total distance from the optical axis to the third end E3 is defined as 1, the third region and the fourth region of the twelfth surface S12 are that the third slope angle θ3 and the fourth slope angle θ4 in the third and fourth regions may increase from 0.1 to 0.2 in the direction from the optical axis to the third end E1 and the fourth end E4. That is, the third slope angle θ3 and fourth slope angle θ4 in the third and fourth regions from the optical axis to a distance of 10% to 20% of the effective radius of the twelfth surface S12 may increase.

In addition, in the third region and the fourth region of the twelfth surface S12, the third slope angle θ3 and fourth slope angle θ4 in the third and fourth regions exceeding 0.2 to 0.4 in the direction from the optical axis to the third end E3 and the fourth end E4 are may decrease. That is, the third slope angle θ3 and fourth slope angle θ4 in the third and fourth regions from the optical axis to a distance of more than 20% to 40% of the effective radius of the twelfth surface S12 may decrease.

In addition, in the third region and the fourth region of the twelfth surface S12, the third slope angle θ3 and fourth slope angle θ4 in the third and fourth regions exceeding 0.75 to 0.95 in the direction from the optical axis to the third end E3 and the fourth end E4 may increase. That is, the third slope angle θ3 and fourth slope angle θ4 in the third and fourth regions from the optical axis to a distance of more than 75% to 95% of the effective radius of the twelfth surface S12 may increase.

Additionally, the twelfth surface S12 may include a region where the sign of the slope angle changes. In detail, the twelfth surface S12 may include a critical point. In detail, the third and fourth regions of the twelfth surface S12 may include a critical point at which the sign of the slope angle in the third and fourth regions changes from 0.2 to 0.4 in the direction from the optical axis to the third end E3 and the fourth end. That is, the critical point at which the signs of the third inclination angle θ3 and the fourth slope angle θ4 change may be located in the third and fourth regions at a distance of more than 20% to 40% of the effective radius of the twelfth surface S12 from the optical axis.

Additionally, the sixth lens 160 may have different slope angles at the eleventh surface S11 and the twelfth surface S12.

For example, the maximum size of the absolute value of the slope angle of the eleventh surface S11 of the sixth lens 160 may be different from the maximum size of the absolute value of the slope angle of the twelfth surface S12. In detail, the maximum absolute value of the slope angle of the eleventh surface S11 may be smaller than the maximum absolute value of the slope angle of the twelfth surface S12.

In addition, in the sixth lens 160, the difference between the maximum size and minimum non-zero size of the absolute value of the slope angle of the eleventh surface S11 and the maximum size and minimum non-zero size of the absolute value of the slope angle of the twelfth surface S12 may be different. In detail, the difference between the maximum size and the minimum non-zero size of the absolute value of the slope angle of the eleventh surface S11 may be smaller than the difference between the maximum and minimum non-zero absolute values of the slope angle of the twelfth surface S12.

Additionally, the thickness of the sixth lens 160 may change while extending from the optical axis in the direction of the effective diameter. In detail, the thickness of the sixth lens 160 may change while extending from the optical axis toward the first end E1 or the second end E2, which is the effective region of the eleventh surface S11.

For example, the thickness of the sixth lens 160 may increases and decreases while extending from the optical axis toward the first end E1 and the second end E2, which are the effective region of the eleventh surface S11. In detail, the thickness of the sixth lens 160 may increase and then decrease while extending from the optical axis toward the first end E1 and the second end E2, which are the effective region of the eleventh surface S11.

For example, the thickness of the sixth lens 160 may increase from more than 0.1 to 0.8 in the direction from the optical axis to the first end E1 and the second end E2.

Additionally, the thickness of the sixth lens 160 may decrease from more than 0.8 to 1.0 in the direction from the optical axis to the first end E1 and the second end E2.

A maximum thickness of the sixth lens 160 may be a region adjacent to the end of the effective region of the sixth lens 160. For example, the maximum thickness of the sixth lens 160 may be in the range of 0.75 to 0.95 from the optical axis toward the first end E1 and the second end E2.

Additionally, a minimum thickness of the sixth lens 160 may be located within the effective region of the fifth lens 150. For example, the minimum thickness of the sixth lens 140 may be 0.35 to 0.55 region in the direction from the optical axis to the first end E1 and the second end E2.

Additionally, the Sag value of the sixth lens 160 may change while extending from the optical axis in the direction of the effective diameter.

The size of the Sag value of the eleventh surface S11 of the sixth lens 160 may change depending on the position of the eleventh surface S11. In detail, the size of the Sag value of the eleventh surface S11 may change depending on the position within the effective region of the eleventh surface S11. In more detail, the size of the Sag value of the eleventh surface S11 may change for each position of the eleventh surface S11 while extending from the optical axis in the X-axis or Y-axis direction of the eleventh surface S11 perpendicular to the optical axis.

In detail, the Sag value of the eleventh surface S11 may change in the first region 1A and the second region 2A. In detail, the Sag value may increase in the first region 1A and may increase in the second region 1A.

That is, the absolute value of the Sag value of the eleventh surface S11 may gradually increase while extending from the optical axis toward the first end E1, and the absolute value of the Sag value may gradually increase while extending from the optical axis toward the second end E2.

Additionally, the amount of change in the sag value of the eleventh surface S11 may gradually increase while extending from the optical axis toward the first end E1 and the second end E2.

In detain, in the first region of the eleventh side surface S11, the amount of change in the sag value in the first region from the optical axis to 0.5 in the direction of the first end E1 may be smaller than the change in sag value in the first region, which ranges from more than 0.5 to 1.

Additionally, in the second region of the eleventh side surface S11, the amount of change in the sag value in the second region from the optical axis to 0.5 in the direction of the second end E2 may be smaller than the change in sag value in the second region, which ranges from more than 0.5 to 1.

That is, the amount of change in the sag value exceeding 50% to 100% of the effective radius of the eleventh surface S11 on the optical axis may be greater than the amount of change in the sag value less than 50%.

Additionally, the size of the Sag value of the twelfth surface S12 of the sixth lens 160 may change depending on the position of the twelfth surface S12. In detail, the size of the Sag value of the twelfth surface S12 may change depending on the position within the effective region of the twelfth surface S12. In more detail, the size of the Sag value of the twelfth surface S12 may change for each position of the twelfth surface S12 while extending from the optical axis in the X-axis or Y-axis direction of the twelfth surface S12 perpendicular to the optical axis.

In detail, the Sag value of the twelfth surface S12 may change in the third region 3A and the fourth region 4A. In detail, the Sag value may increase or decrease in the third region 3A and the fourth region 34. In more detail, the Sag value may increase, decrease, and then increase again in the third region 3A and the fourth region 34.

That is, as the twelfth surface S12 extends from the optical axis toward the third end E3 and the fourth end E4, the absolute value of the Sag value may gradually increase, decrease, and then increase again.

For example, in the third region and the fourth region of the twelfth surface S12, the Sag values in the third and fourth regions may increase from 0.1 to 0.4 in the direction from the optical axis to the third end E3 and the fourth end E4.

In addition, in the third region and the fourth region of the twelfth surface S12, the Sag value in the third region and the fourth region may be reduced from more than 0.4 to 0.5 in the direction from the optical axis to the third end E3 and the fourth end E4.

In addition, in the third region and the fourth region of the twelfth surface S12, the Sag value in the third region and the fourth region may increase from more than 0.5 to 1.0 in the direction from the optical axis to the third end E3 and the fourth end E4.

Additionally, the twelfth surface S12 may include a region where the sign of the Sag value changes. In detail, the third region and the fourth region of the twelfth surface S12 are that the signs of the Sag values in the third region and the fourth region may vary from 0.35 to 0.6 in the direction from the optical axis to the third end E3 and the fourth end E4.

Additionally, the amount of change in the Sag value of the twelfth surface S12 may gradually increase as it extends from the optical axis toward the third end E3 and the fourth end E4.

In detail, the third region and the fourth region of the twelfth surface S12 are that the amount of Sag value change in the third and fourth regions up to 0.5 from the optical axis toward the third end E3 and the fourth end E4 may be less than the amount of change in the Sag value in the third region, which ranges from more than 0.5 to 1.

That is, the amount of change in the Sag value exceeding 50% to 100% of the effective radius of the twelfth surface S12 on the optical axis may be greater than the amount of change in the Sag value less than 50%.

The optical system and optical module according to the embodiment may satisfy at least one of the equations described below. Accordingly, the optical system and optical module according to the embodiment can improve aberration characteristics and have improved optical characteristics.

The optical system and optical module according to the embodiment may satisfy Equation 1 below.

$$60° \leq FOV \leq 90° \quad \text{[Equation 1]}$$

(FOV in Equation 1 means the effective viewing angle of the optical system.)

The optical system and optical module according to the embodiment may satisfy Equation 2 including any one of Equation 2-1, Equation 2-2, or Equation 2-3 below.

$$0.40 \leq TTL/OmgH \leq 4.0 \quad \text{[Equation 2-1]}$$

$$0.50 \leq TTL/ImgH \leq 1.0 \quad \text{[Equation 2-2]}$$

$$0.60 \leq TTL/ImgH \leq 0.75 \quad \text{[Equation 2-3]}$$

(In Equation 2, TTL (Total track length) means a distance in the optical axis direction from a vertex of the object side surface of the first lens to the image surface of the image sensor unit, and ImgH means twice the diagonal distance from the image surface of the image sensor unit overlapping the optical axis to the 1.0 field region of the image sensor unit.)

The optical system and optical module according to the embodiment may have a small TTL size as it satisfies Equation 2 above. Accordingly, the optical system and optical module according to the embodiment can be miniaturized, and the optical system and optical module according to the embodiment can be easily applied to a display device such as a smartphone.

The optical system and optical module according to the embodiment may satisfy Equation 3 below.

$$CA\_O\_x < CA\_O\_6 \quad \text{[Equation 3]}$$

(In Equation 3, CA_O_x means an effective diameter of the object side of the lens closest to the aperture, and CA_O_6 means an effective diameter of the object side of the sixth lens.)

As the optical system and optical module according to the embodiment satisfy Equation 3 above, the sixth lens with a large effective diameter and sensitive optical characteristics is placed far from the aperture, and the sensitivity reduction characteristics of optical systems and optical modules can be improved.

The optical system and optical module according to the embodiment may satisfy Equation 4 including any one of Equation 4-1, Equation 4-2, or Equation 4-3 below.

$$10° < |SA1\_O\_4| \leq 60° \quad \text{[Equation 4-1]}$$

$$5° < |SA1\_O\_4| \leq 55° \quad \text{[Equation 4-2]}$$

$$20° < |SA1\_O\_4| \leq 50° \quad \text{[Equation 4-3]}$$

(In Equation 4, SA1_O_4 refers to the slope angle between the normal line of the object side surface and the optical axis at any point on the object side surface at a distance ranging from 70% to 90% of the distance from the optical axis of the fourth lens to the effective diameter.)

As the optical system and optical module according to the embodiment satisfy Equation 4 above, the curvature of the lens surface may be increased in the region farthest from the optical axis of the fourth lens, which is placed adjacent to the fifth lens, which is a freeform lens, that is, in the region adjacent to the end direction of the effective diameter of the fourth lens. Accordingly, the aberration characteristics of the optical system and optical module can be improved.

The optical system and optical module according to the embodiment may satisfy Equation 5 including any one of Equation 5-1, Equation 5-2, or Equation 5-3 below.

$$15° < |SA1\_O\_6| \leq 45° \quad \text{[Equation 5-1]}$$

$$20° < |SA1\_O\_6| \leq 40° \quad \text{[Equation 5-2]}$$

$$25° < |SA1\_O\_6| \leq 34° \quad \text{[Equation 5-2]}$$

(In Equation 5, SA1_O_6 means the slope angle between the normal line of the object side surface and the optical axis at any point on the object side surface at a distance in the range of 40% to 60% of the distance from the optical axis of the fifth lens to the effective diameter.)

As the optical system and optical module according to the embodiment satisfy Equation 5 above, the curvature of the sixth lens, which is placed closest to the image sensor unit and adjacent to the fifth lens, which is a freeform lens, may be increased within a set region range. Accordingly, the aberration characteristics of the optical system and optical module may be improved.

The optical system and optical module according to the embodiment may satisfy Equation 6 including any one of Equation 6-1, Equation 6-2, or Equation 6-3 below.

$$1° \leq |SA1\_O\_x\_5| \leq 60°,\ 1° \leq |SA1\_O\_y\_5| \leq 60° \quad \text{[Equation 6-1]}$$

$$5° \leq |SA1\_O\_x\_5| \leq 55°,\ 5° \leq |SA1\_O\_y\_5| \leq 55° \quad \text{[Equation 6-2]}$$

$$10° \leq |SA1\_O\_x\_5| \leq 50°,\ 10° \leq |SA1\_O\_y\_5| \leq 50° \quad \text{[Equation 6-3]}$$

(In Equation 6, SA1_O_x_5 means a slope angle between the normal and the optical axis at any point on the object side surface at a distance in the range of % to % of the distance from the optical axis to the effective diameter in the X-axis direction from the optical axis of the fifth lens, and SA1_O_y_5 means a slope angle between the normal line and the optical axis at a point on the object side surface at a distance in the range of 75% to 95% of the distance from the optical axis to the effective diameter in the Y-axis direction from the optical axis of the fifth lens.)

As the optical system and optical module according to the embodiment satisfy Equation 6 above, the curvature of the fifth lens, which is a freeform lens, may be formed in a set range in a set region. Accordingly, the aberration characteristics of the optical system and optical module can be improved, and the image quality in the peripheral region can be improved.

The optical system and optical module according to the embodiment may satisfy Equation 7 including any one of Equation 7-1, Equation 7-2, or Equation 7-3 below.

$$10° \leq |SA1\_S\_x\_5| \leq 80°,\ 10° \leq |SA1\_S\_y\_5| \leq 80° \quad \text{[Equation 7-1]}$$

$$15° \leq |SA1\_S\_x\_5| \leq 70°,\ 15° \leq |SA1\_S\_y\_5| \leq 70° \quad \text{[Equation 7-2]}$$

$$20° \leq |SA1\_S\_x\_5| \leq 60°,\ 20° \leq |SA1\_S\_y\_5| \leq 60° \quad \text{[Equation 7-3]}$$

(In Equation 7, SA1_S_x_5 means a slope angle between the normal line and the optical axis at any point on the sensor side surface in the % to % distance range between the optical axis and the effective diameter in the X-axis direction of the fifth lens, and SA1_S_y_5 means a slope angle between the normal line and the optical axis at any point on the sensor side surface in the 75% to 95% distance range between the optical axis and the effective diameter in the Y-axis direction of the fifth lens.)

As the optical system and optical module according to the embodiment satisfy Equation 7 above, the curvature of the fifth lens, which is a freeform lens, may be formed in a set range in a set region. Accordingly, the aberration characteristics of the optical system and optical module may be improved, and the image quality in the peripheral region can be improved.

The optical system and optical module according to the embodiment may satisfy Equation 8 including any one of Equation 8-1, Equation 8-2, or Equation 8-3 below.

$$0.3 \leq CT\_4/T\_O\_c\_4 \leq 1.7 \quad \text{[Equation 8-1]}$$

-continued $$0.5 \le CT\_4/T\_O\_c\_4 \le 1.5 \quad \text{[Equation 8-2]}$$

$$0.7 \le CT\_4/T\_O\_c\_4 \le 1.3 \quad \text{[Equation 8-3]}$$

(In Equation 8, CT_4 means a thickness at the optical axis of the fourth lens, T_O_c_4 means a thickness in the direction parallel to the optical axis direction in a critical point region of the sensor side surface of the fourth lens, and the critical point region is defined as a range of 0.1 mm based on the critical point.)

As the optical system and optical module according to the embodiment satisfy Equation 8, the fourth lens may be formed so that the thickness of the optical axis is smaller than the thickness of the optical axis passing through the critical point of the fourth lens. Accordingly, aberrations of the optical system and optical module may be reduced.

The optical system and optical module according to the embodiment may satisfy Equation 9 including any one of Equation 9-1, Equation 9-2, or Equation 9-3 below.

$$0.3 \le CT\_6/T\_O\_c\_6 \le 1.5 \quad \text{[Equation 9-1]}$$

$$0.4 \le CT\_6/T\_O\_c\_6 \le 1.3 \quad \text{[Equation 9-2]}$$

$$0.5 \le CT\_6/T\_O\_c\_6 \le 1.0 \quad \text{[Equation 9-3]}$$

(In Equation 9, CT_6 means a thickness at the optical axis of the sixth lens, T_O_c_6 means a thickness in the direction parallel to the optical axis direction at the critical point region on the sensor side surface of the sixth lens, and the critical point region is defined as a range of 0.1 mm based on the critical point.)

The optical system and optical module according to the embodiment satisfy Equation 9 above, and accordingly, the thickness of the sixth lens at the optical axis may be formed to be smaller than the thickness in the direction of the optical axis passing through the critical point of the sixth lens. Accordingly, aberrations of the optical system and optical module can be reduced.

The optical system and optical module according to the embodiment may satisfy Equation 10 including any one of Equation 10-1, Equation 10-2, and Equation 10-3 below.

$$0.1 \le CD\_(4/5)/maxD\_(4/5) \le 1.5 \quad \text{[Equation 10-1]}$$

$$0.2 \le CD\_(4/5)/maxD\_(4/5) \le 1.0 \quad \text{[Equation 10-2]}$$

$$0.3 \le CD\_(4/5)/maxD\_(4/5) \le 0.7 \quad \text{[Equation 10-3]}$$

(In Equation 10, CD_(4/5) means a distance in the optical axis between the fourth lens and the fifth lens, and max D_(4/5) means a minimum distance between the fourth lens and the fifth lens.)

As the optical system and optical module according to the embodiment satisfy Equation 10 above, the distance on the optical axis between the fourth lens and the fifth lens may be smaller than the maximum distance. Accordingly, the fourth lens and the fifth lens may be formed in a shape that increases as the distance between the fourth lens and the fifth lens increases from the optical axis. Accordingly, aberrations of the optical system and optical module can be reduced, and image quality in the peripheral region can be improved.

The optical system and optical module according to the embodiment may satisfy Equation 11 below.

$$CA\_O\_x < CA\_O - x + 1 < CA\_O\_x + 2 \ldots < CA\_O\_6 \quad \text{[Equation 11]}$$

(In Equation 11, CA_O_x mean the effective diameter of the object side of the lens closest to the aperture, and CA_O_6 refers to the effective diameter of the object side of the sixth lens.)

As the optical system and optical module according to the embodiment satisfy the above equation 11, the aberration characteristics of the optical system and optical module may be improved by arranging lenses with large effective diameter and sensitive optical characteristics away from the aperture, and TTL can be reduced to achieve miniaturization of the optical module.

The optical system and optical module according to the embodiment may satisfy Equation 12 below.

$$\min|Sag\_O\_x\_5| \ne \min|Sag\_O\_y\_5| \quad \text{[Equation 12]}$$

As the optical system and optical module according to the embodiment satisfy Equation 12 above, the minimum absolute value of the Sag value in the X-axis direction and the minimum absolute value of the Sag value in the Y-axis direction of the fifth lens, which is a freeform lens, may be different. Accordingly, the relative illumination of the optical system and optical module can be improved, thereby improving image quality in the peripheral region.

The optical system and optical module according to the embodiment may satisfy Equation 13 below.

$$\max|Sag\_O\_x\_5| - \min|Sag\_O\_x\_5| \ne \max|Sag\_O\_y\_5| - \min|Sag\_O\_y\_5| \quad \text{[Equation 13]}$$

(In Equation 13, max |Sag_O_x_5| means an absolute value of the maximum Sag value in the X-axis direction on the object side of the fifth lens, min |Sag_O_x_5| means an absolute value of the minimum non-zero Sag value in the X-axis direction on the object side of the fifth lens, max |Sag_O_y_5| means an absolute value of the maximum Sag value in the Y-axis direction on the object side of the fifth lens, and min |Sag_O_y_5| means an absolute value of the minimum Sag value in the Y-axis direction that is not 0 on the object side of the fifth lens.)

As the optical system and optical module according to the embodiment satisfy Equation 13 above, the difference between the Sag value in the X-axis direction and the Sag value in the Y-axis direction of the fifth lens, which is a freeform lens, may be changed. Accordingly, the relative illumination of the optical system and optical module can be improved by differentiating the optical characteristics of the light passing in the X-axis direction and the light passing in the Y-axis direction of the fifth lens, thereby improving image quality in the peripheral region.

The optical system and optical module according to the embodiment may satisfy Equation 14 including any one of Equation 14-1, Equation 14-2, or Equation 14-3 below.

$$10\,um \le \max|Sag\_O\_x\_5| - \min|Sag\_O\_x\_5| \le 100\,um \quad \text{[Equation 14-1]}$$
$$10\,um \le \max|Sag\_O\_y\_5| - \min|Sag\_O\_y\_5| \le 100\,um$$

$$20\,\mu m \le \max|Sag\_O\_x\_6| - \min|Sag\_O\_x\_6| \le 80\,\mu m \quad \text{[Equation 14-2]}$$
$$20\,\mu m \le \max|Sag\_O\_y\_6| - \min|Sag\_O\_y\_6| \le 80\,\mu m$$

$$30\,\mu m \le \max|Sag\_O\_x\_6| - \min|Sag\_O\_x\_6| \le 60\,\mu m \quad \text{[Equation 14-3]}$$
$$30\,\mu m \le \max|Sag\_O\_y\_6| - \min|Sag\_O\_y\_6| \le 60\,\mu m$$

As the optical system and optical module according to the embodiment satisfy Equation 14 above, the size of the difference between the Sag value in the X-axis direction and the Sag value in the Y-axis direction of the fifth lens, which is a freeform lens, may be set to a set range. Accordingly, the relative illumination of the optical system and optical module can be improved by differentiating the optical characteristics of the light passing in the X-axis direction and the light passing in the Y-axis direction of the fifth lens, thereby improving image quality in the peripheral region.

The optical system and optical module according to the embodiment may satisfy Equation 15 below.

$$|\max T\_4 - \min T\_4| > |\max T\_5 - \min T\_5| \quad \text{[Equation 15]}$$

(In Equation 15, max T_4 means the maximum thickness of the fourth lens, min T_4 means the minimum thickness of the fourth lens, max T_5 means the maximum thickness of the fifth lens, and min T_5 means the minimum thickness of the fifth lens.)

As the optical system and optical module according to the embodiment satisfy Equation 15 above, the thickness difference between the fifth lens, which is a freeform lens, and the fourth lens disposed adjacent to the fifth lens may be controlled. In detail, the difference between the maximum and minimum thickness of the fourth lens may be made larger than the difference between the maximum and minimum thickness of the fifth lens. Accordingly, aberrations of the optical system and optical module can be reduced, and image quality in the peripheral region can be improved.

The optical system and optical module according to the embodiment may satisfy Equation 16 below.

$$|\max T\_6 - \min T\_6| > |\max T\_5 - \min T\_5| \quad \text{[Equation 16]}$$

(In Equation 16, max T_5 means a maximum thickness of the fifth lens, min T_5 means a minimum thickness of the fifth lens, max T_6 means a maximum thickness of the sixth lens, min T_6 means a minimum thickness of the sixth lens).

As the optical system and optical module according to the embodiment satisfy Equation 16 above, the thickness difference between the fifth lens, which is a freeform lens, and the sixth lens disposed adjacent to the fifth lens can be controlled. In detail, the difference between the maximum and minimum thickness of the sixth lens can be made larger than the difference between the maximum and minimum thickness of the fifth lens. Accordingly, aberrations of the optical system and optical module can be reduced, and image quality in the peripheral region can be improved.

The optical system and optical module according to the embodiment may satisfy Equation 17 below.

$$CT\_4 = \min T\_5, \quad \text{[Equation 17]}$$
$$CT\_5 \ne \min T\_5,$$
$$CT\_6 = \min T\_6$$

(In Equation 17, CT_4 means the thickness at the optical axis of the fourth lens, CT_5 means the thickness at the optical axis of the fifth lens, CT_6 refers to the thickness at the optical axis of the sixth lens.)

As the optical system and optical module according to the embodiment satisfy Equation 17 above, the thicknesses of the fifth lens, which is a freeform lens, and the fourth and sixth lenses disposed adjacent to the fifth lens can be controlled. In detail, the size of the minimum thickness of the fourth lens may be the same as the thickness at the optical axis of the fourth lens, the size of the minimum thickness of the fifth lens may be different from the thickness at the optical axis of the fifth lens, the size of the minimum thickness of the sixth lens may be the same as the thickness of the sixth lens at the optical axis. As a result, aberrations in the optical system and optical module can be reduced, and image quality in the peripheral region can be improved.

The optical system and optical module according to the embodiment may satisfy Equation 18 including any one of Equation 18-1, Equation 18-2, or Equation 18-3 below.

$$1 \le \max D\_4/5 / \min D\_4/5 \le 20 \quad \text{[Equation 18-1]}$$
$$1.5 \le \max D\_4/5 / \min D\_4/5 \le 15 \quad \text{[Equation 18-2]}$$
$$2 \le \max D\_4/5 / \min D\_4/5 \le 10 \quad \text{[Equation 18-3]}$$

(In Equation 18, max D_4/5 means a maximum distance between the fourth lens and the fifth lens, and min D_4/5 means a minimum distance between the fourth lens and the fifth lens.)

As the optical system and optical module according to the embodiment satisfy Equation 18 above, the distance between the fourth lens, which is a freeform lens, and the fifth lens disposed adjacent to the fourth lens may be set to a set range. Accordingly, aberrations of the optical system and optical module can be reduced, the relative illumination can be increased, and image quality in the peripheral region can be improved.

The optical system and optical module according to the embodiment may satisfy Equation 19 including any one of Equation 19-1, Equation 19-2, or Equation 19-3 below.

$$0.1 \le \max D\_5/6 / \min D\_5/6 \le 10 \quad \text{[Equation 19-1]}$$
$$0.2 \le \max D\_5/6 / \min D\_5/6 \le 5 \quad \text{[Equation 19-2]}$$
$$0.3 \le \max D\_5/6 / \min D\_5/6 \le 1 \quad \text{[Equation 19-3]}$$

(In Equation 19, max D_5/6 means the maximum distance between the fifth lens and the sixth lens, and min D_5/6 means the minimum distance between the fifth lens and the sixth lens.)

As the optical system and optical module according to the embodiment satisfy Equation 19 above, the distance between the fifth lens, which is a freeform lens, and the sixth lens disposed adjacent to the fifth lens can be set to a set range. Accordingly, the aberration of the optical system and optical module can be reduced, the relative illumination can be increased, and the image quality of the peripheral region can be improved.

The optical system and optical module according to the embodiment may satisfy Equation 20 below.

$$\min\_D\_4/5 < \min T\_4, \quad \min D\_5/6 < \min T\_6 \quad \text{[Equation 20]}$$

As the optical system and optical module according to the embodiment satisfy Equation 20 above, each thickness of the fifth lens, which is a freeform lens, and a fourth lens disposed adjacent to the fifth lens and the sixth lens and the distance between the lenses can be controlled. In detail, the minimum distance between the fourth lens and the fifth lens is smaller than the minimum thickness of the fourth lens, the minimum distance between the fifth lens and the sixth lens may be smaller than the minimum thickness of the sixth lens. Accordingly, the aberration of the optical system and optical module can be reduced, the relative illumination can be increased, and the image quality of the peripheral region can be improved.

The optical system and optical module according to the embodiment may satisfy Equation 21 below.

$$\min T\_4 < T\_c\_4 \leq \max T\_4 \quad \text{[Equation 21]}$$

(In Equation 21, min T_4 means the minimum thickness of the fourth lens, max T_4 means the maximum thickness of the fourth lens, T_c_4 means a thickness in the direction parallel to the optical axis direction in the critical point region of the sensor side of the fourth lens, and the critical point region is defined as a range of 0.1 mm based on the critical point).

As the optical system and optical module according to the embodiment satisfy Equation 21 above, the thickness size of the fourth lens disposed close to the fifth lens, which is a freeform lens, may be controlled at various positions. In detail, the thickness of the lens passing through the critical point region of the fourth lens may be made larger than the minimum thickness of the fourth lens and smaller than the maximum thickness. Accordingly, the aberration of the optical system and optical module can be reduced by adjusting the thickness of each region of the fourth lens.

The optical system and optical module according to the embodiment may satisfy Equation 22 below.

$$\min T\_6 < T\_c\_6 \leq \max T\_6 \quad \text{[Equation 22]}$$

(In Equation 22, min T_6 means the minimum thickness of the sixth lens, max T_6 means the maximum thickness of the sixth lens, T_c_6 refers to the thickness in the direction parallel to the optical axis direction at the critical point region on the sensor side of the sixth lens, and the critical point region is defined as a range of 0.1 mm based on the critical point)

As the optical system and optical module according to the embodiment satisfy Equation 22 above, the thickness size of the sixth lens disposed close to the fifth lens, which is a freeform lens, may be controlled at various positions. In detail, the thickness of the lens passing through the critical point region of the sixth lens may be made larger than the minimum thickness of the sixth lens and smaller than the maximum thickness. Accordingly, the aberration of the optical system and optical module can be reduced by adjusting the thickness of each region of the sixth lens.

The optical system and optical module according to the embodiment may satisfy Equation 23 including any one of Equation 23-1, Equation 23-2, and Equation 23-3 below.

$$25° < \max|SA\_O\_4| < 75° \quad \text{[Equation 23-1]}$$
$$20° < \max|SA\_S\_4| < 70°$$
$$0° < \max|SA\_O\_4| - \max|SA\_S\_4| < 20°$$

$$30° < \max|SA\_O\_4| < 65° \quad \text{[Equation 23-2]}$$
$$30° < \max|SA\_S\_4| < 60°$$
$$0° < \max|SA\_O\_4| - \max|SA\_S\_4| < 10°$$

$$35° < \max|SA\_O\_4| < 60° \quad \text{[Equation 23-3]}$$
$$40° < \max|SA\_S\_4| < 50°$$
$$0° < \max|SA\_O\_4| - \max|SA\_S\_4| < 7°$$

(In Equation 23, max |SA_O_4| means the maximum angle of inclination between the normal line and the optical axis at any point on the object side surface in the distance range from the optical axis of the fourth lens to the effective diameter, and max |SA_S_4| means the maximum angle of inclination between the normal and the optical axis at any point on the sensor side in the distance range from the optical axis of the fourth lens to the effective diameter.)

As the optical system and optical module according to the embodiment satisfy Equation 23 above, the shape of the fourth lens disposed close to the fifth lens, which is a freeform lens, can be controlled. In detail, the distance between the fourth lens and the fifth lens adjacent to the fifth lens can be adjusted by setting the difference between the maximum slope angle and the maximum angle of the fourth lens to a set range. Accordingly, the aberration of the optical system and optical module can be reduced by adjusting the slope angle of the fourth lens.

The optical system and optical module according to the embodiment may satisfy Equation 24 including any one of Equation 24-1, Equation 24-2, and Equation 24-3 below.

$$10° < \max|SA\_O\_6| < 50° \quad \text{[Equation 24-1]}$$
$$20° < \max|SA\_S\_6| < 60°$$
$$0° < \max|SA\_O\_6| - \max|SA\_S\_6| < 30°$$

$$15° < \max|SA\_O\_6| < 40° \quad \text{[Equation 24-2]}$$
$$25° < \max|SA\_S\_6| < 50°$$
$$0° < \max|SA\_O\_6| - \max|SA\_S\_6| < 20°$$

$$20 < \max|SA\_O\_6| < 30° \quad \text{[Equation 24-3]}$$
$$30° < \max|SA\_S\_6| < 40°$$
$$0° < \max|SA\_O\_6| - \max|SA\_S\_6| < 10°$$

(In Equation 24, max |SA_O_6| means the maximum angle of inclination between the normal line and the optical axis at any point on the object side in the distance range from the optical axis of the sixth lens to the effective diameter, and max |SA_S_6| means the maximum angle of inclination between the normal and the optical axis at any point on the sensor side in the distance range from the optical axis of the sixth lens to the effective diameter.)

As the optical system and optical module according to the embodiment satisfy Equation 24 above, the shape of the sixth lens disposed close to the fifth lens, which is a freeform lens, can be controlled. In detail, the distance between the sixth lens and the fifth lens adjacent to the fifth lens can be adjusted by setting the difference between the maximum slope angle and the maximum angle of the sixth lens to a set range. Accordingly, the aberration of the optical system and optical module can be reduced by adjusting the slope angle of the sixth lens.

The optical system and optical module according to the embodiment may satisfy Equation 25 including any one of Equation 25-1, Equation 25-2, and Equation 25-3 below.

$$\max|SA\_O\_6| < \max|SA\_O\_4|,\ \max|SA\_S\_6| < \max|SA\_S\_4|,\ \max|SA\_O\_6| < 40°\ \max|SA\_S\_6| < 50° \quad \text{[Equation 25-1]}$$

$$\max|SA\_O\_6| < \max|SA\_O\_4|,\ \max|SA\_S\_6| < \max|SA\_S\_4|,\ \max|SA\_O\_6| < 35°\ \max|SA\_S\_6| < 45° \quad \text{[Equation 25-2]}$$

$$\max|SA\_O\_6| < \max|SA\_O\_4|,\ \max|SA\_S\_6| < \max|SA\_S\_4|,\ \max|SA\_O\_6| < 30°\ \max|SA\_S\_6| < 40° \quad \text{[Equation 25-3]}$$

(In Equation 25, max |SA_O_4| means the maximum angle of inclination between the normal line and the optical axis at any point on the object side in the distance range from the optical axis of the fourth lens to the effective diameter, max |SA_S_4| means the maximum angle of inclination between the normal and the optical axis at any point on the sensor side in the distance range from the optical axis of the fourth lens to the effective diameter, max |SA_O_6| means the maximum angle of inclination between the normal and the optical axis at any point on the object side in the distance range from the optical axis of the sixth lens to the effective diameter, and max SA_S_6| means the maximum angle of inclination between the normal line on the sensor side and the optical axis at any point in the distance range from the optical axis of the sixth lens to the effective diameter.)

As the optical system and optical module according to the embodiment satisfy Equation 25 above, the shapes of the fourth lens and sixth lens disposed adjacent to the fifth lens, which is a freeform lens, may be controlled. In detail, the maximum slope angle of the object side surface of the sixth lens may be smaller than the maximum slope angle of the object side surface of the fourth lens, and the maximum slope angle of the sensor side surface of the sixth lens may be smaller than the maximum slope angle of the sensor side surface of the fourth lens.

Accordingly, the distance between the fourth lens and the sixth lens adjacent to the fifth lens can be adjusted. Accordingly, the aberration of the optical system and optical module can be reduced by adjusting the inclination angles of the fourth lens and sixth lens, which are lenses adjacent to the fifth lens, which is a freeform lens.

The optical system and optical module according to the embodiment may satisfy Equation 26 below.

$$P\_1 \text{ is positive } (+),\quad P\_2 \text{ is negative } (-), \text{ and} \quad \text{[Equation 26]}$$

-continued $$P\_5 \text{ is positive } (+)$$

(In Equation 26, P_1 means a refractive power sign of the first lens, P_2 means a refractive power sign of the second lens, and P_5 means a refractive power sign of the fifth lens.)

As the optical system and optical module according to the embodiment satisfy Equation 26 above, the TTL size of the optical system module may be reduced, and the effective diameter of the object side surface of the lenses may be reduced. As a result, the optical system and optical module may be easily applied to display devices such as smartphones, resolution can be improved, and image quality in the peripheral region can be improved.

The optical system and optical module according to the embodiment may satisfy Equation 27 including any one of Equation 27-1, Equation 27-2, or Equation 27-3 below.

$$FOV(\theta) \le 90°,\ 1 \le CA\_O\_6/CA\_O\_x \le 3 \quad \text{[Equation 27-1]}$$

$$FOV(\theta) \le 90°,\ 1.3 \le CA\_O\_6/CA\_O\_x \le 2.7 \quad \text{[Equation 27-2]}$$

$$FOV(\theta) \le 90°,\ 1.5 \le CA\_O\_6/CA\_O\_x \le 2.5 \quad \text{[Equation 27-3]}$$

(In Equation 27, FOV means an effective angle of view of the optical system, CA_O_x means an effective diameter of the object side of the lens closest to the aperture, and CA_O_6 means an effective diameter of the object side of the sixth lens.)

As the optical system and optical module according to the embodiment satisfy Equation 27 above, the effective diameter is large within the set effective angle of view range, by adjusting the effective diameter ratio of lenses with sensitive optical characteristics and lenses with small and relatively insensitive effective diameters, the aberration characteristics and resolution of optical systems and optical modules can be improved.

The optical system and optical module according to the embodiment may satisfy Equation 28 including any one of Equation 28-1, Equation 28-2, and Equation 28-3 below.

$$P\_1 \text{ sign} \ne P\_2 \text{ sign},\ V\_1 > V\_2,\ 10 < V1 < 50 < V2,\ N\_1 < N\_2 \quad \text{[Equation 28-1]}$$

$$P\_1 \text{ sign} \ne P\_2 \text{ sign},\ V\_1 > V\_2,\ 10 < V1 < 50 < V2,\ N\_1 < N\_2 \quad \text{[Equation 28-2]}$$

$$P\_1 \text{ sign} \ne P\_2 \text{ sign},\ V\_1 > V\_2,\ 10 < V1 < 50 < V2,\ N\_1 < N\_2 \quad \text{[Equation 28-3]}$$

(In Equation 28, P_1 sign is the refractive power sign of the first lens having a positive (+) or negative (−) sign, P_2 sign is the refractive power sign of the second lens having a positive (+) or negative (−) sign, V_1 is the Abbe number of the first lens, V_2 is the Abbe number of the second lens, N_1 is the refractive index of the first lens, and N_2 means the refractive index of the second lens.)

As the optical system and optical module according to the embodiment satisfy Equation 28 above, chromatic aberration of the optical system and optical module can be improved by setting the refractive indices and Abbe numbers of the first lens and the second lens close to the object side to a set range.

The optical system and optical module according to the embodiment may satisfy Equation 29 including any one of Equation 29-1, Equation 29-2, and Equation 29-3 below.

$$1.3\ \text{mm} \le CR\_O\_1 \le 2.5\ \text{mm} \quad 10\ \text{mm} \le CR\_O\_4 \le 30\ \text{mm} \qquad \text{[Equation 29-1]}$$

$$1.4\ \text{mm} \le CR\_O\_1 \le 2\ \text{mm} \quad 13\ \text{mm} \le CR\_O\_4 \le 25\ \text{mm} \qquad \text{[Equation 29-2]}$$

$$1.5\ \text{mm} \le CR\_O\_1 \le 2\ \text{mm} \quad 15\ \text{mm} \le CR\_O\_4 \le 20\ \text{mm} \qquad \text{[Equation 29-3]}$$

(In Equation 29, CR_O_1 means the radius of curvature at the optical axis of the object side surface of the first lens, and CR_O_4 means the radius of curvature at the optical axis of the object side surface of the fourth lens.)

As the optical system and optical module according to the embodiment satisfy Equation 29 above, the radius of curvature of the first lens closest to the object side and the radius of curvature of the fourth lens disposed adjacent to the fifth lens, which is a freeform lens, can be set to a set range, and this can facilitate the manufacturing process of optical systems and optical modules.

The optical system and optical module according to the embodiment may satisfy Equation 30 including any one of Equation 30-1, Equation 30-2, and Equation 30-3 below.

$$1.00 \le |EFL/f\_3| + |EFL/f\_4| + |EFL/f\_5| + |EFL/f\_6| \le 10.00 \qquad \text{[Equation 30-1]}$$

$$2.00 \le |EFL/f\_3| + |EFL/f\_4| + |EFL/f\_5| + |EFL/f\_6| \le 7.00 \qquad \text{[Equation 30-2]}$$

$$3.00 \le |EFL/f\_3| + |EFL/f\_4| + |EFL/f\_5| + |EFL/f\_6| \le 5.00 \qquad \text{[Equation 30-3]}$$

(In Equation 30, f_3 means the focal length of the third lens, f_4 means the focal length of the fourth lens, f_5 means the focal length of the fifth lens, f_6 means the focal length of the sixth lens, EFL refers to the effective focal length of the optical system.)

As the optical system and optical module according to the embodiment satisfy Equation 30 above, the aberration characteristics of the optical system and optical module can be improved by setting the ratio of the effective focal lengths of the sequentially arranged third lens, fourth lens, fifth lens, and sixth lens to a set range.

The optical system and optical module according to the embodiment may satisfy Equation 31 including any one of Equation 31-1, Equation 31-2, and Equation 31-3 below.

$$1 \le |f\_1/f\_2| + |f\_1/f\_3| + |f\_1/f\_4| + |f\_1/f\_5| + |f\_1/f\_6| \le 15 \qquad \text{[Equation 31-1]}$$

-continued $$2 \le |f\_1/f\_2| + |f\_1/f\_3| + |f\_1/f\_4| + |f\_1/f\_5| + |f\_1/f\_6| \le 13 \qquad \text{[Equation 31-2]}$$

$$3 \le |f\_1/f\_2| + |f\_1/f\_3| + |f\_1/f\_4| + |f\_1/f\_5| + |f\_1/f\_6| \le 10 \qquad \text{[Equation 31-3]}$$

(In Equation 31, f_6 means the focal length of the sixth lens, f_5 means the focal length of the fifth lens, f_4 means the focal length of the fourth lens, and f_3 means the focal length of the third lens, means, f_2 means the focal length of the second lens, and f_1 means the focal length of the first lens.)

As the optical system and optical module according to the embodiment satisfy Equation 31 above, the aberration characteristics of the optical system and optical module can be improved by setting the ratio of the effective focal lengths of the sequentially arranged third lens, fourth lens, fifth lens, and sixth lens to a set range.

The optical system and optical module according to the embodiment may satisfy Equation 32 including any one of Equation 32-1, Equation 32-2, and Equation 32-3 below.

$$0 < |f\_4/CT\_4| \le 40 \qquad \text{[Equation 32-1]}$$

$$5 \le |f\_4/CT\_4| \le 30 \qquad \text{[Equation 32-2]}$$

$$10 \le |f\_4/CT\_4| \le 20 \qquad \text{[Equation 32-3]}$$

(In Equation 32, f_4 means the focal length of the fourth lens, and CT_4 means the thickness at the optical axis of the fourth lens.)

As the optical system and optical module according to the embodiment satisfy Equation 32 above, the aberration characteristics of the optical system and optical module can be improved by setting a ratio of the focal length of the fourth lens disposed adjacent to the fifth lens, which is a freeform lens, and the thickness in the optical axis to a set range.

The optical system and optical module according to the embodiment may satisfy Equation 33 including any one of Equation 33-1, Equation 33-2, and Equation 33-3 below.

$$0 < |f\_6/CT\_6| \le 2 \qquad \text{[Equation 33-1]}$$

$$0.4 \le |f\_6/CT\_6| \le 1.5 \qquad \text{[Equation 33-2]}$$

$$0.8 \le |f\_6/CT\_6| \le 1 \qquad \text{[Equation 33-3]}$$

(In Equation 33, f_6 means the focal length of the sixth lens, and CT_6 means the thickness at the optical axis of the sixth lens.)

As the optical system and optical module according to the embodiment satisfy Equation 33 above, the aberration characteristics of the optical system and optical module can be improved by setting a ratio of the focal length of the sixth lens disposed adjacent to the fifth lens, which is a freeform lens, and the thickness in the optical axis to a set range.

The optical system and optical module according to the embodiment may satisfy Equation 34 including any one of Equation 34-1, Equation 34-2, and Equation 34-3 below.

$$0.2 \le CT\_6/CT\_4 \le 2.5 \qquad \text{[Equation 34-1]}$$

-continued $$0.5 \le CT\_6/CT\_4 \le 2.0 \quad \text{[Equation 34-2]}$$

$$0.7 \le CT\_6/CT\_4 \le 1.5 \quad \text{[Equation 34-3]}$$

(In Equation 34, CT_6 means the thickness at the optical axis of the sixth lens, and CT_4 means the thickness at the optical axis of the fourth lens.)

As the optical system and optical module according to the embodiment satisfy the above equation 34, a ratio of the thickness of the fourth lens and the sixth lens disposed adjacent to the fifth lens, which is a freeform lens, in the optical axis have a set range, aberration characteristics of the optical system and the optical module may be improved.

The optical system and optical module according to the embodiment may satisfy Equation 46 including any one of Equation 35-1, Equation 35-2, and Equation 35-3 below.

$$0.3 \le TTL/EFL \le 2.0 \quad \text{[Equation 35-1]}$$

$$0.5 \le TTL/EFL \le 1.7 \quad \text{[Equation 35-2]}$$

$$0.8 \le TTL/EFL \le 1.5 \quad \text{[Equation 35-3]}$$

(In Equation 35, TTL (Total track length) refers to the distance in the optical axis (OA) direction from the vertex of the object side surface of the first lens to an image surface of the image sensor unit, and EFL refers to the effective focal length of the optical system.)

As the optical system and optical module according to the embodiment satisfy Equation 35 above, the ratio of TTL and effective focal length is set to a set range, so that the optical system and optical module can be implemented slim to have an appropriate size, and the aberration characteristics can be improved.

The optical system and optical module according to the embodiment may satisfy Equation 36 including any one of Equation 36-1, Equation 36-2, and Equation 36-3 below.

$$0.1 \le CD\_4/5/D\_ms\_4/5 \le 1.0 \quad \text{[Equation 36-1]}$$

$$0.12 \le CD\_4/5/D\_ms\_4/5 \le 0.5 \quad \text{[Equation 36-2]}$$

$$0.15 \le CD\_4/5/D\_ms\_4/5 \le 0.3 \quad \text{[Equation 36-3]}$$

(In Equation 36, CD_4/5 means the distance from the optical axis of the fourth lens and the fifth lens, and D_ms_4/5 means the distance in the optical axis direction from the point where the absolute value of the sag value on the object side surface of the fourth and fifth lenses is the greatest.)

As the optical system and optical module according to the embodiment satisfy Equation 36 above, the aberration characteristics of the optical system and optical module can be improved by setting the ratio of the distance from the maximum sag value of the adjacent fourth and fifth lenses to the distance from the optical axis to a set range.

The optical system and optical module according to the embodiment may satisfy Equation 37 including any one of Equation 37-1, Equation 37-2, and Equation 37-3 below.

$$0.1 \le CD\_5/6/D\_ms\_5/6 \le 0.5 \quad \text{[Equation 37-1]}$$

-continued $$0.12 \le CD\_5/6/D\_ms\_5/6 \le 0.3 \quad \text{[Equation 37-2]}$$

$$0.15 \le CD\_5/6/D\_ms\_5/6 \le 0.2 \quad \text{[Equation 37-3]}$$

(In Equation 37, CD_5/6 means the distance from the optical axis of the fifth lens and sixth lens, D_ms_5/6 means a distance in the optical axis direction from the point where the absolute value of the Sag value on the object side surface of the sixth lens and fifth lens is greatest.)

As the optical system and optical module according to the embodiment satisfy Equation 37 above, by setting the ratio of the distance from the maximum Sag value of the adjacent fourth lens and fifth lens to the distance from the optical axis to a set range, the aberration characteristics of the optical system and optical module can be improved.

The optical system and optical module according to the embodiment may satisfy Equation 38 including any one of Equation 38-1, Equation 38-2, and Equation 38-3 below.

$$0.1 \le CT\_4/T\_ms\_4 \le 5 \quad \text{[Equation 38-1]}$$

$$0.3 \le CT\_4/T\_ms\_4 \le 3 \quad \text{[Equation 38-2]}$$

$$0.5 \le CT\_4/T\_ms\_4 \le 1 \quad \text{[Equation 38-3]}$$

(In Equation 38, CT_4 means the thickness at the optical axis of the fourth lens, T_ms_4 means the thickness in the direction of the optical axis passing through the point where the absolute value of the sag value on the object side surface of the fifth lens is the greatest.)

As the optical system and optical module according to the embodiment satisfy Equation 38 above, a ratio of the thickness at the maximum sag value of the fourth lens disposed adjacent to the fifth lens, which is a freeform lens, and the thickness at the optical axis is set to a set range, and as a result, the aberration characteristics of the optical system and optical module can be improved.

The optical system and optical module according to the embodiment may satisfy Equation 39 including any one of Equation 39-1, Equation 39-2, and Equation 39-3 below.

$$0.1 \le CT\_6/T\_ms\_6 \le 5 \quad \text{[Equation 39-1]}$$

$$0.15 \le CT\_6/T\_ms\_6 \le 3 \quad \text{[Equation 39-2]}$$

$$0.2 \le CT\_6/T\_ms\_6 \le 1 \quad \text{[Equation 39-3]}$$

(In Equation 39, CT_6 means the thickness at the optical axis of the sixth lens, T_ms_means the thickness in the direction of the optical axis passing through the point where the absolute value of the sag value on the object side surface of the sixth lens is the greatest.)

As the optical system and optical module according to the embodiment satisfy Equation 39 above, a ratio of the thickness at the maximum sag value of the sixth lens disposed adjacent to the fifth lens, which is a freeform lens, and the thickness at the optical axis is set to a set range, and as a result, the aberration characteristics of the optical system and optical module can be improved.

The optical system and optical module according to the embodiment may satisfy Equation 40 including any one of Equation 40-1, Equation 40-2, and Equation 40-3 below.

$$20 < V5 + V6 < 120 \quad \text{[Equation 40-1]}$$

$$30 < V5 + V6 < 90 \quad \text{[Equation 40-2]}$$

$$40 < V5 + V6 < 80 \quad \text{[Equation 40-3]}$$

(In Equation 40, V5 means the Abbe number of the fifth lens, and V6 means the Abbe number of the sixth lens.)

As the optical system and optical module according to the embodiment satisfy Equation 40 above, the size of the Abbe number of the fifth and sixth lenses disposed close to the image sensor unit is set to a set range, thereby improving the aberration characteristics of the optical system and optical module.

The optical system and optical module according to the embodiment may satisfy Equation 41 including any one of Equation 41-1, Equation 41-2, and Equation 41-3 below.

$$3.5 < TTL < 8.0 \quad \text{[Equation 41-1]}$$

$$3.8 < TTL < 7.0 \quad \text{[Equation 41-2]}$$

$$4.2 < TTL < 6.0 \quad \text{[Equation 41-3]}$$

(In Equation 41, TTL (Total track length) means the distance in the optical axis direction from the vertex of the object side surface of the first lens to the image surface of the image sensor unit)

As the optical system and optical module according to the embodiment satisfy Equation 41 above, since the size of the TTL can be set to a set range, the optical system and optical module according to the embodiment can be miniaturized, so the optical system and optical module according to the embodiment can be easily applied to display devices such as smartphones.

The optical system and optical module according to the embodiment may satisfy Equation 42 including any one of Equation 42-1, Equation 42-2, and Equation 42-3 below.

$$1.5 < TTL/EPD < 4 \quad \text{[Equation 42-1]}$$

$$1.8 < TTL/EPD < 3 \quad \text{[Equation 42-2]}$$

$$2.0 < TTL/EPD < 2.7 \quad \text{[Equation 42-3]}$$

(In Equation 42, TTL (Total track length) refers to the distance in the optical axis direction from the vertex of the object side surface of the first lens to the image surface of the image sensor unit, EPD refers to the entrance pupil diameter of the optical system.)

As the optical system and optical module according to the embodiment satisfy Equation 42 above, the resolution of the optical system and optical module can be improved by setting the TTL and entrance pupil diameter to a set range.

The optical system and optical module according to the embodiment may satisfy Equation 43 including any one of Equation 43-1, Equation 43-2, and Equation 43-3 below.

$$1 < F\ \text{number} < 3.5 \quad \text{[Equation 43-1]}$$

$$1.5 < F\ \text{number} < 3.0 \quad \text{[Equation 43-2]}$$

-continued $$1.7 < F\ \text{number} < 2.5 \quad \text{[Equation 43-3]}$$

As the optical system and optical module according to the embodiment satisfy Equation 43 above, the resolution of the optical system and optical module can be improved by setting the size of the F number to a set range.

The optical system and optical module according to the embodiment may satisfy Equation 44 including any one of Equation 44-1, Equation 44-2, and Equation 44-3 below.

$$0.5\ \text{mm} < D\_mx\_6/I < 2.0\ \text{mm} \quad \text{[Equation 44-1]}$$

$$0.65\ \text{mm} < D\_mx\_6/I < 1.8\ \text{mm} \quad \text{[Equation 44-2]}$$

$$0.8\ \text{mm} < D\_mx\_6/I < 1.5\ \text{mm} \quad \text{[Equation 44-3]}$$

(In Equation 44, D_mx_6/I means a distance in the optical axis direction from the point having the absolute value of the maximum Sag value on the sensor side surface of the fifth lens to the image surface of the image sensor unit.)

As the optical system and optical module according to the embodiment satisfy Equation 44 above, by setting the distance between the sixth lens, which is the last lens of the optical system, and the image sensor unit within a set range, manufacturing of the optical system and optical module may be facilitated, and optical characteristics can be improved by minimizing interference between the image sensor unit and the optical system.

The optical system 1000 and the optical module 2000 according to embodiments may satisfy at least one of Equations 1 to 44 described above. In detail, the optical system 1000 and the optical module 2000 according to the embodiment may satisfy any one of the above equations or a combination of at least two of the above equations.

As the optical system 1000 and the optical module 2000 according to the embodiment satisfy any one of the above equations or a combination of at least two or more equations, the optical system 1000 and the optical module 2000 may have improved optical characteristics. Additionally, the optical system 1000 and the optical module 2000 can minimize optical distortion in image results. Additionally, small optical systems and optical modules may be implemented. Additionally, chromatic aberration of the optical system 1000 and the optical module 2000 can be reduced, and the relative illumination can be increased to improve peripheral image quality.

Hereinafter, The optical system and optical module according to embodiments will be described with reference to the drawings.

First, the optical system 1000 and the optical module 2000 according to the first embodiment will be described in more detail with reference to FIGS. 8 to 19.

Figure 8:
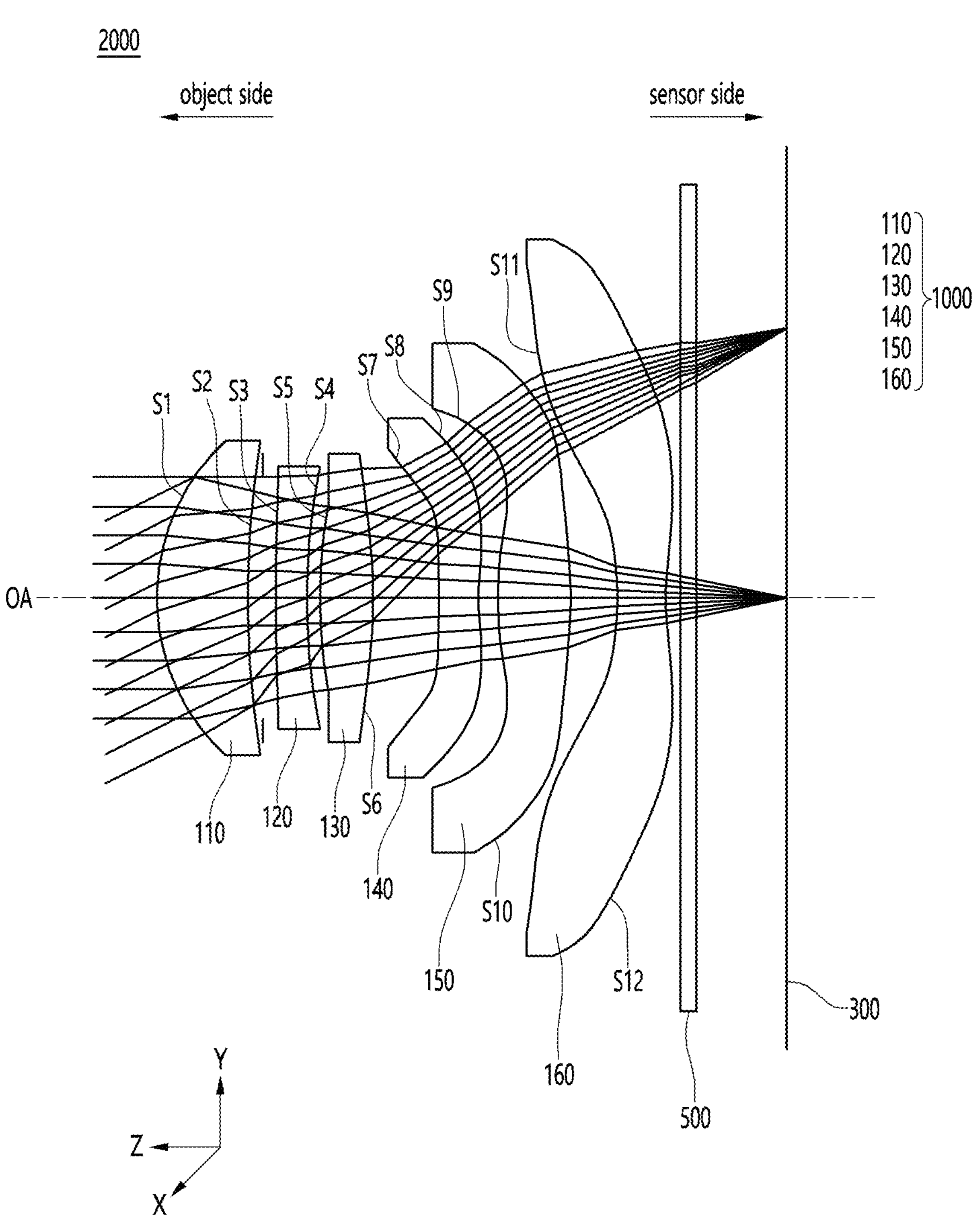
FIG. 8 is a diagram showing the configuration of an optical system and an optical module according to a first embodiment.

Referring to FIG. 8, the optical system 1000 and the optical module 2000 according to the first embodiment may include six lenses.

In detail, the optical system 1000 and the optical module 2000 according to the first embodiment may include a first lens 110, a second lens 120, a third lens 130, a fourth lens 140, a fifth lens 150, a sixth lens 160 and an image sensor unit 300 arranged sequentially from the object side to the sensor side. The first lens 110, the second lens 120, the third lens 130, the fourth lens 140, the fifth lens 150 and the sixth lens 160 may be sequentially arranged along the optical axis of the optical system 1000 while being spaced apart from each other.

Additionally, a filter unit 500 may be disposed between the plurality of lenses 110, 120, 130, 140, 150 and 160 and the image sensor unit 300. The filter unit 500 may be disposed between the sixth lens 160 and the image sensor unit 300.

Additionally, the optical system 1000 according to the first embodiment may include an aperture (not shown). The aperture may be disposed between the first lens 110 and the second lens 120. Alternatively, the sensor side surface of the first lens 110 may be an aperture.

The first to sixth lenses 110, 120, 130, 140, 150 and 160 according to the first embodiment each may have Radius of Curvature, Thickness, Distance, Refractive Index, and Abbe's Number.

In detail, the first to sixth lenses 110, 120, 130, 140, 150 and 160 according to the first embodiment, Radius of Curvature, Thickness, Distance, Refractive Index and Abbe's Number may be the same as FIG. 9.

Referring to FIGS. 8 and 9, in the optical system 1000 according to the first embodiment, the first lens 110 may have positive refractive power at the optical axis. The first surface S1 of the first lens 110 may be convex with respect to the object side surface on the optical axis, and the second surface S2 may be concave with respect to the sensor side surface on the optical axis. The first lens 110 may overall have a meniscus shape convex from the optical axis toward the object side. The first surface S1 may be an aspherical surface, and the second surface S2 may be an aspherical surface.

The second lens 120 may have negative (−) refractive power at the optical axis. The third surface S3 of the second lens 120 may be convex with respect to the object side surface on the optical axis, and the fourth surface S4 may be concave with respect to the sensor side surface on the optical axis. The second lens 120 may overall have a meniscus shape convex from the optical axis toward the object side. The third surface S3 may be an aspherical surface, and the fourth surface S4 may be an aspherical surface.

The third lens 130 may have positive (+) refractive power at the optical axis. The fifth surface S5 of the third lens 130 may be convex with respect to the object side surface on the optical axis, and the sixth surface S6 may be convex with respect to the sensor side surface on the optical axis. The third lens 130 may have an overall shape in which both sides are convex on the optical axis. The fifth surface S5 may be an aspherical surface, and the sixth surface S6 may be an aspherical surface.

The fourth lens 140 may negative (−) refractive power at the optical axis. The seventh surface S7 of the fourth lens 140 may be convex with respect to the object side surface on the optical axis, and the eighth surface S8 may be concave with respect to the sensor side surface on the optical axis. The fourth lens 140 may overall have a convex meniscus shape from the optical axis toward the object side. The seventh surface S7 may be an aspherical surface, and the eighth surface S8 may be an aspherical surface.

The fifth lens 150 may have positive (+) refractive power at the optical axis. The ninth surface S9 of the fifth lens 150 may be convex with respect to the object side surface on the optical axis, and the tenth surface S10 may be convex with respect to the sensor side surface on the optical axis. The fifth lens 150 may have an overall shape where both sides are convex on the optical axis. The ninth surface S9 may be an aspherical surface, and the tenth surface S10 may be an aspherical surface.

At least one of the ninth surface S9 and the tenth surface S10 may include a freeform surface. In detail, the ninth surface S9 and the tenth surface S10 may include freeform surfaces. That is, the fifth lens 150 may be a freeform lens.

The sixth lens 160 may have negative (−) refractive power at the optical axis. The eleventh surface S11 of the sixth lens 160 may be concave with respect to the object side surface on the optical axis, and the twelfth surface S12 may be concave with respect to the sensor side surface on the optical axis. The sixth lens 160 may have an overall shape where both sides are concave on the optical axis.

The free curved shape of the fifth lens 150 may be defined by the Sag value calculated by Equation D above.

In detail, the fifth lens 150 may include an order in which the orders of the Zernike coefficient of FIG. 10 have a value of 0 and an order having a value other than 0.

In detail, the fifth lens 150 sets all orders having Sin θ and Cos θ to the value of 0 in FIGS. 11*a*-11*c*, the fifth lens 150 may be manufactured by adjusting some of the orders having Cos2nθ to non-zero values.

Figure 18:
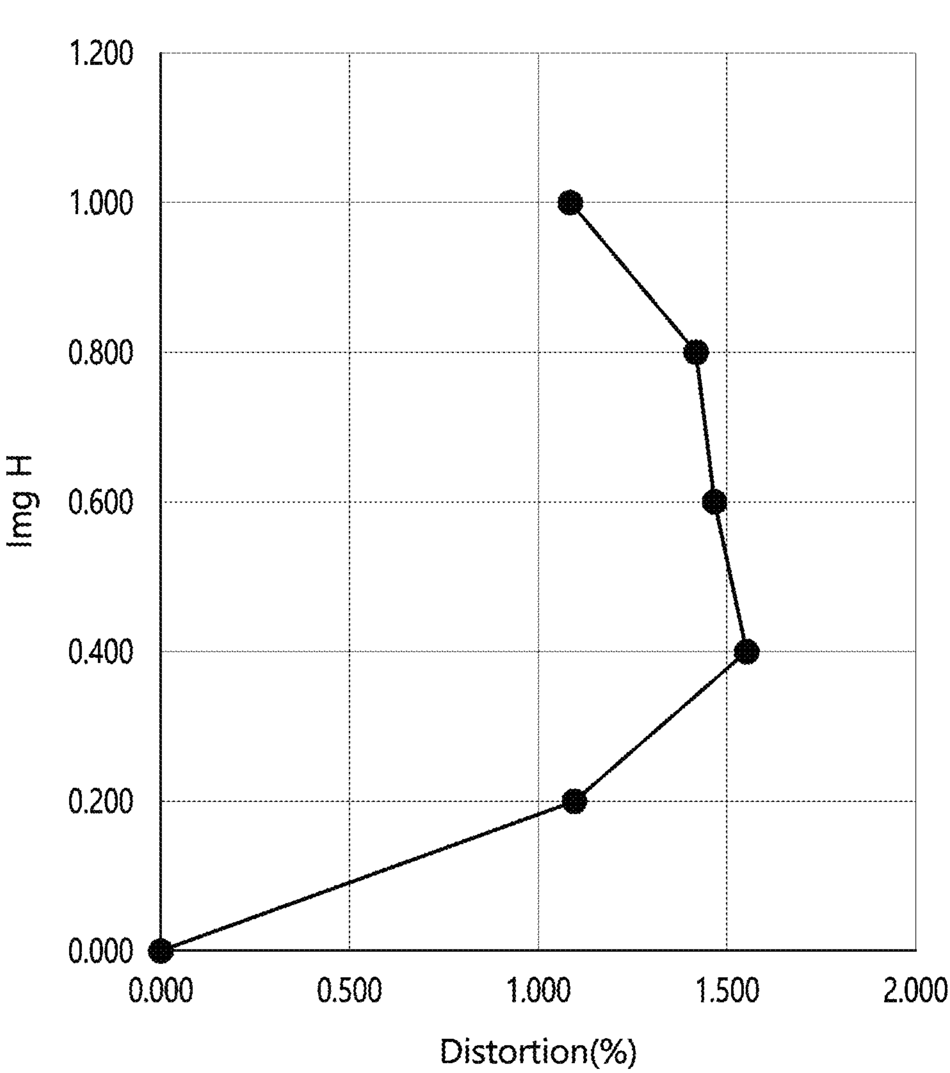
FIG. 18 is a graph showing distortion of the optical system and optical module according to the first embodiment.

FIG. 12 shows the numerical values of items applied to the above equations in the optical system 1000 and optical module 2000 according to the first embodiment, FIG. 13 shows slope angles for each position of the first to sixth lenses in the optical system according to the first embodiment, FIG. 14 shows the lens interval for each position of the first to sixth lenses in the optical system according to the first embodiment, FIG. 15 shows the lens thickness at each position of the first to sixth lenses in the optical system according to the first embodiment, FIG. 16 shows Sag values for each position of the first to sixth lenses in the optical system according to the first embodiment, FIG. 17 shows the aspherical surface coefficient value of the optical system 1000 according to the first embodiment, FIG. 18 is a graph showing the degree of distortion of the optical system and optical module according to the first embodiment, FIG. 19 is a table for explaining the MTF characteristics of the optical system and optical module according to the first embodiment.

Referring to FIG. 13, it may be seen that in the optical system and optical module according to the first embodiment, the first to sixth lenses are formed at different slope angles at each position.

Additionally, it may be seen that the slope angle of the first to sixth lenses gradually increases as they move away from the optical axis. That is, it may be seen that the first to sixth lenses have the greatest slope angle at the end of the effective diameter.

In addition, it may be seen that the slope angle of the first to sixth lenses increases as they move away from the optical axis. That is, it may be seen that the curvature of the overall lens surface of the first to sixth lenses increases as they move away from the optical axis.

Additionally, it may be seen that at least one lens among the first to sixth lenses includes a region where the sign of the slope angle changes. That is, it may be seen that at least one lens among the first to sixth lenses includes a critical point.

Additionally, it may be seen that at least one lens among the first to sixth fifth lenses includes a region where the size of the slope angle decreases.

Referring to FIG. 14, it may be seen that in the optical system and optical module according to the first embodiment, the first to sixth lenses are formed at different lens intervals for each position.

Additionally, at least one lens among the first to sixth lenses may include a region where the size of the lens interval reduced. For example, the interval between the first lens and the second lens, the interval between the second lens and the third lens, the interval between the third lens and the fourth lens, and the interval between the fifth lens and the sixth lens may include a region where the size of the lens interval decreases.

Additionally, at least one lens among the first to sixth lenses may include a region where the size of the lens interval increases. For example, the interval between the third lens and the fourth lens, the interval between the fourth lens and the fifth lens, and the interval between the fifth lens and the sixth lens may include a region where the size of the lens interval increases.

In addition, the region where the size of the lens interval decreases for at least one lens among the first to sixth lenses may be larger than the region where the size of the lens interval increases. For example, the interval between the first lens and the second lens, the interval between the second lens and the third lens, the interval between the third lens and the fourth lens, and the interval between the fifth lens and the sixth lens may be larger in the region where the size of the lens interval decreases than the region where the size of the lens interval increases.

In addition, the region where the size of the lens interval increases for at least one lens among the first to sixth lenses may be larger than the region where the size of the lens interval decreases. For example, the interval between the fourth lens and the fifth lens may be larger in a region where the size of the lens interval increases than a region where the size of the lens interval decreases.

Additionally, at least one lens among the first to sixth lenses may include only a region where the size of the lens interval decreases. For example, the interval between the first lens and the second lens and the interval between the second lens and the third lens may include only a region where the size of the lens interval decreases.

Additionally, at least one lens among the first to sixth lenses may include only a region where the size of the lens interval increases. For example, the interval between the fourth lens and the fifth lens may include only a region where the size of the lens interval increases.

Referring to FIG. 15, it may be seen that in the optical system and optical module according to the first embodiment, the first to sixth lenses are formed with different lens thicknesses at each position.

Additionally, at least one lens among the first to sixth lenses may include a region where the lens thickness decreases. For example, the first lens, the third lens, the fifth lens and the sixth lens may include a region where the lens thickness decreases.

Additionally, at least one lens among the first to sixth lenses may include a region where the lens thickness increases. For example, the second lens, the fourth lens, the fifth lens and the sixth lens may include a region where the lens thickness increases.

In addition, the region where the lens thickness decreases may be larger than the region where the lens thickness of at least one lens among the first to sixth lenses increases. For example, the region where the thickness of the first lens, the third lens and the fifth lens decreases may be larger than the region where the thickness increases.

In addition, the region where the lens thickness increases for at least one lens among the first to sixth lenses may be larger than the region where the lens thickness decreases. For example, the region where the thickness of the second lens, the fourth lens and the sixth lens increases may be larger than the region where the thickness decreases.

Additionally, at least one lens among the first to sixth lenses may include only a region where the lens thickness decreases. For example, the first lens and the third lens may include only a region where the lens thickness decreases.

Additionally, at least one lens among the first to sixth lenses may include only a region where the lens thickness increases. For example, the second lens and the fourth lens may include only a region where the lens thickness increases.

Referring to FIG. 16, it may be seen that the optical system and optical module according to the first embodiment are formed with the first to sixth lenses having different Sag values at each position.

Additionally, at least one lens among the first to sixth lenses may include a region where the size of the Sag value decreases. For example, the third surface of the second lens, the eighth surface of the fourth lens, and the twelfth surface of the sixth lens may include a region where the absolute value of the Sag value decreases.

Additionally, at least one lens among the first to sixth lenses may include a region in which the size of the Sag value increases. For example, the first surface and second surface of the first lens, the third surface and fourth surface of the second lens, the fifth surface and sixth surface of the third lens, the seventh surface and eighth surface of the fourth lens, the ninth surface and tenth surface of the fifth lens, and the eleventh surface and the twelfth surface of the sixth lens may include regions where the Sag value increases.

In addition, the region where the Sag value increases for at least one lens among the first to sixth lenses may be larger than the region where the Sag value decreases. For example, for the first and second surfaces of the first lens, the third and fourth surfaces of the second lens, the fifth and sixth surfaces of the third lens, the seventh and eighth surfaces of the fourth lens, the ninth and tenth surfaces of the fifth lens, and the eleventh surface and the twelfth surface of the sixth lens, the region where the Sag value increases may be larger than the region where the Sag value decreases.

Additionally, at least one lens among the first to sixth lenses may include only a region where the size of the Sag value increases. For example, the first and second surfaces of the first lens, the fourth surface of the second lens, the fifth and sixth surfaces of the third lens, the seventh surface of the fourth lens, the ninth and tenth surfaces of the fifth lens, and the eleventh surface of the sixth lens may include only regions where the lens thickness increases.

The optical system 1000 and the optical module 2000 according to the first embodiment may satisfy at least one of Equations 1 to 44. In detail, the optical system 1000 and the optical module 2000 according to the first embodiment may satisfy all of Equations 1 to 44 above.

Accordingly, it may be seen that the optical system and optical module according to the first embodiment have low distortion characteristics as shown in FIG. 18.

Additionally, it may be seen that the optical system and optical module according to the first embodiment have improved MTF characteristics as shown in FIG. 19.

Hereinafter, the optical system 1000 and the optical module 2000 according to the second embodiment will be described in more detail with reference to FIGS. 20 to 30.

Figure 20:
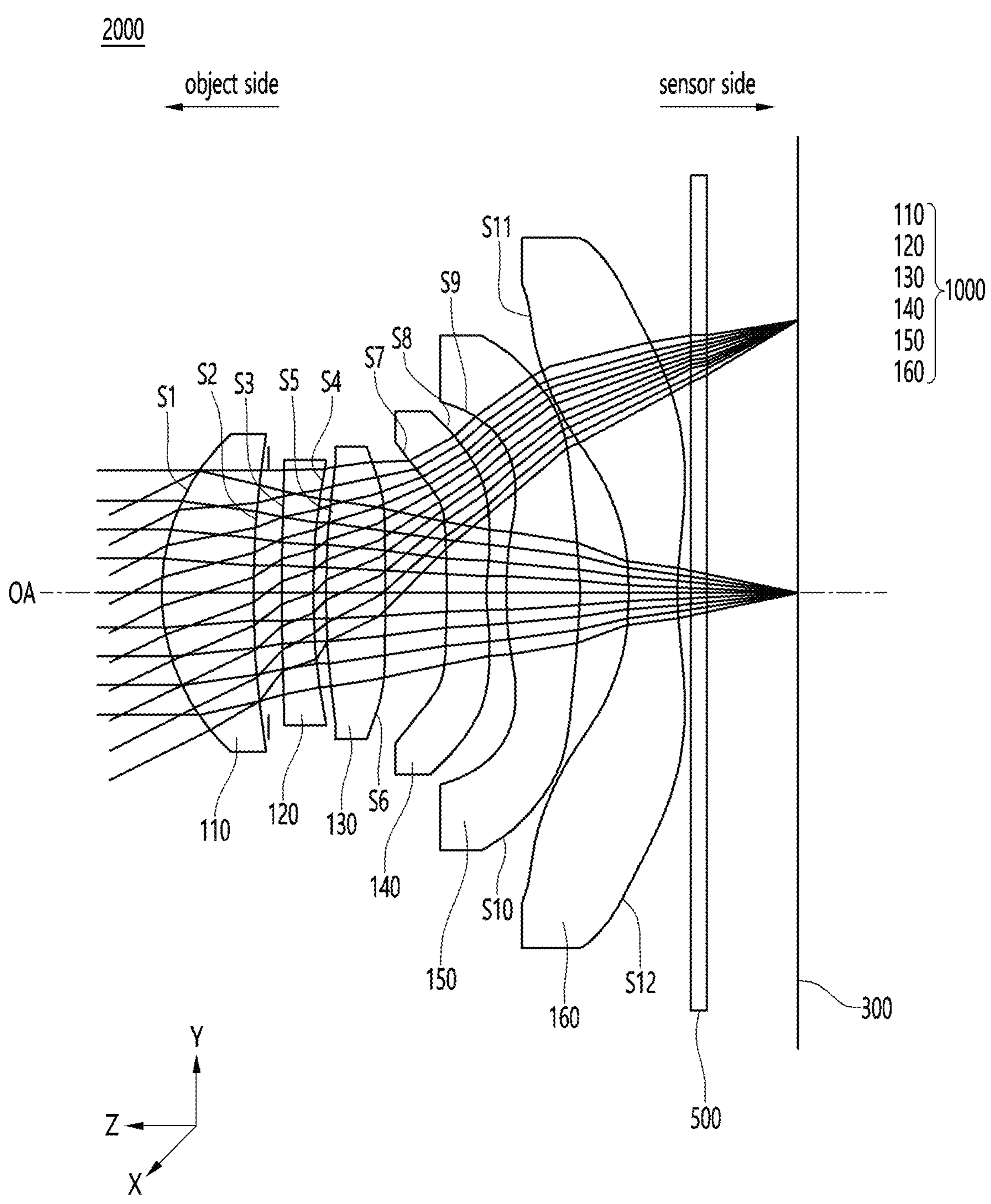
FIG. 20 is a diagram showing the configuration of an optical system and an optical module according to the second embodiment.

Referring to FIG. 20, the optical system 1000 and the optical module 2000 according to the second embodiment may include six lenses.

In detail, the optical system 1000 and the optical module 2000 according to the second embodiment may include a first lens 110, a second lens 120, and a third lens 130, a fourth lens 140, a fifth lens 150, a sixth lens 160 and an image sensor unit 300 arranged sequentially from the object side to the sensor side. The first lens 110, the second lens 120, the third lens 130, the fourth lens 140, the fifth lens 150 and the sixth lens 160 may be sequentially arranged along the optical axis of the optical system 1000 while being spaced apart from each other.

Additionally, a filter unit 500 may be disposed between the plurality of lenses 110, 120, 130, 140, 150 and 160 and the image sensor unit 300. The filter unit 500 may be disposed between the sixth lens 160 and the image sensor unit 300.

Additionally, the optical system 1000 according to the second embodiment may include an aperture (not shown). The aperture may be disposed between the first lens 110 and the second lens 120. Alternatively, the sensor side surface of the first lens 110 may be an aperture.

The first to sixth lenses 110, 120, 130, 140, 150 and 160 according to the second embodiment may each have a Radius of Curvature, Thickness, Distance, Refractive Index and Abbe's Number of a set value.

In detail, the Radius of Curvature, Thickness, Distance, Refractive Index and Abbe's Number of the first to sixth lenses 110, 120, 130, 140, 150 and 160 according to the second embodiment may be the same as FIG. 21.

Referring to FIGS. 20 and 21, in the optical system 1000 according to the second embodiment, the first lens 110 may have positive (+) refractive power at the optical axis. The first surface S1 of the first lens 110 may be convex with respect to the object side surface on the optical axis, and the second surface S2 may be concave with respect to the sensor side surface on the optical axis. The first lens 110 may overall have a meniscus shape convex from the optical axis toward the object side. The first surface S1 may be an aspherical surface, and the second surface S2 may be an aspherical surface.

The second lens 120 may have negative (−) refractive power at the optical axis. The third surface S3 of the second lens 120 may be convex with respect to the object side surface on the optical axis, and the fourth surface S4 may be concave with respect to the sensor side surface on the optical axis. The second lens 120 may overall have a meniscus shape convex from the optical axis toward the object side. The third surface S3 may be an aspherical surface, and the fourth surface S4 may be an aspherical surface.

The third lens 130 may have positive (+) refractive power at the optical axis. The fifth surface S5 of the third lens 130 may be convex with respect to the object side surface on the optical axis, and the sixth surface S6 may be convex with respect to the sensor side surface on the optical axis. The third lens 130 may have an overall shape in which both sides are convex on the optical axis. The fifth surface S5 may be an aspherical surface, and the sixth surface S6 may be an aspherical surface.

The fourth lens 140 may have negative (−) refractive power at the optical axis. The seventh surface S7 of the fourth lens 140 may be convex with respect to the object side surface on the optical axis, and the eighth surface S8 may be concave with respect to the sensor side surface on the optical axis. The fourth lens 140 may overall have a convex meniscus shape from the optical axis toward the object side. The seventh surface S7 may be an aspherical surface, and the eighth surface S8 may be an aspherical surface.

The fifth lens 150 may have positive (+) refractive power at the optical axis. The ninth surface S9 of the fifth lens 150 may be convex with respect to the object side surface on the optical axis, and the tenth surface S10 may be convex with respect to the sensor side surface on the optical axis. The fifth lens 150 may have an overall shape where both sides are convex on the optical axis. The ninth surface S9 may be an aspherical surface, and the tenth surface S10 may be an aspherical surface.

At least one of the ninth surface S9 and the tenth surface S10 may include a freeform surface. In detail, the ninth surface S9 and the tenth surface S10 may include freeform surfaces. That is, the fifth lens 150 may be a freeform lens.

The sixth lens 160 may have negative (−) refractive power at the optical axis. The eleventh surface S11 of the sixth lens 160 may be concave with respect to the object side surface on the optical axis, and the twelfth surface S12 may be concave with respect to the sensor side surface on the optical axis. The sixth lens 160 may have an overall shape where both sides are concave on the optical axis.

The free curved shape of the fifth lens 150 may be defined by the Sag value calculated by Equation D above.

In detail, the fifth lens 150 may include an order in which the orders of the Zernike coefficient of FIG. 22 have a value of 0 and an order having a value other than 0.

In detail, the fifth lens 150 sets all orders having Sin θ and Cos θ to the value of 0 in FIGS. 11*a*-11*c*, the fifth lens may be manufactured by adjusting some of the orders having Cos2nθ to non-zero values.

Figure 29:
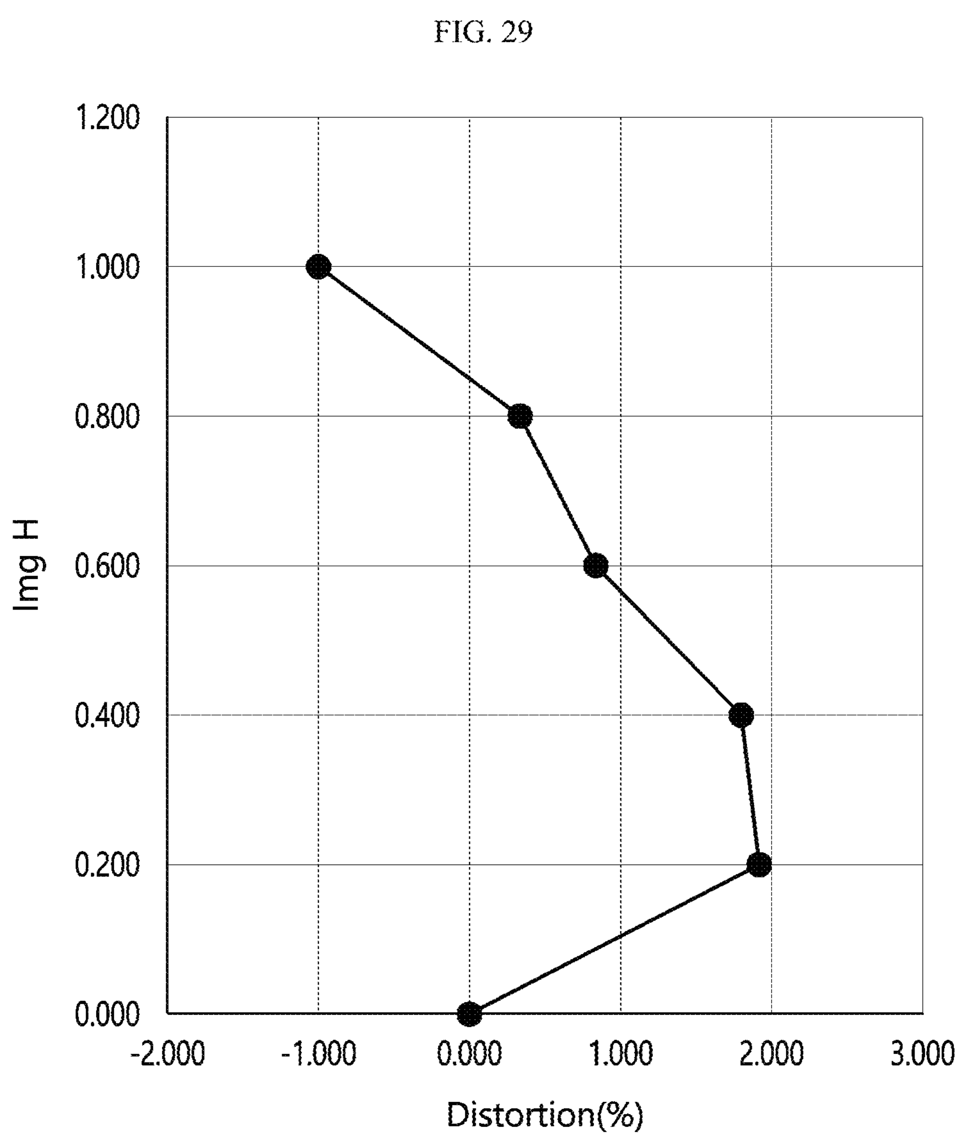
FIG. 29 is a graph showing distortion of the optical system and optical module according to the second embodiment.

FIG. 23 shows the numerical values of items applied to the above equations in the optical system 1000 and optical module 2000 according to the second embodiment, FIG. 24 shows the slope angle for each position of the first to sixth lenses in the optical system according to the second embodiment, FIG. 25 shows the lens interval for each position of the first to sixth lenses in the optical system according to the second embodiment, FIG. 26 shows the lens thickness at each position of the first to sixth lenses in the optical system according to the second embodiment, FIG. 27 shows Sag values for each position of the first to sixth lenses in the optical system according to the second embodiment, FIG. 28 shows the aspherical surface coefficient value of the optical system 1000 according to the second embodiment, FIG. 29 is a graph showing the degree of distortion of the optical system and optical module according to the second embodiment. FIG. 30 is a table for explaining the MTF characteristics of the optical system and optical module according to the second embodiment.

Referring to FIG. 24, it may be seen that in the optical system and optical module according to the second embodiment, the first to sixth lenses are formed at different slope angles at each position.

Additionally, it may be seen that the slope angle of the first to sixth lenses gradually increases as they move away from the optical axis. That is, it may be seen that the first to sixth lenses have the greatest slope angle at the end of the effective diameter.

Additionally, it may be seen that the slope angle of the first to sixth lenses increases as they move away from the optical axis. That is, it may be seen that the curvature of the overall lens surface of the first to sixth lenses increases as they move away from the optical axis.

Additionally, it may be seen that at least one lens among the first to sixth lenses includes a region where the sign of the slope angle changes. That is, it may be seen that at least one lens among the first to sixth lenses includes a critical point.

Additionally, it may be seen that at least one lens among the first to sixth lenses includes a region where the size of the slope angle decreases.

Referring to FIG. 25, it may be seen that in the optical system and optical module according to the second embodiment, the first to sixth lenses are formed at different lens intervals for each position.

Additionally, at least one lens among the first to sixth lenses may include a region where the size of the lens interval is reduced. For example, the interval between the first lens and the second lens, the interval between the second lens and the third lens, the interval between the third lens and the fourth lens, and the interval between the fifth lens and the sixth lens may include a region where the size of the lens interval decreases.

Additionally, at least one lens among the first to sixth lenses may include a region where the size of the lens interval increases. For example, the interval between the third lens and the fourth lens, the interval between the fourth lens and the fifth lens, and the interval between the fifth lens and the sixth lens may include a region where the size of the lens interval increases.

In addition, the region where the size of the lens interval decreases for at least one lens among the first to six lenses may be larger than the region where the size of the lens interval increases. For example, the interval between the first lens and the second lens, the interval between the second lens and the third lens, and the interval between the fifth lens and the sixth lens may be larger in the region where the size of the lens interval decreases than the region where the size of the lens interval increases.

In addition, the region where the size of the lens interval increases for at least one lens among the first to sixth lenses may be larger than the region where the size of the lens interval decreases. For example, the interval between the fourth lens and the fifth lens may be larger in a region where the size of the lens interval increases than a region where the size of the lens interval decreases.

Additionally, at least one lens among the first to sixth lenses may include only a region where the size of the lens interval decreases. For example, the interval between the first lens and the second lens and the interval between the second lens and the third lens may include only a region where the size of the lens interval decreases.

Additionally, at least one lens among the first to sixth lenses may include only a region where the size of the lens interval increases. For example, the interval between the fourth lens and the fifth lens may include only a region where the size of the lens interval increases.

Referring to FIG. 26, it may be seen that in the optical system and optical module according to the second embodiment, the first to sixth lenses are formed with different lens thicknesses at each position.

Additionally, at least one lens among the first to sixth lenses may include a region where the lens thickness decreases. For example, the first lens, the third lens, the fifth lens, and the sixth lens may include a region where the lens thickness decreases.

Additionally, at least one lens among the first to sixth lenses may include a region where the lens thickness increases. For example, the second lens, the fourth lens, the fifth lens, and the sixth lens may include a region where the lens thickness increases.

In addition, the region where the lens thickness decreases may be larger than the region where the lens thickness of at least one lens among the first to sixth lenses increases. For example, the region where the thickness of the first lens, the third lens and the fifth lens decreases may be larger than the region where the thickness increases.

In addition, the region where the lens thickness increases for at least one lens among the first to sixth lenses may be larger than the region where the lens thickness decreases. For example, the region where the thickness of the second lens, the fourth lens and the sixth lens increases may be larger than the region where the thickness decreases.

Additionally, at least one lens among the first to sixth lenses may include only a region where the lens thickness decreases. For example, the first lens and the third lens may include only regions where the lens thickness decreases.

Additionally, at least one lens among the first to sixth lenses may include only a region where the lens thickness increases. For example, the second lens and the second lens may include only a region where the lens thickness increases.

Referring to FIG. 27, it may be seen that the optical system and optical module according to the second embodiment are formed with the first to sixth lenses having different Sag values at each position.

Additionally, at least one lens among the first to sixth lenses may include a region where the size of the Sag value decreases. For example, the third surface of the second lens, the eighth surface of the fourth lens, the ninth surface of the fifth lens, and the twelfth surface of the sixth lens may include a region where the absolute value of the Sag value decreases.

Additionally, at least one lens among the first to sixth lenses may include a region in which the size of the Sag value increases. For example, the first surface and second surface of the first lens, the third surface and fourth surface of the second lens, the fifth surface and sixth surface of the third lens, the seventh surface and eighth surface of the fourth lens, the ninth surface and the tenth surface of the fifth lens, and eleventh surface and the twelfth surface of the sixth lens may include a region where the Sag value increases.

Additionally, the region where the Sag value of at least one of the first to sixth lenses increases may be larger than the region where the Sag value decreases. For example, for the first surface and second surface of the first lens, the third surface and fourth surface of the second lens, the fifth surface and sixth surface of the third lens, the seventh surface and eighth surface of the fourth lens, the ninth surface and tenth surface of the fifth lens and the eleventh surface and twelfth surface of the sixth lens, the region where the Sag value increases may be larger than the region where the Sag value decreases.

Additionally, at least one lens among the first to sixth lenses may include only a region where the size of the Sag value increases. For example, the first surface and second surface of the first lens, the fourth surface of the second lens, the fifth surface and sixth surface of the third lens, the seventh surface of the fourth lens, the tenth surface of the fifth lens and the eleventh lens of the sixth lens may include only regions where the lens thickness increases.

In the optical system 1000 and the optical module 2000 according to the second embodiment, the numerical values in FIG. 23 may satisfy at least one of Equations 1 to 44. In detail, the optical system 1000 and the optical module 2000 according to the second embodiment may satisfy all of Equations 1 to 44 above.

Accordingly, it may be seen that the optical system and optical module according to the second embodiment may have low distortion characteristics as shown in FIG. 29.

Additionally, it may be seen that the optical system and optical module according to the second embodiment may have improved MTF characteristics as shown in FIG. 30.

Hereinafter, the optical system 1000 and the optical module 2000 according to the third embodiment will be described in more detail with reference to FIGS. 31 to 41.

Figure 31:
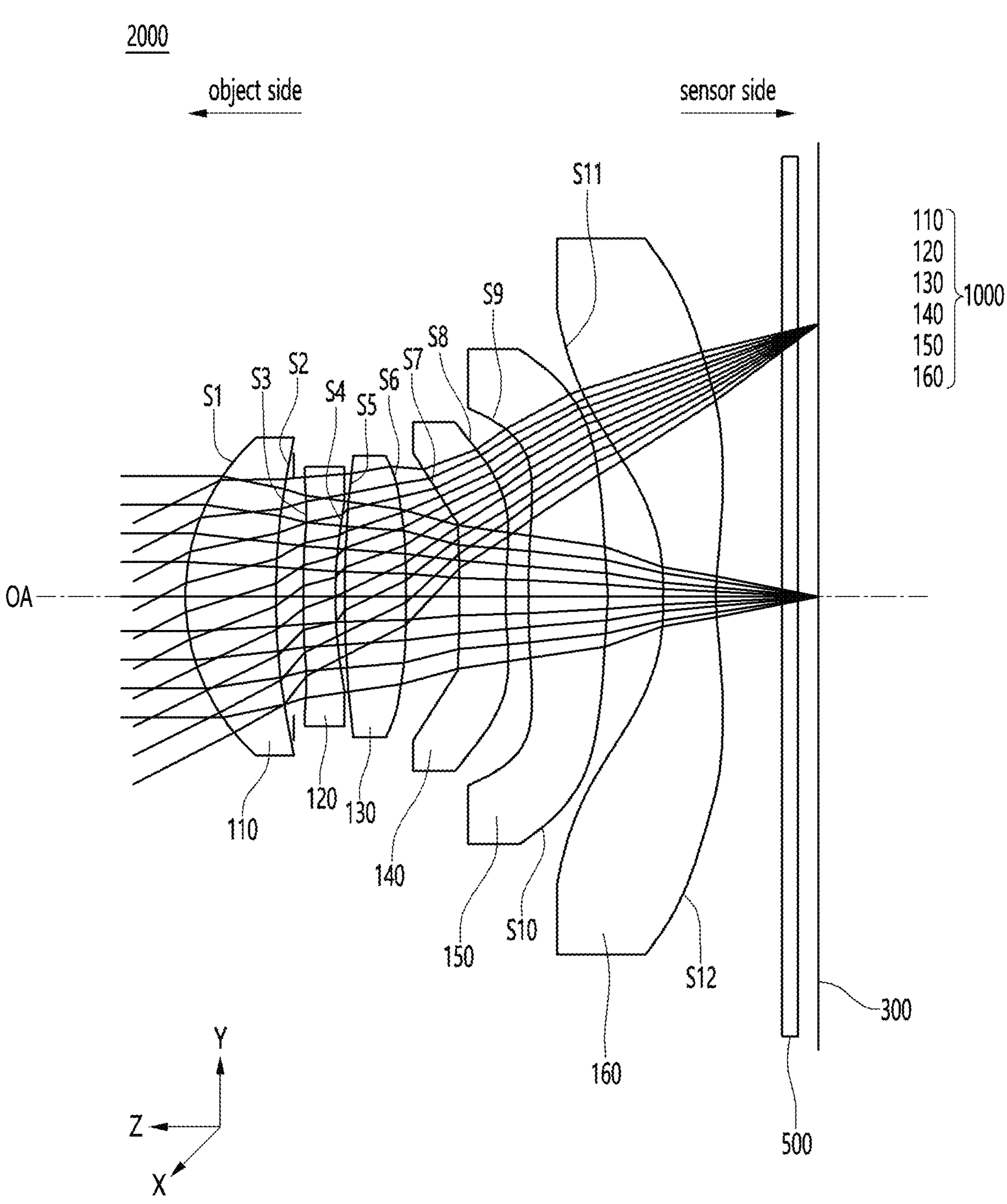
FIG. 31 is a diagram showing the configuration of an optical system and an optical module according to the third embodiment.

Referring to FIG. 31, the optical system 1000 and optical module 2000 according to the third embodiment may include six lenses.

In detail, the optical system 1000 and the optical module 2000 according to the third embodiment may include a first lens 110, a second lens 120, and a third lens 130 a fourth lens 140, a fifth lens 150, a sixth lens 160 and an image sensor unit 300 arranged sequentially from the object side to the sensor side. The first lens 110, the second lens 120, the third lens 130, the fourth lens 140, the fifth lens 150 and the sixth lens 160 may be sequentially arranged along the optical axis of the optical system 1000 while being spaced apart from each other.

Additionally, a filter unit 500 may be disposed between the plurality of lenses 110, 120, 130, 140, 150 and 160 and the image sensor unit 300. The filter unit 500 may be disposed between the sixth lens 160 and the image sensor unit 300.

Additionally, the optical system 1000 according to the third embodiment may include an aperture (not shown). The aperture may be disposed between the first lens 110 and the second lens 120. Alternatively, the sensor side surface of the first lens 110 may be an aperture.

The first to fifth lenses 110, 120, 130, 140, 150 and 160 according to the third embodiment may each have a set values of Radius of Curvature, Thickness, Distance, Refractive Index, and Abbe's Number.

In detail, Radius of Curvature, Thickness, Distance, Refractive Index, and Abbe's Number of the first to fifth lenses 110, 120, 130, 140, 150 and 160 according to the third embodiment may be as shown in FIG. 31.

Referring to FIGS. 31 and 32, in the optical system 1000 according to the third embodiment, the first lens 110 may have positive (+) refractive power at the optical axis. The first surface S1 of the first lens 110 may be convex with respect to the object side surface on the optical axis, and the second surface S2 may be concave with respect to the sensor side surface on the optical axis. The first lens 110 may overall have a meniscus shape convex from the optical axis toward the object side. The first surface S1 may be an aspherical surface, and the second surface S2 may be an aspherical surface.

The second lens 120 may have negative (−) refractive power at the optical axis. The third surface S3 of the second lens 120 may be convex with respect to the object side surface on the optical axis, and the fourth surface S4 may be concave with respect to the sensor side surface on the optical axis. The second lens 120 may overall have a meniscus shape convex from the optical axis toward the object side. The third surface S3 may be an aspherical surface, and the fourth surface S4 may be an aspherical surface.

The third lens 130 may have positive (+) refractive power at the optical axis. The fifth surface S5 of the third lens 130 may be convex with respect to the object side surface on the optical axis, and the sixth surface S6 may be convex with respect to the sensor side surface on the optical axis. The third lens 130 may have an overall shape in which both sides are convex on the optical axis. The fifth surface S5 may be an aspherical surface, and the sixth surface S6 may be an aspherical surface.

The fourth lens 140 may have negative (−) refractive power at the optical axis. The seventh surface S7 of the fourth lens 140 may be convex with respect to the object side surface on the optical axis, and the eighth surface S8 may be concave with respect to the sensor side surface on the optical axis. The fourth lens 140 may overall have a convex meniscus shape from the optical axis toward the object sensor side. The seventh surface S7 may be an aspherical surface, and the eighth surface S8 may be an aspherical surface.

The fifth lens 150 may have positive (+) refractive power at the optical axis. The ninth surface S9 of the fifth lens 150 may be convex with respect to the object side surface on the optical axis, and the tenth surface S10 may be convex with respect to the sensor side surface on the optical axis. The fifth lens 150 may have an overall shape where both sides are convex on the optical axis. The ninth surface S9 may be an aspherical surface, and the tenth surface S10 may be an aspherical surface.

At least one of the ninth surface S9 and the tenth surface S10 may include a freeform surface. In detail, the ninth surface S9 and the tenth surface S10 may include freeform surfaces. That is, the fifth lens 150 may be a freeform lens.

The sixth lens 160 may have negative (−) refractive power at the optical axis. The eleventh surface S11 of the sixth lens 160 may be concave with respect to the object side surface on the optical axis, and the twelfth surface S12 may be concave with respect to the sensor side surface on the optical axis. The sixth lens 160 may have an overall shape where both sides are concave on the optical axis.

The free curved shape of the fourth lens 140 may be defined by the Sag value calculated by Equation D above.

In detail, the fifth lens 150 may include an order in which the orders of the Zernike coefficient of FIG. 33 have a value of 0 and an order having a value other than 0.

In detail, the fifth lens 150 sets all orders having Sin θ and Cos θ to the value of 0 in FIGS. 11*a*-11*c*, the fifth lens 150 may be manufactured by adjusting some of the orders having Cos2nθ to non-zero values.

Figure 40:
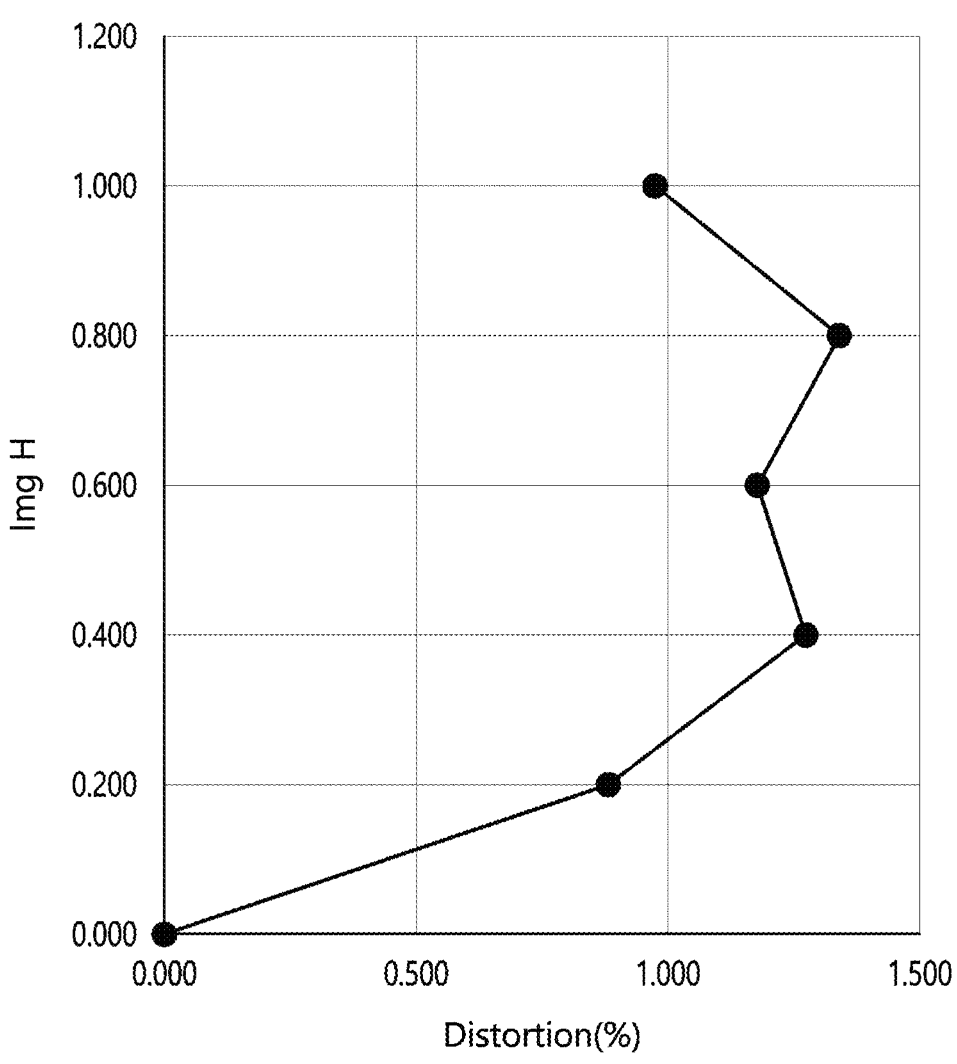
FIG. 40 is a graph showing distortion of the optical system and optical module according to the third embodiment.

FIG. 34 shows the numerical values of items applied to the above equations in the optical system 1000 and optical module 2000 according to the third embodiment, FIG. 35 shows slope angles for each position of the first to sixth lenses in the optical system according to the third embodiment, FIG. 36 shows the lens interval for each position of the first to sixth lenses in the optical system according to the third embodiment, FIG. 37 shows the lens thickness at each position of the first to fifth lenses in the optical system according to the third embodiment, FIG. 38 shows Sag values for each position of the first to sixth lenses in the optical system according to the third embodiment, FIG. 39 shows the aspherical surface coefficient value of the optical system 1000 according to the third embodiment, FIG. 40 is a graph showing the degree of distortion of the optical system and optical module according to the third embodiment, FIG. 41 is a table for explaining the MTF characteristics of the optical system and optical module according to the third embodiment.

Referring to FIG. 35, it may be seen that in the optical system and optical module according to the third embodiment, the first to sixth lenses are formed at different slope angles at each position.

Additionally, it may be seen that the slope angle of the first to sixth lenses gradually increases as they move away from the optical axis. That is, it may be seen that the first to sixth lenses have the greatest slope angle at the end of the effective diameter.

In addition, it may be seen that the slope angle of the first to sixth lenses increases as they move away from the optical axis. That is, it may be seen that the curvature of the overall lens surface of the first to fifth lenses increases as they move away from the optical axis.

Additionally, it may be seen that at least one lens among the first to sixth lenses includes a region where the sign of the slope angle changes. That is, it may be seen that at least one lens among the first to sixth lenses includes a inflection point.

Additionally, it may be seen that at least one lens among the first to sixth lenses includes a region where the size of the slope angle decreases.

Referring to FIG. 36, it may be seen that in the optical system and optical module according to the third embodiment, the first to sixth lenses are formed at different lens intervals for each position.

Additionally, at least one lens among the first to sixth lenses may include a region where the size of the lens interval decreases. For example, the interval between the first lens and the second lens, the interval between the second lens and the third lens, the interval between the third lens and the fourth lens, and the interval between the fifth lens and the sixth lens may include a region where the size of the lens interval decreases.

Additionally, at least one lens among the first to sixth lenses may include a region where the size of the lens interval increases. For example, the interval between the third lens and the fourth lens, the interval between the fourth lens and the fifth lens, and the interval between the fifth lens and the sixth lens may include a region where the size of the lens interval increases.

In addition, the region where the size of the lens interval decreases for at least one lens among the first to sixth lenses may be larger than the region where the size of the lens interval increases. For example, the interval between the first lens and the second lens, the interval between the second lens and the third lens, and the interval between the fifth lens and the sixth lens may be larger in the region where the size of the lens interval decreases than the region where the size of the lens interval increases.

In addition, the region where the size of the lens interval increases for at least one lens among the first to sixth lenses may be larger than the region where the size of the lens interval decreases. For example, the interval between the fourth lens and the fifth lens may be larger in a region where the size of the lens interval increases than a region where the size of the lens interval decreases.

Additionally, at least one lens among the first to sixth lenses may include only a region where the size of the lens interval decreases. For example, the interval between the first lens and the second lens may include only a region where the size of the lens interval decreases.

Additionally, at least one lens among the first to sixth lenses may include only a region where the size of the lens interval increases. For example, the interval between the fourth lens and the fifth lens may include only a region where the size of the lens interval increases.

Referring to FIG. 37, it may be seen that in the optical system and optical module according to the third embodiment, the first to sixth lenses are formed with different lens thicknesses at each position.

Additionally, at least one lens among the first to sixth lenses may include a region where the lens thickness decreases. For example, the first lens, the third lens, the fifth lens, and the sixth lens may include a region where the lens thickness decreases.

Additionally, at least one lens among the first to sixth lenses may include a region where the lens thickness increases. For example, the second lens, the fourth lens, the fifth lens, and the sixth lens may include a region where the lens thickness increases.

In addition, the region where the lens thickness decreases may be larger than the region where the lens thickness of at least one lens among the first to sixth lenses increases. For example, the region where the thickness of the first lens, the third lens and the fifth lens decreases may be larger than the region where the thickness increases.

In addition, the region where the lens thickness increases for at least one lens among the first to sixth lenses may be larger than the region where the lens thickness decreases. For example, the region where the thickness of the second lens, the fourth lens and the sixth lens increases may be larger than the region where the thickness decreases.

Additionally, at least one lens among the first to sixth lenses may include only a region where the lens thickness decreases. For example, the first lens and the third lens may include only regions where the lens thickness decreases.

Additionally, at least one lens among the first to sixth lenses may include only a region where the lens thickness increases. For example, the second lens and the fourth lens may include only a region where the lens thickness decreases.

Referring to FIG. 38, it may be seen that the optical system and optical module according to the third embodiment are formed with the first to sixth lenses having different Sag values at each position.

Additionally, at least one lens among the first to sixth lenses may include a region where the size of the Sag value decreases. For example, the third surface of the second lens, the eighth surface of the fourth lens, the ninth surface of the fifth lens, and the twelfth surface of the sixth lens may include a region where the absolute value of the Sag value decreases.

Additionally, at least one lens among the first to sixth lenses may include a region where the size of the Sag value increases. For example, the first surface and second surface of the first lens, the third surface and fourth surface of the second lens, the fifth surface and sixth surface of the third lens, the seventh surface and eighth surface of the fourth lens, the ninth surface and tenth surface of the fifth lens, the eleventh surface and twelfth surface of the sixth lens may include regions where the Sag value increases.

Additionally, the region where the Sag value increases for at least one lens among the first to sixth lenses may be larger than the region where the Sag value decreases. For example, for the first surface and second surface of the first lens, the third surface and fourth surface of the second lens, the fifth surface and sixth surface of the third lens, the seventh surface and eighth surface of the fourth lens, the ninth surface and tenth surface of the fifth lens, the eleventh surface and twelfth surface of the sixth lens, the region where the Sag value increases may be larger than the region where the Sag value decreases.

Additionally, at least one lens among the first to sixth lenses may include only a region where the size of the Sag value increases. For example, the first surface and second surface of the first lens, the fourth surface of the second lens, the fifth surface and sixth surface of the third lens, the seventh surface of the fourth lens, the tenth surface of the fifth lens, the eleventh surface of the sixth lens may include only regions where the size of the lens thickness increases.

In the optical system 1000 and the optical module 2000 according to the third embodiment, the numerical values in FIG. 32 may satisfy at least one of Equations 1 to 44. In detail, the optical system 1000 and the optical module 2000 according to the third embodiment may satisfy all of Equations 1 to 44 above.

Accordingly, it may be seen that the optical system and optical module according to the third embodiment have low distortion characteristics as shown in FIG. 40.

Additionally, it may be seen that the optical system and optical module according to the third embodiment have improved MTF characteristics as shown in FIG. 41.

Figure 42:
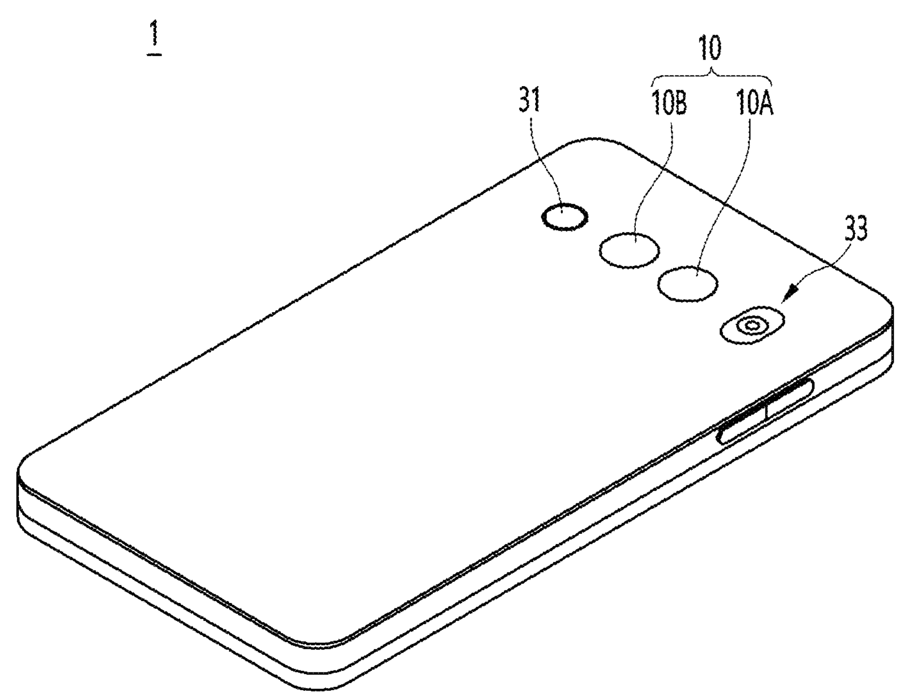
FIGS. 42 and 43 are diagrams for explaining a display device to which an optical system and an optical module are applied according to an embodiment.
Figure 43:
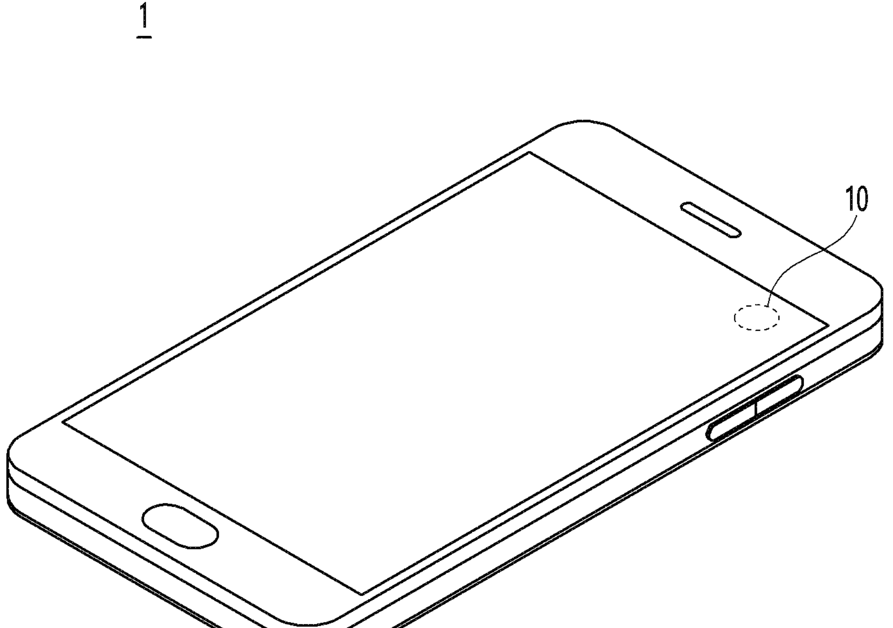

FIGS. 42 and 43 are diagrams showing a camera module according to an embodiment applied to a mobile terminal.

Referring to FIG. 42, the mobile terminal 1 may include a camera module 10 provided on the rear.

The camera module 10 may include an image capturing function. Additionally, the camera module 10 may include at least one of an auto focus, zoom function, and OIS function.

The camera module 10 may process image frames of still images or videos obtained by the image sensor 300 in shooting mode or video call mode. The processed image frame may be displayed on a display unit (not shown) of the mobile terminal 1 and may be stored in a memory (not shown).

For example, the camera module 10 may include a first camera module 10A and a second camera module 10B. At this time, at least one of the first camera module 10A and the second camera module 10B may include the optical system 1000 described above. Accordingly, the camera module 10 may have a slim structure and can photograph subjects at various magnifications.

In addition, the mobile terminal 1 may further include an autofocus device 31. The autofocus device 31 may include an autofocus function using a laser. The autofocus device 31 may be mainly used in conditions where the autofocus function using the image of the camera module 10 is deteriorated, for example, at a distance of 10 m or less or in a dark environment. The autofocus device 31 may include a light emitting unit including a vertical cavity surface emitting laser (VCSEL) semiconductor device, and a light receiving unit such as a photo diode that converts light energy into electrical energy.

Additionally, the mobile terminal 1 may further include a flash module 33. The flash module 33 may include a light emitting device inside that emits light. The flash module 33 may emit light in the visible light wavelength band. For example, the flash module 33 may emit white light or light of a color similar to white. However, the embodiment is not limited thereto, and the flash module 33 may emit light of various colors. The flash module 33 may be operated by operating a camera of a mobile terminal or by user control.

Additionally, referring to FIG. 43, the mobile terminal 1 may include a camera module 10 provided at the front.

In detail, the mobile terminal 1 may have a camera module 10 disposed in the screen display region on the front of the mobile terminal 1. That is, the mobile terminal 1 may have a camera module 10 disposed in a display region where a screen is displayed.

That is, the camera module 10 may be an under-display camera in which the camera module is disposed below the display of the mobile device 1.

When the camera module is applied as an under-display camera, the screen region may be expanded by removing a separate bezel region for placing the camera, and there is no need to apply a punch hole design that creates a camera hole.

The features, structures, effects, etc. described in the embodiments above are included in at least one embodiment of the present invention and are not necessarily limited to only one embodiment. Furthermore, the features, structures, effects, etc. illustrated in each embodiment may be combined or modified and implemented in other embodiments by a person with ordinary knowledge in the field to which the embodiments belong. Therefore, contents related to such combinations and modifications should be construed as being included in the scope of the present invention.

In addition, although the above description focuses on examples, this is only an example and does not limit the present invention, those of ordinary skill in the field to which the present invention pertains will recognize that various modifications and applications not exemplified above are possible without departing from the essential characteristics of the present embodiment. For example, each component specifically shown in the examples may be modified and implemented. And these variations and differences in application should be construed as being included in the scope of the present invention as defined in the appended claims.

The invention claimed is:

1. An optical module comprising:

a sensor; and an optical system comprising a first lens, a second lens, a third lens, a fourth lens, a fifth lens, and a sixth lens arranged sequentially along an optical axis from an object side to a sensor side, wherein at least one of an object side surface or a sensor side surface of the fifth lens comprises a freeform surface, and wherein the first lens and the fourth lens satisfy Equation 29 below:

$$1.34\text{ mm} \le CR\_O\_1 \le 2.5\text{ mm}, \quad 10\text{ mm} \le CR\_O\_4 \le 30\text{ mm} \qquad \text{[Equation 29]}$$

(In Equation 29, CR_O_1 means a radius of curvature at the optical axis of an object side surface of the first lens, and CR_O_4 means a radius of curvature at the optical axis of an object side surface of the fourth lens).

2. The optical module of claim 1, wherein the fifth lens satisfies Equation B below:

$$0.1\ \mu m \le \max|Sag\_O\_x\_5| - \max|Sag\_O\_y\_5| \le 5\ \mu m. \qquad \text{[Equation B]}$$

3. The optical module of claim 1, wherein the fourth lens has a slope angle defined as an internal angle formed by a normal line and the optical axis, wherein the normal line extends in a direction perpendicular to a tangent line passing through an arbitrary point on seventh and eighth surfaces of the fourth lens and passes through an arbitrary point; and wherein a slope angle of the seventh surface gradually increases while extending from the optical axis to an end of the seventh surface.

4. The optical module of claim 3, wherein a slope angle of the eighth surface gradually increases at a distance of 0.75 to 0.95 from the optical axis to an end of the eighth surface.

5. The optical module of claim 3, wherein the seventh surface includes a critical point where a sign of the slope angle changes.

6. The optical module of claim 1, wherein the sixth lens has a slope angle defined as an internal angle formed by a normal line and the optical axis, wherein the normal line extends in a direction perpendicular to a tangent line passing through an arbitrary point on eleventh and twelfth surfaces of the sixth lens and passes through an arbitrary point; and wherein a slope angle of the eleventh surface gradually increases at a distance of 0.7 to 0.95 from the optical axis to an end of the eleventh surface.

7. The optical module of claim 6, wherein a slope angle of the twelfth surface gradually increases at a distance of 0.75 to 0.95 from the optical axis to an end of the twelfth surface.

8. The optical module of claim 7, wherein the twelfth surface includes a critical point where a sign of the slope angle changes.

9. The optical module of claim 1, wherein the optical system satisfies Equations 4 and 5 below:

$$10° < |SA1\_O\_4| \leq 60° \quad \text{[Equation 4]}$$

(In Equation 4, SA1_O_4 means a slope angle between a normal line of the object side surface of the fourth lens and the optical axis at any point on the object side surface of the fourth lens at a distance in a range of 70% to 90% of a distance from the optical axis of the fourth lens to an effective diameter), $$15° < |SA1\_O\_6| \leq 45° \quad \text{[Equation 5]}$$

(In Equation 5, SA1_O_6 means a slope inclination angle between a normal line of an object side surface of the sixth lens and the optical axis at any point on the object side surface of the sixth lens at a distance in a range of 40% to 60% of a distance from the optical axis of the sixth lens to an effective diameter).

10. The optical module of claim 1, wherein the optical system satisfies Equation 44 below:

$$0.5 \text{ mm} < D\_mx\_6/I < 2.0 \text{ mm} \quad \text{[Equation 44]}$$

(In Equation 44, D_mx_6/I means a distance in an optical axis direction from a point having an absolute value of a maximum Sag value on a sensor side of the sixth lens to an image surface of the image sensor unit).

11. The optical module of claim 1, wherein the optical system satisfies Equations 1 to 3 below:

$$60° \leq FOV \leq 90° \quad \text{[Equation 1]}$$

(FOV in Equation 1 means an angle of view), $$0.50 \leq TTL/ImgH \leq 1.0 \quad \text{[Equation 2]}$$

(In Equation 2, TTL means a distance in an optical axis direction from a vertex of the object side surface of the first lens to an image surface of an image sensor unit, and ImgH means twice a diagonal distance from the image surface of the image sensor unit overlapping the optical axis to a 1.0 field region of an image sensor), and $$CA\_O\_x < CA\_O\_5 \quad \text{[Equation 3]}$$

(In Equation 3, CA_O_x means an effective diameter of an object side surface of a lens closest to an aperture among lenses between the aperture and a sensor, and CA_O_6 means an effective diameter of an object side surface of the sixth lens).

12. The optical module of claim 1, wherein the first lens and the second lens satisfy Equation 28 below:

$$P\_1 \text{ sign} \neq P\_2 \text{ sign}, \quad \text{[Equation 28]}$$

$$V\_1 > V\_2,$$

$$10 < V1 < 50 < V2,$$

$$N\_1 < N\_2$$

(In Equation 28, P_1 sign is a refractive power sign of the first lens having a positive (+) or negative (−) sign, P_2 sign is a refractive power sign of the second lens having a positive (+) or negative (−) sign, V_1 is an Abbe number of the first lens, V_2 is an Abbe number of the second lens, N_1 is a refractive index of the first lens, and N_2 is a refractive index of the second lens).

13. The optical module of claim 1, wherein the fifth lens satisfies Equations 6 and 7 below:

$$1° \leq |SA1\_O\_x\_5| \leq 60°, \quad \text{[Equation 6]}$$

$$1° \leq |SA1\_O\_y\_5| \leq 60°$$

(In Equation 6, SA1_O_x_5 means a slope angle between a normal line and the optical axis at any point on the object side surface of the fifth lens at a distance in a range of 75% to 95% of a distance from the optical axis to an effective diameter in a X-axis direction from the optical axis of the fifth lens, and SA1_O_y_5 means a slope angle between a normal line and the optical axis at a point on the object side surface of the fifth lens at a distance in a range of 75% to 95% of a distance from the optical axis to an effective diameter in a Y-axis direction from the optical axis of the fifth lens), $$10° \leq |SA1\_S\_x\_5| \leq 80°, \quad \text{[Equation 7]}$$

$$10° \leq |SA1\_S\_y\_5| \leq 80°$$

(In Equation 7, SA1_S_x_5 means a slope angle between the normal line and the optical axis at any point on the sensor side surface of the fifth lens in the 75% to 95% distance range between the optical axis and the effective diameter in the X-axis direction of the fifth lens, and SA1_S_y_5 means a slope angle between the normal line and the optical axis at any point on the sensor side surface of the fifth lens in the 75% to 95% distance range between the optical axis and the effective diameter in the Y-axis direction of the fifth lens).

14. The optical module of claim 1, wherein the fifth lens satisfies Equation 14 below:

$$10um \leq \max|Sag\_O\_x\_5| - \min|Sag\_O\_x\_5| \leq 100um, \quad \text{[Equation 14]}$$

$$10\text{ mm} \leq \max|Sag\_O\_y\_5| - \min|Sag\_O\_y\_5| \leq 100\text{ mm}$$

(In Equation 14, max |Sag_O_x_5| means an absolute value of a maximum Sag value in a X-axis direction on the object side surface of the fifth lens, min |Sag_O_x_5| means an absolute value of a minimum Sag value in a X-axis direction that is not 0 on the object side surface of the fifth lens, max |Sag_O_y_5| means an absolute value of a maximum Sag value in a Y-axis direction on the object side surface of the fifth lens, and min |Sag_O_y_5| means an absolute value of a minimum Sag value in a Y-axis direction that is not 0 on the object side surface of the fifth lens).

15. An optical system comprising:

a first lens, a second lens, a third lens, a fourth lens, a fifth lens, and a sixth lens arranged sequentially along an optical axis from an object side to a sensor side, wherein at least one of an object side surface or a sensor side surface of the fifth lens comprises a freeform surface, and wherein the fifth lens satisfies Equation A below:

$$|\max Sag\_O\_x\_5| \neq |\max Sag\_O\_y\_5| \quad \text{[Equation A]}$$

(In equation A, max |Sag_O_x_5| means an absolute value of a maximum Sag value in a X-axis direction on the object side surface of the fifth lens, and max |Sag_O_y 5| means an absolute value of a maximum Sag value in a Y-axis direction on the object side surface of the surface lens), and wherein the first lens and the second lens satisfy Equation 28 below:

$$P\_1\text{ sign} \neq P\_2\text{ sign}, \quad \text{[Equation 28]}$$

$$V\_1 > V\_2,$$

$$10 < V1 < 50 < V2,$$

$$N\_1 < N\_2$$

(In Equation 28, P_1 sign is a refractive power sign of the first lens having a positive (+) or negative (−) sign, P_2 sign is a refractive power sign of the second lens having a positive (+) or negative (−) sign, V_1 is an Abbe number of the first lens, V_2 is an Abbe number of the second lens, N_1 is a refractive index of the first lens, and N_2 is a refractive index of the second lens).

16. The optical system of claim 15, wherein the first lens and the second lens satisfy Equation 29 below:

$$1.3\text{ mm} \leq CR\_O\_1 \leq 2.5\text{ mm}, \quad \text{[Equation 29]}$$

$$10\text{ mm} \leq CR\_O\_4 \leq 30\text{ mm}$$

(In Equation 29, CR_O_1 means a radius of curvature at the optical axis of an object side surface of the first lens, and CR_O_4 means a radius of curvature at the optical axis of an object side surface of the fourth lens).

17. The optical system of claim 15, wherein the fifth lens satisfies Equation 6 below:

$$1^\circ \leq |SA1\_O\_x\_5| \leq 60^\circ, \quad \text{[Equation 6]}$$

$$1^\circ \leq |SA1\_O\_y\_5| \leq 60^\circ$$

(In Equation 6, SA1_O_x_5 means a slope angle between a normal line and the optical axis at any point on the object side surface of the fifth lens at a distance in a range of 75% to 95% of a distance from the optical axis to an effective diameter in a X-axis direction from the optical axis of the fifth lens, and SA1_O_y_5 means a slope angle between a normal line and the optical axis at a point on the object side surface of the fifth lens at a distance in a range of 75% to 95% of a distance from the optical axis to an effective diameter in a Y-axis direction from the optical axis of the fifth lens).

18. The optical system of claim 15, wherein the fifth lens satisfies Equation 7 below:

$$10^\circ|SA1\_S\_x\_5| \leq 80^\circ, \quad \text{[Equation 7]}$$

$$10^\circ|SA1\_S\_y\_5| \leq 80^\circ$$

(In Equation 7, SA1_S_x_5 means a slope angle between the normal line and the optical axis at any point on the sensor side surface of the fifth lens in the 75% to 95% distance range between the optical axis and the effective diameter in the X-axis direction of the fifth lens, and SA1_S_y_5 means a slope angle between the normal line and the optical axis at any point on the sensor side surface of the fifth lens in the 75% to 95% distance range between the optical axis and the effective diameter in the Y-axis direction of the fifth lens).

19. The optical system of claim 15, wherein the fifth lens satisfies Equation 14 below:

$$10um \leq \max|Sag\_O\_x\_5| - \min|Sag\_O\_x\_5| \leq 100um, \quad \text{[Equation 14]}$$

$$10\text{ mm} \leq \max|Sag\_O\_y\_5| - \min|Sag\_O\_y\_5| \leq 100\text{ mm}$$

(In Equation 14, max |Sag_O_x_5| means an absolute value of a maximum Sag value in a X-axis direction on the object side surface of the fifth lens, min |Sag_O_x_5| means an absolute value of a minimum Sag value in a X-axis direction that is not 0 on the object side surface of the fifth lens, max |Sag_O_y_5| means an absolute value of a maximum Sag value in a Y-axis direction on the object side surface of the fifth lens, and min |Sag_O_y_5| means an absolute value of a minimum Sag value in a Y-axis direction that is not 0 on the object side surface of the fifth lens).

* * * * *